US012214703B2

(12) United States Patent
Yamaguchi et al.

(10) Patent No.: US 12,214,703 B2
(45) Date of Patent: Feb. 4, 2025

(54) CONVEYANCE SEAT

(71) Applicant: TS TECH CO., LTD., Saitama (JP)

(72) Inventors: Takanori Yamaguchi, Tochigi (JP); Masahito Tashiro, Tochigi (JP); Katsuya Kawata, Tochigi (JP); Kazuya Miyawaki, Tochigi (JP); Heehyeok Park, Tochigi (JP); Kenta Kikuchi, Tochigi (JP); Naoto Yamauchi, Tochigi (JP); Naoya Matsumoto, Tochigi (JP); Hiroyuki Kaku, Tochigi (JP); Hiroshi Baba, Tochigi (JP); Jinichi Tanabe, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 48 days.

(21) Appl. No.: 18/018,052

(22) PCT Filed: Jul. 30, 2021

(86) PCT No.: PCT/JP2021/028480
§ 371 (c)(1),
(2) Date: Jan. 26, 2023

(87) PCT Pub. No.: WO2022/025286
PCT Pub. Date: Feb. 3, 2022

(65) Prior Publication Data
US 2023/0278473 A1     Sep. 7, 2023

Related U.S. Application Data

(60) Provisional application No. 63/059,368, filed on Jul. 31, 2020, provisional application No. 63/085,211, (Continued)

(51) Int. Cl.
*B60N 2/64*      (2006.01)
*A47C 7/46*      (2006.01)
*B60N 2/66*      (2006.01)

(52) U.S. Cl.
CPC ............... *B60N 2/64* (2013.01); *A47C 7/46* (2013.01); *B60N 2/665* (2015.04)

(58) Field of Classification Search
CPC ....................................................... B60N 2/665
(Continued)

(56) References Cited

U.S. PATENT DOCUMENTS 4,589,695 A * 5/1986 Isono ..................... A47C 7/467
297/284.6
4,592,588 A * 6/1986 Isono ..................... A47C 7/029
297/284.6

(Continued)

FOREIGN PATENT DOCUMENTS

CN         207790420 U    8/2018
DE    20 2005 013 621 U1    1/2007
(Continued)

OTHER PUBLICATIONS

International Search Report mailed on Oct. 26, 2021 for the corresponding PCT Application No. PCT/JP2021/028480, with English translation.
(Continued)

*Primary Examiner* — Rodney B White
(74) *Attorney, Agent, or Firm* — Michael Best & Friedrich LLP

(57) ABSTRACT

A conveyance seat capable of suppressing wrinkles or saggings from occurring on a surface of a seat main body is provided. A conveyance seat includes a seat back and a movable body which is attached inside the seat back, is disposed at an outer position in relation to a center portion of the seat back, and is operated so that a side portion of the seat back protrudes toward a seated occupant side (seat front side). The movable body is disposed on a back surface of a cushion material in the side portion. An end portion (rear end (Continued)

portion) on the side opposite to the seated occupant side of the movable body is disposed on the seated occupant side (seat front side) in relation to a seating surface of the center portion of the seat back.

13 Claims, 69 Drawing Sheets

Related U.S. Application Data filed on Sep. 30, 2020, provisional application No. 63/085,249, filed on Sep. 30, 2020, provisional application No. 63/085,332, filed on Sep. 30, 2020, provisional application No. 63/085,371, filed on Sep. 30, 2020.

(58) Field of Classification Search
USPC .................................................... 297/284.6
See application file for complete search history.

(56) References Cited

U.S. PATENT DOCUMENTS

| | | | | |
|---|---|---|---|---|
| 4,655,505 A * | 4/1987 | Kashiwamura | ........ | B60N 2/976 |
| | | | | 297/284.6 |
| 4,720,146 A * | 1/1988 | Mawbey | ................ | B60N 2/914 |
| | | | | 297/DIG. 8 |
| 4,887,864 A | 12/1989 | Ashton et al. | | |
| 4,965,899 A * | 10/1990 | Sekido | ................... | A47C 7/467 |
| | | | | 297/284.6 |
| 5,127,708 A * | 7/1992 | Kishi | ...................... | A61B 5/18 |
| | | | | 297/284.6 |
| 5,129,704 A * | 7/1992 | Kishi | ................... | B60N 2/0224 |
| | | | | 297/284.6 |
| 5,263,765 A * | 11/1993 | Nagashima | .......... | B60N 2/0244 |
| | | | | 297/284.6 |
| 5,280,997 A * | 1/1994 | Andres | ................... | A47C 7/467 |
| | | | | 297/284.6 |
| 5,320,409 A * | 6/1994 | Katoh | ................ | B60N 2/02246 |
| | | | | 297/284.6 |
| 6,129,419 A | 10/2000 | Neale | | |
| 7,156,467 B2 * | 1/2007 | Kimmig | ................. | B60N 2/502 |
| | | | | 297/284.6 |
| 7,641,281 B2 * | 1/2010 | Grimm | .................... | B60N 2/99 |
| | | | | 297/284.9 X |
| 7,726,739 B2 * | 6/2010 | Wain | ...................... | B60N 2/986 |
| | | | | 297/284.11 |
| 8,136,883 B2 * | 3/2012 | Rehfuss | ................. | B60N 2/986 |
| | | | | 297/284.6 |
| 8,251,447 B2 * | 8/2012 | Fujita | ................... | A61B 5/6892 |
| | | | | 297/284.6 |
| 8,342,607 B2 * | 1/2013 | Hofmann | ................. | B60N 2/70 |
| | | | | 297/284.6 |
| 8,678,500 B2 * | 3/2014 | Lem | ...................... | B60N 2/914 |
| | | | | 297/284.6 |
| 9,868,414 B2 * | 1/2018 | Ohno | ................... | B60R 21/263 |
| 10,052,987 B2 * | 8/2018 | Schacht | ................... | B60N 2/72 |
| 10,369,913 B2 * | 8/2019 | Duncan | ................... | B60N 2/99 |
| 11,021,090 B2 * | 6/2021 | Humer | .................. | B60N 2/0237 |
| 2003/0038517 A1* | 2/2003 | Moran | ................... | B60N 2/914 |
| | | | | 297/284.6 |
| 2007/0057551 A1* | 3/2007 | Lachenmann | ......... | B60N 2/914 |
| | | | | 297/284.9 |
| 2008/0088159 A1 | 4/2008 | Grimm | | |
| 2008/0203794 A1 | 8/2008 | Steffen | | |
| 2008/0252128 A1 | 10/2008 | Nishikawa | | |
| 2010/0066136 A1 | 3/2010 | D'Agostini | | |
| 2011/0068611 A1* | 3/2011 | Maeda | ..................... | B60N 2/66 |
| | | | | 297/284.4 |
| 2011/0210592 A1 | 9/2011 | Watanabe | | |
| 2015/0042134 A1 | 2/2015 | Shimizu | | |
| 2016/0221481 A1 | 8/2016 | Sugiyama | | |
| 2016/0317047 A1 | 11/2016 | Sugiyama | | |
| 2017/0036634 A1* | 2/2017 | Ohno | ..................... | B60N 2/885 |
| 2017/0088029 A1 | 3/2017 | Mizoi et al. | | |
| 2018/0056836 A1 | 3/2018 | Schacht et al. | | |
| 2021/0237620 A1 | 8/2021 | Mizoi et al. | | |
| 2021/0331612 A1 | 10/2021 | Sakota et al. | | |
| 2022/0024352 A1 | 1/2022 | Kaku et al. | | |
| 2022/0039718 A1 | 2/2022 | Kowata et al. | | |
| 2022/0055510 A1 | 2/2022 | Mizoi et al. | | |
| 2024/0300395 A1* | 9/2024 | Mizoi | .................... | B60N 2/976 |

FOREIGN PATENT DOCUMENTS

| | | |
|---|---|---|
| EP | 2 607 157 A1 | 6/2013 |
| EP | 2 774 805 A1 | 9/2014 |
| JP | S57-131410 A | 8/1982 |
| JP | S57-205238 A | 12/1982 |
| JP | S59-118451 U | 8/1984 |
| JP | S59-159363 U | 10/1984 |
| JP | S62-106716 A | 5/1987 |
| JP | 2006-051272 A | 2/2006 |
| JP | 2008-212397 A | 9/2008 |
| JP | 2008-254645 A | 10/2008 |
| JP | 2008-541896 A | 11/2008 |
| JP | 2009-170144 A | 7/2009 |
| JP | 2011-088553 A | 5/2011 |
| JP | 2011-178194 A | 9/2011 |
| JP | 2011-235789 A | 11/2011 |
| JP | 2012-076698 A | 4/2012 |
| JP | 2012-224296 A | 11/2012 |
| JP | 2013-001255 A | 1/2013 |
| JP | 2013-095373 A | 5/2013 |
| JP | 2013-129245 A | 7/2013 |
| JP | 2013-189149 A | 9/2013 |
| JP | 2014-061128 A | 4/2014 |
| JP | 2014-148235 A | 8/2014 |
| JP | 2014-213741 A | 11/2014 |
| JP | 2015-083454 A | 4/2015 |
| JP | 2015-123359 A | 7/2015 |
| JP | 2015-127199 A | 7/2015 |
| JP | 2017-065659 A | 4/2017 |
| JP | 2017-081463 A | 5/2017 |
| JP | 2017-094875 A | 6/2017 |
| JP | 2017-206211 A | 11/2017 |
| JP | 2017-210186 A | 11/2017 |
| JP | 2018-024314 A | 2/2018 |
| JP | 2018-034730 A | 3/2018 |
| JP | 2018-034803 A | 3/2018 |
| JP | 2018-075872 A | 5/2018 |
| JP | 2018-176942 A | 11/2018 |
| JP | 2019-194062 A | 11/2019 |
| JP | 2020-023322 A | 2/2020 |
| JP | 2020-028503 A | 2/2020 |
| JP | 2020-093079 A | 6/2020 |
| JP | 2020-093589 A | 6/2020 |
| WO | 2005-006921 A1 | 1/2005 |
| WO | 2020-122135 A1 | 6/2020 |
| WO | 2020/179673 A1 | 9/2020 |

OTHER PUBLICATIONS

Japanese Office Action mailed on Jul. 30, 2024 for the corresponding Japanese Patent Application No. 2021-049234, with English machine translation.

Japanese Office Action mailed on Jul. 30, 2024 for the corresponding Japanese Patent Application No. 2021-049239, with English machine translation.

Office Action mailed on Sep. 3, 2024 for Japanese Patent Application No. 2021-049235, with English machine translation.

Office Action mailed on Sep. 17, 2024 for Japanese Patent Application No. 2021-049236, with English machine translation.

Office Action mailed on Sep. 17, 2024 for Japanese Patent Application No. 2021-049237, with English machine translation.

Office Action mailed on Sep. 17, 2024 for Japanese Patent Application No. 2021-049238, with English machine translation.

Office Action mailed on Sep. 17, 2024 for Japanese Patent Application No. 2021-058093, with English machine translation.

(56) References Cited

OTHER PUBLICATIONS

Office Action mailed on Sep. 17, 2024 for Japanese Patent Application No. 2021-058094, with English machine translation.
Office Action mailed on Sep. 17, 2024 for Japanese Patent Application No. 2021-058095, with English machine translation.

* cited by examiner

FIG. 3
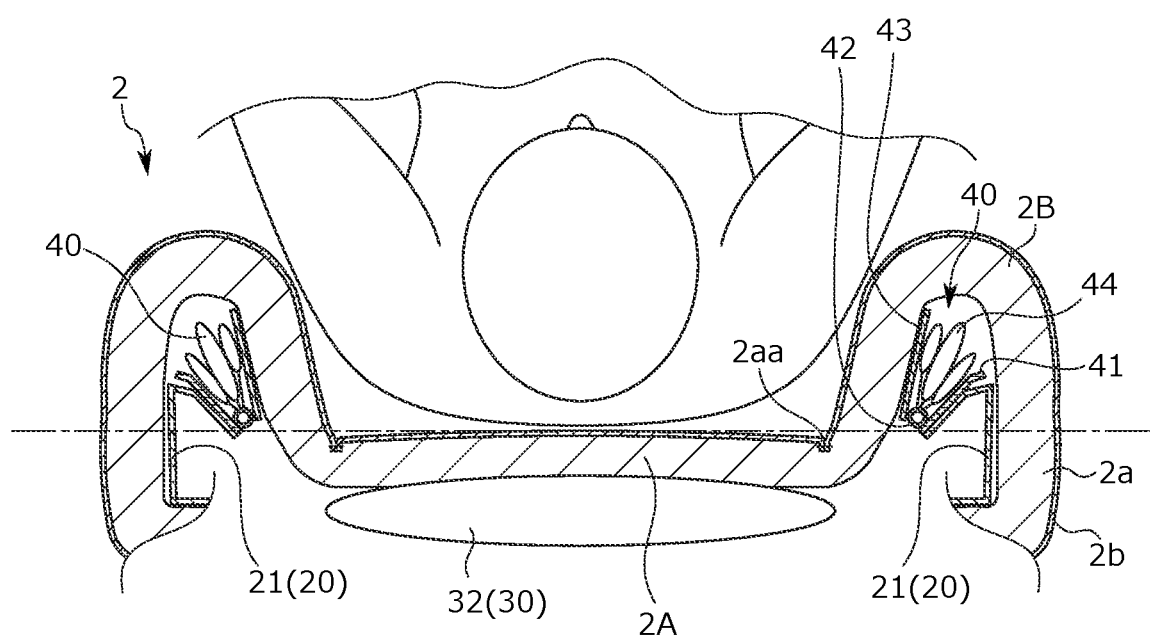
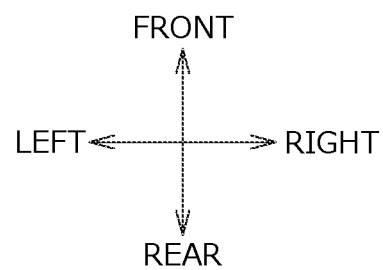

FRONT ←----→ REAR

FIG. 22C
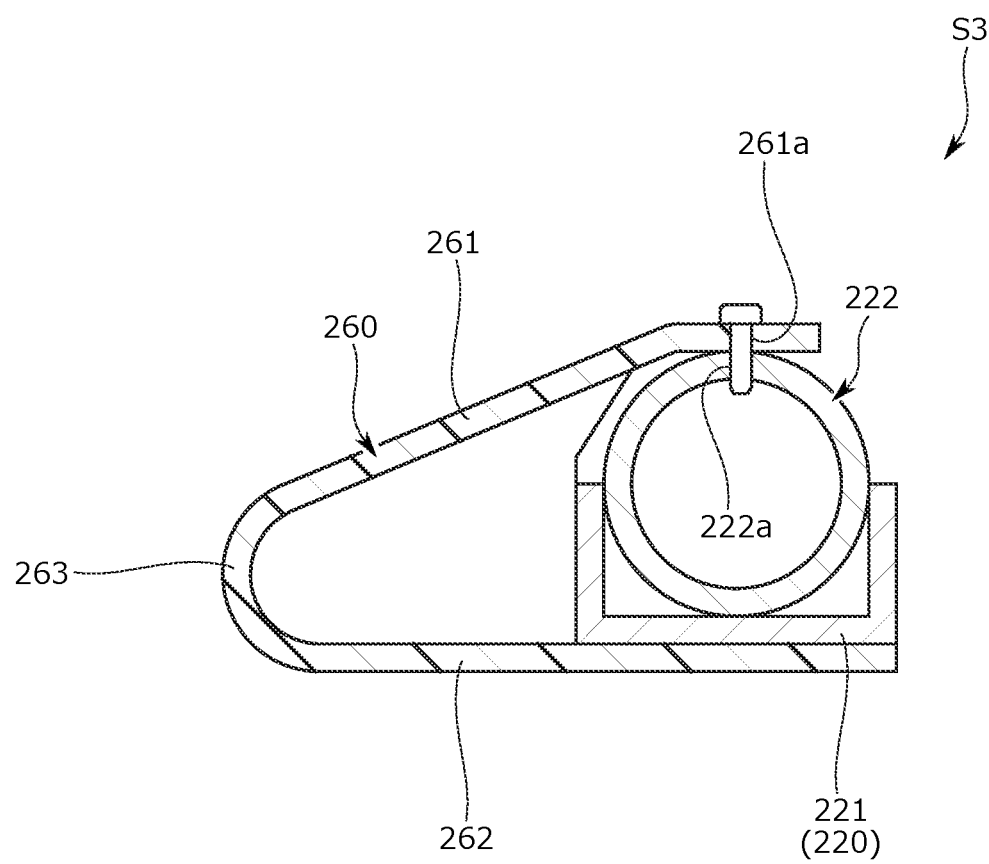
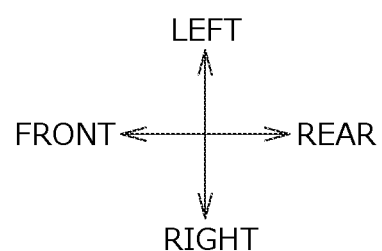

FIG. 41
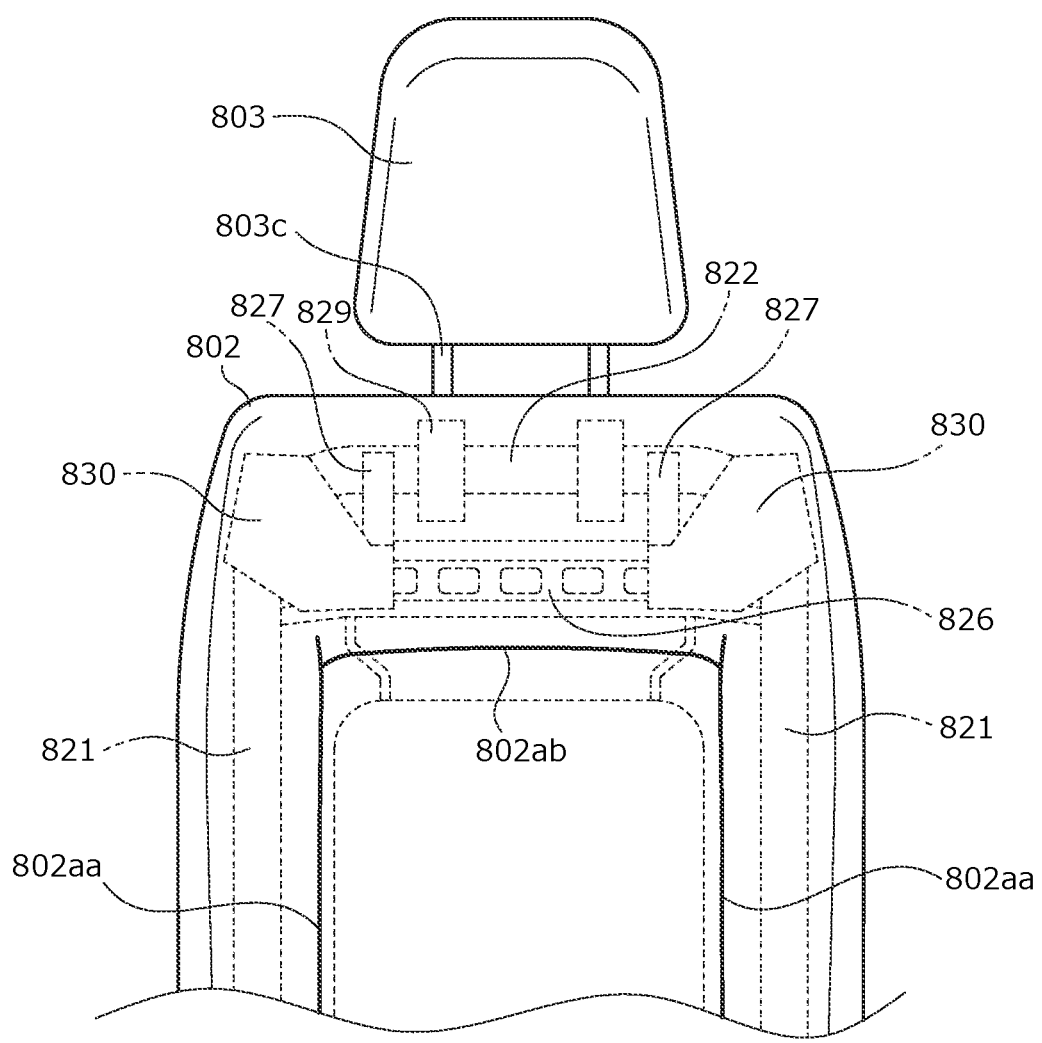
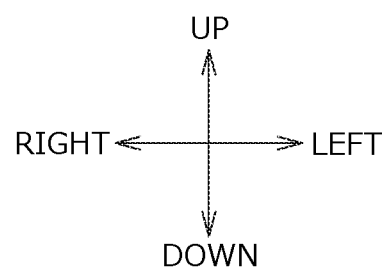

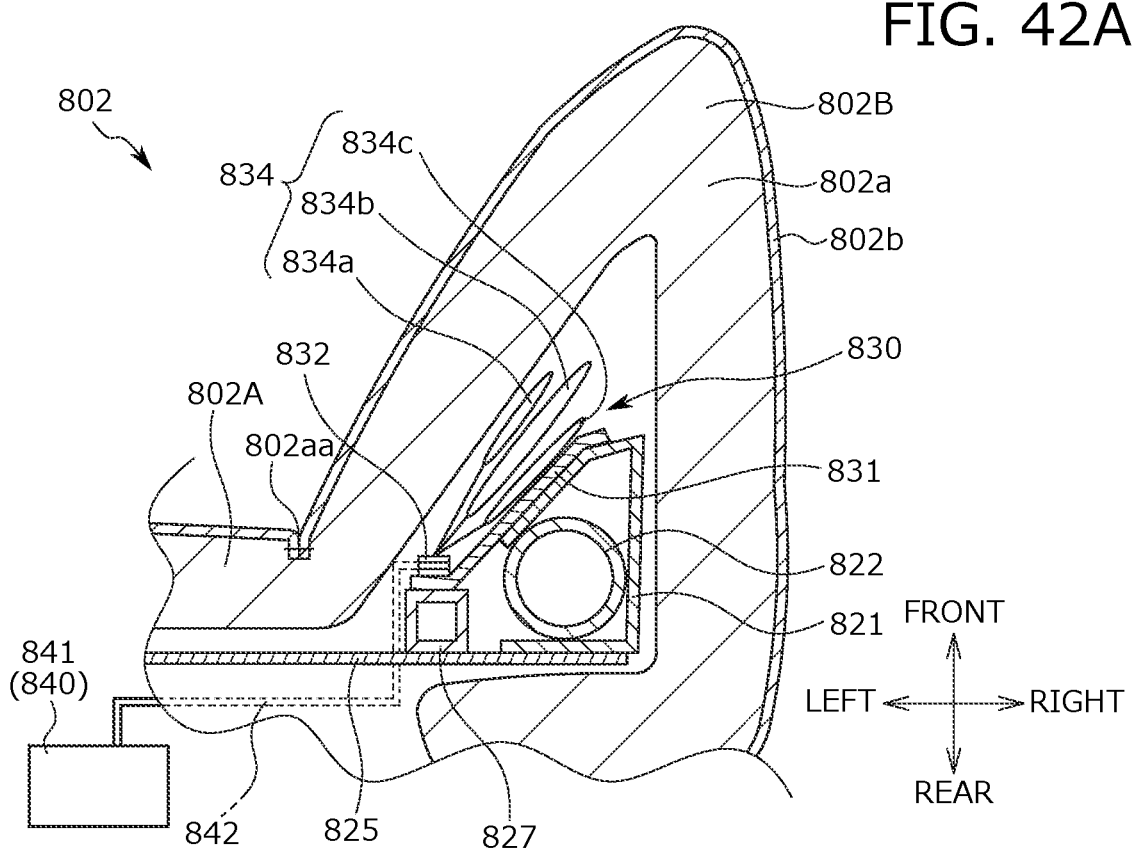
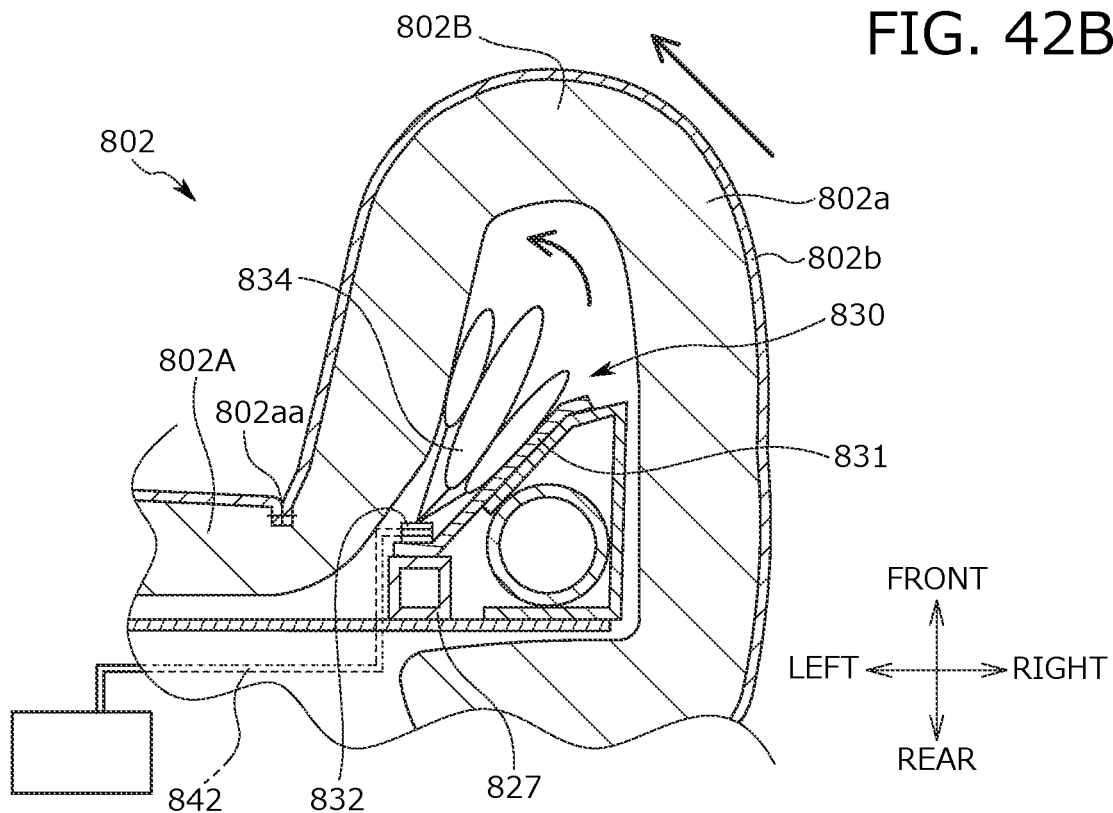

CONVEYANCE SEAT

CROSS-REFERENCE TO RELATED APPLICATIONS

This application is a National Entry application of PCT Application Serial Number PCT/JP2021/028480, filed Jul. 30, 2021. Further this application claims priority from U.S. Provisional Application No. 63/059,368, filed Jul. 31, 2020, U.S. Provisional Application No. 63/085,211, filed Sep. 30, 2020, U.S. Provisional Application No. 63/085,249, filed Sep. 30, 2020, U.S. Provisional Application No. 63/085,332, filed Sep. 30, 2020, and U.S. Provisional Application No. 63/085,371, filed Sep. 30, 2020, the entire contents of which are hereby incorporated by reference into this application.

TECHNICAL FIELD

The present invention relates to a conveyance seat and to a conveyance seat which includes a movable body operated so that a portion of a seat main body protrudes from a normal position toward a seated occupant side.

BACKGROUND ART

Conventionally, there is known a vehicle seat including a movable body (for example, a side support member) which is attached inside a seat main body allowing an occupant to sit thereon and is operated so that a portion (for example, a side portion) of the seat main body protrudes from a normal position toward a seated occupant side (for example, see Patent Literature 1).

Since the movable body is provided, it is possible to enhance the holdability of the vehicle seat according to the physique and preference of the seated occupant.

CITATION LIST

Patent Literature

PATENT LITERATURE 1: JP 2014-148235 A

SUMMARY OF INVENTION

Technical Problem

Incidentally, in the vehicle seat of Patent Literature 1, when the movable body allows a portion of the seat main body to protrude toward the seated occupant side, wrinkles or saggings unintentionally occur on the surface (specifically, a skin material) of the seat main body. Then, there is a risk of spoiling the appearance of the vehicle seat.

For example, it is assumed that the vehicle seat includes a side support member that allows a side portion of a seat back to protrude toward the seated occupant side and the side support member is disposed at a seat rear position in relation to a seating surface of a center portion of the seat back. Then, there is a risk that wrinkles or saggings of the skin material noticeably occur at a boundary portion between the center portion and the side portion of the seat back (specifically, a portion corresponding to a pull-in groove) in accordance with the operation of the side support member.

Further, for example, it is assumed that the vehicle seat includes a lumbar support member allowing a center portion of the seat back to protrude toward a seat front side and a side support member allowing a side portion of the seat main body to protrude toward the seated occupant side and these support members are arranged side by side in the seat width direction. Then, there is a risk that a force is applied to the surface of the seat main body from a plurality of directions in accordance with the operation of these support members and wrinkles or saggings easily occur.

The present invention has been made in view of the above-described problems and an object of the present invention is to provide a conveyance seat capable of suppressing wrinkles or saggings from occurring on a surface of a seat main body even when a portion of the seat main body protrudes toward a seated occupant side.

Further, another object of the present invention is to provide a conveyance seat capable of suppressing wrinkles or saggings of a skin material from occurring at a boundary portion between a center portion and a side portion of a seat main body (a portion corresponding to a pull-in groove).

Solution to Problem

The above-described problems are solved by a conveyance seat including: a seat main body on which an occupant sits; and a movable body which is attached inside the seat main body, is disposed at an outer position in relation to a center portion of the seat main body in a seat width direction, and is operated so that a portion of the seat main body protrudes from a normal position toward the seated occupant side, wherein an end portion on the side opposite to the seated occupant side in the movable body is disposed on the seated occupant side in relation to a seating surface of the center portion of the seat main body.

With the above-described configuration, it is possible to realize the conveyance seat capable of suppressing wrinkles or saggings from occurring on the surface of the seat main body.

Specifically, the end portion on the side opposite to the seated occupant side in the movable body is disposed on the seated occupant side in relation to the seating surface of the center portion of the seat main body. Therefore, it is possible to suppress wrinkles or saggings of the skin material from occurring at the boundary portion between the center portion and the outer portion of the seat main body compared to the related art even when the movable body is operated.

At this time, the seat main body may include a seat back which serves as a backrest portion, the seat back may include a cushion material and a skin material covering the cushion material, and the movable body may be disposed on a back surface of the cushion material in a side portion of the seat back in the seat width direction and may be operated so that the side portion protrudes toward a seat front side.

With the above-described configuration, it is possible to suppress wrinkles or the like from occurring on the skin material of the seat back. Specifically, it is possible to suppress wrinkles or the like of the skin material from occurring at the boundary portion between the center portion and the side portion of the seat back (the portion corresponding to the pull-in groove) even when the movable body is operated.

At this time, the movable body may include a rotating member that is rotated so that the side portion of the seat back protrudes toward the seat front side, and a rear end portion of the rotating member may be disposed on the seat front side in relation to the seating surface of the center portion of the seat back.

Since the rotating member is provided as described above, it is possible to further stabilize the movable operation of the movable body.

Further, since the rear end portion of the rotating member is disposed on the seat front side in relation to the seating surface of the center portion of the seat back as described above, it is possible to further suppress wrinkles or the like of the skin material from occurring at the boundary portion between the center portion and the side portion of the seat back.

At this time, the seat back may include a back frame which serves as a framework, the back frame may include side frames which are arranged on the right and left sides in the seat width direction and extend in an up to down direction, the movable body may be disposed at a seat front position in relation to the side frame, and the movable body may include a base member that is supported by the side frame and a rotating member that is rotatably attached to the base member through a rotating shaft.

With the above-described configuration, the movable body is preferably supported by the side frame. As a result, it is possible to stabilize the movable operation of the movable body. Further, since the movable operation of the movable body is stabilized, it is possible to adjust wrinkles or the like not to occur on the skin material of the seat back.

At this time, a protruding surface of the side portion may be formed continuously with the seating surface of the center portion in the seat back, a back surface of the cushion material in the side portion may form an inclined surface along the protruding surface of the side portion, the movable body may be disposed in an inner space formed between the side frame and the cushion material in the side portion, and a portion corresponding to the cushion material of the side portion in the base member may extend to be inclined along the back surface of the cushion material of the side portion.

Further, a portion facing the cushion material of the side portion in the rotating member may extend to be inclined along the back surface of the cushion material of the side portion.

With the above-described configuration, the movable body can allow the side portion of the seat back to preferably protrude. That is, the movable body can apply a more uniform pressure to the cushion material of the side portion of the seat back.

At this time, a pull-in groove for pulling an end of the skin material may be formed on a surface of the cushion material, the pull-in groove may be provided at a position of partitioning the center portion and the side portion in the seat back and extends in the up to down direction, and a portion corresponding to the pull-in groove in the back surface of the cushion material may be formed with a cushion deformation suppressing portion for suppressing the cushion material from being deformed in the periphery of the pull-in groove.

Since the cushion deformation suppressing portion is provided as described above, it is possible to suppress the deformation of the cushion material at a predetermined portion of the seat back and to suppress wrinkles or the like from occurring on the skin material of the seat back.

Particularly, it is known that wrinkles or saggings noticeably occur on the skin material at the boundary portion between the center portion and the side portion of the seat back (the portion corresponding to the pull-in groove) when the movable body allows the side portion of the seat back to protrude toward the seated occupant side. Therefore, countermeasures can be taken to suppress wrinkles or the like from occurring on the skin material at the boundary portion.

At this time, the movable body may include a plurality of bag bodies which inflate when a fluid is enclosed, and the plurality of bag bodies may be arranged at different positions in a front to back direction of the seat and may be arranged on the seat front side in relation to the seating surface of the center portion of the seat back.

Further, the movable body may include a plurality of bag bodies which inflate when a fluid is enclosed, the plurality of bag bodies may be arranged at different positions in the front to back direction of the seat, and a first bag body located closest to the seat front side in the plurality of bag bodies may be configured to have the smallest capacity than the other bag bodies.

With the above-described configuration, it is possible to adjust the protruding direction or protruding amount of the seat back by movable body by inflating the plurality of bag bodies located at different positions and having different sizes.

Further, with the above-described configuration, it is possible to suppress wrinkles or the like from occurring on the skin material of the seat back by adjusting the protruding direction or protruding amount of the side portion of the seat back.

At this time, a pull-in hole for pulling an end of the skin material may be formed on a surface of the cushion material, the pull-in hole may be provided at a position of partitioning the center portion and the side portion in the seat back and extends in the up to down direction, a skin material pull-in portion passing through the pull-in hole and hooked to a hook portion provided inside the seat back may be attached to the end of the skin material, and the skin material pull-in portion may be hooked to the hook portion while being pulled outward in the seat width direction by a pulling portion provided inside the seat back.

As described above, the skin material pull-in portion is hooked to the hook portion while being pulled outward in the seat width direction by the pulling portion provided inside the seat back. Therefore, it is possible to increase the tension of the skin material and to suppress wrinkles or the like of the skin material from occurring even when the movable body is operated.

Particularly, it is possible to increase the tension of the skin material of the center portion of the seat back in the seat width direction and to further suppress wrinkles or the like of the skin material from occurring at the boundary portion between the center portion and the side portion of the seat back.

At this time, the pulling portion and the pull-in hole inside the seat back may be arranged at an overlapping position in the front to back direction of the seat.

With the above-described configuration, the pulling portion (the portion increasing the tension of the skin material) is disposed at a position relatively close to the surface of the seat back in the front to back direction of the seat back. Therefore, it is possible to efficiently increase the tension of the skin material and to efficiently suppress wrinkles or the like from occurring on the skin material.

At this time, the movable body may be disposed in an inner space formed on the back surface of the cushion material in the side portion, a through hole which penetrates from an outer surface of the cushion material to the inner space may be formed in the outer surface of the cushion material in the side portion, and the through hole may be disposed at a position overlapping the movable body in the front to back direction of the seat and extends in the up to down direction.

As described above, since the through hole is formed in the cushion material of the side portion, the cushion material of the side portion is preferably and easily bent. Therefore, the movable body allows the cushion material of the side portion to easily protrude and an unnecessary force is not applied to the skin material of the seat back. As a result, it is easy to suppress the occurrence of wrinkles or the like on the skin material.

At this time, the conveyance seat may include a lumbar support member that is attached inside the seat back and is operated so that the center portion of the seat back in the seat width direction protrudes from a normal position toward the seated occupant side and when the lumbar support member allows the center portion of the seat back to protrude toward the maximum seat front side, a rear end portion of the movable body may be disposed on the seat front side in relation to the seating surface of the center portion of the seat back.

With the above-described configuration, the movable body and the lumbar support member are arranged at different positions in the seat width direction and are arranged at different positions in the front to back direction of the seat. Therefore, it is possible to allow the direction or position of each force applied to the surface of the seat back to be different even when the movable body and the lumbar support member are operated at the same time. As a result, it is possible to suppress wrinkles or the like from occurring on the surface of the seat back.

At this time, the conveyance seat may include a lumbar support member that is attached inside the seat back and is operated so that the center portion of the seat back in the seat width direction protrudes from a normal position toward the seated occupant side; and a driving device which is attached inside the seat back and drives the lumbar support member and the movable body may be disposed on the seat front side in relation to the driving device.

With the above-described configuration, the movable body, the lumbar support member, and the driving device are respectively attached to different positions inside the seat back. Therefore, it is possible to preferably operate the movable body and the lumbar support member.

Particularly, since the movable body is disposed on the seat front side in relation to the driving device in the front to back direction of the seat, the movable body can be preferably operated so that the side portion of the seat back protrudes toward the seat front side.

Further, with the above-described configuration, it is also possible to arrange each component of the conveyance seat as compactly as possible.

At this time, the seat back may include a back frame serving as a framework, the back frame may include side frames which are arranged on the right and left sides in the seat width direction and extend in a predetermined direction, a connection frame which connects end portions of the right and left side frames in an extension direction, a second connection frame which is disposed at a position different from the connection frame in the extension direction of the side frame and connects the right and left side frames, and a connection member that connects the connection frame and the second connection frame, and the movable body may be attached to the connection member.

With the above-described configuration, the movable body is attached to the connection member that is a relatively rigid component of the back frame. Therefore, it is possible to suppress the deformation of the movable body even when a load generated by the seated occupant is applied to the movable body. As a result, it is possible to stably operate the movable body.

Advantageous Effects of Invention

According to the present invention, it is possible to realize the conveyance seat capable of suppressing wrinkles or saggings from occurring on the surface of the seat main body. Specifically, it is possible to suppress wrinkles or the like of the skin material from occurring at the boundary portion between the center portion and the outer portion of the seat main body compared to the related art even when the movable body is operated.

Further, according to the present invention, it is possible to suppress wrinkles or the like of the skin material from occurring at the boundary portion between the center portion and the side portion of the seat back (the portion corresponding to the pull-in groove) even when the movable body is operated.

Further, according to the present invention, it is possible to further stabilize the movable operation of the movable body. Since the movable operation of the movable body is stabilized, it is also possible to adjust wrinkles or the like not to occur on the skin material of the seat back.

Further, according to the present invention, the movable body can more uniformly apply a pressure to the cushion material of the side portion of the seat back.

Further, according to the present invention, it is possible to suppress the deformation of the cushion material in a predetermined portion of the seat back and to suppress wrinkles or the like from occurring on the skin material of the seat back.

Further, according to the present invention, it is possible to adjust the protruding direction or protruding amount of the seat back by the movable body. As a result, it is possible to suppress wrinkles or the like from occurring on the skin material of the seat back.

Further, according to the present invention, it is possible to increase the tension of the skin material and to suppress wrinkles or the like of the skin material from occurring even when the movable body is operated.

Further, according to the present invention, the cushion material of the side portion is preferably and easily bent. Therefore, the movable body allows the cushion material of the side portion to easily protrude and an unnecessary force is not applied to the skin material of the seat back. As a result, it is easy to suppress the occurrence of wrinkles or the like on the skin material.

Further, according to the present invention, it is possible to allow the direction or position of each force applied to the surface of the seat back to be different even when the movable body and the lumbar support member are operated at the same time. As a result, it is possible to suppress wrinkles or the like from occurring on the surface of the seat back.

Further, according to the present invention, it is possible to preferably operate the movable body and the lumbar support member. Further, it is also possible to arrange each component of the conveyance seat as compactly as possible.

Further, according to the present invention, it is possible to suppress the movable body from being deformed even when a load generated by the seated occupant is applied to the movable body. As a result, it is possible to stably operate the movable body.

BRIEF DESCRIPTION OF DRAWINGS

FIG. 3 is a cross-sectional view taken along a line III-III of FIG. 1 and is a view describing a state in which a movable body and a second movable body are operated.

FIG. 22C is a cross-sectional view of the side frame and the side support member.

FIG. 41 is a front view showing the conveyance seat and is a view describing a positional relationship of a movable body, a connection member, and a skin material pull-in groove.

FIG. 42A is a cross-sectional view taken along a line XLII-XLII of FIG. 38 and is a view describing a state in which a side portion of a seat back is located at a "normal position".

FIG. 42B is a view describing a state in which the movable body is operated and the side portion of the seat back is located at a "protruding position".

DESCRIPTION OF EMBODIMENTS

Hereinafter, embodiments according to the present invention will be described with reference to FIGS. 1 to 64.

This embodiment relates to the invention of a conveyance seat including a seat main body and a movable body which is attached inside the seat main body, is disposed at an outer position in relation to a center portion of the seat main body in the seat width direction, and is operated so that a side portion of the seat main body protrudes toward a seated occupant side (seat front side) and an end portion (rear end portion) on the side opposite to the seated occupant side of the movable body is disposed on the seated occupant side (seat front side) in relation to a seating surface of the center portion of the seat main body.

Additionally, the side of the seat back of the conveyance seat on which the occupant sits is the seat front side.

First Embodiment

Figure 1:
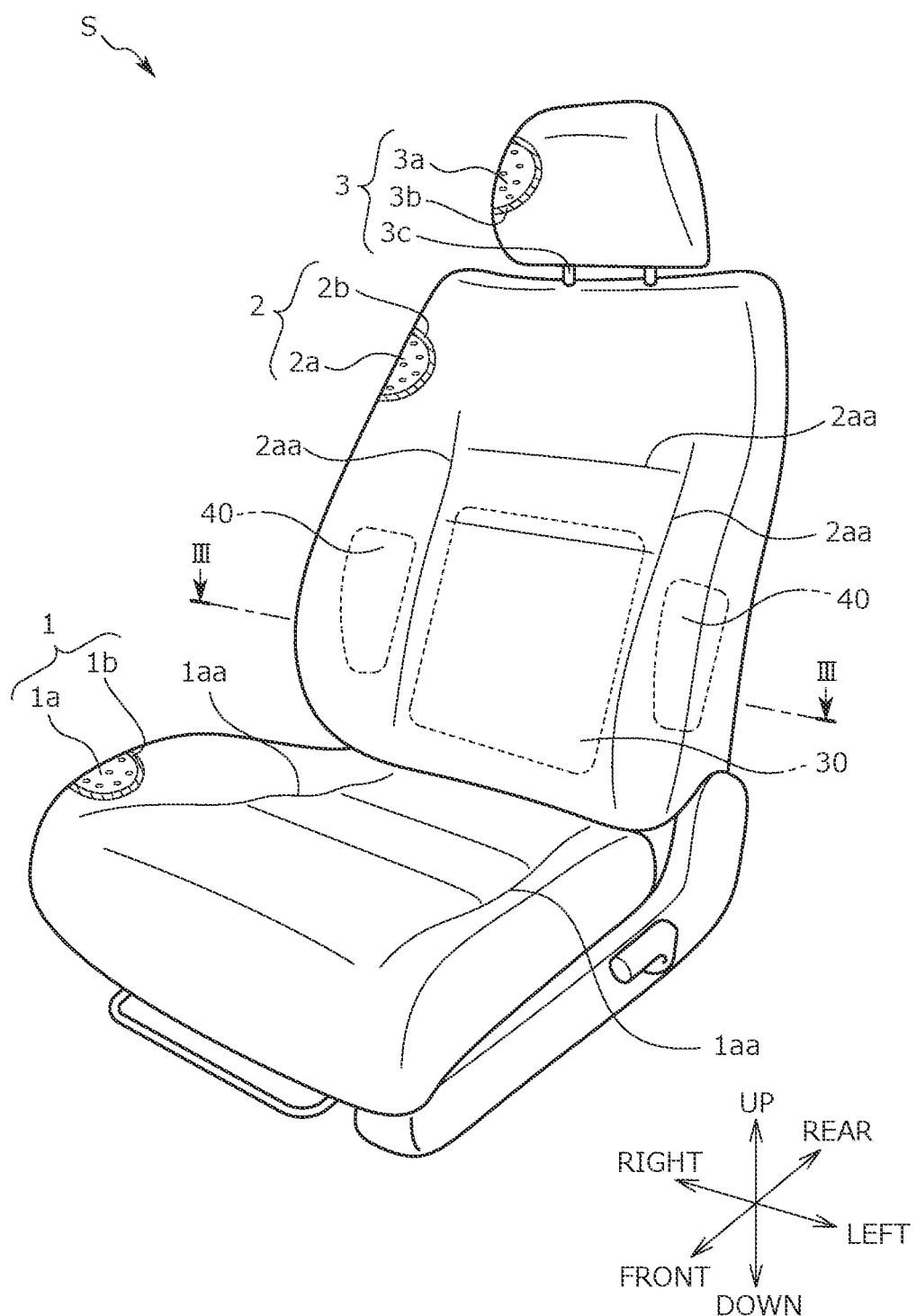
FIG. 1 is an external perspective view of a conveyance seat of this embodiment.
Figure 2:
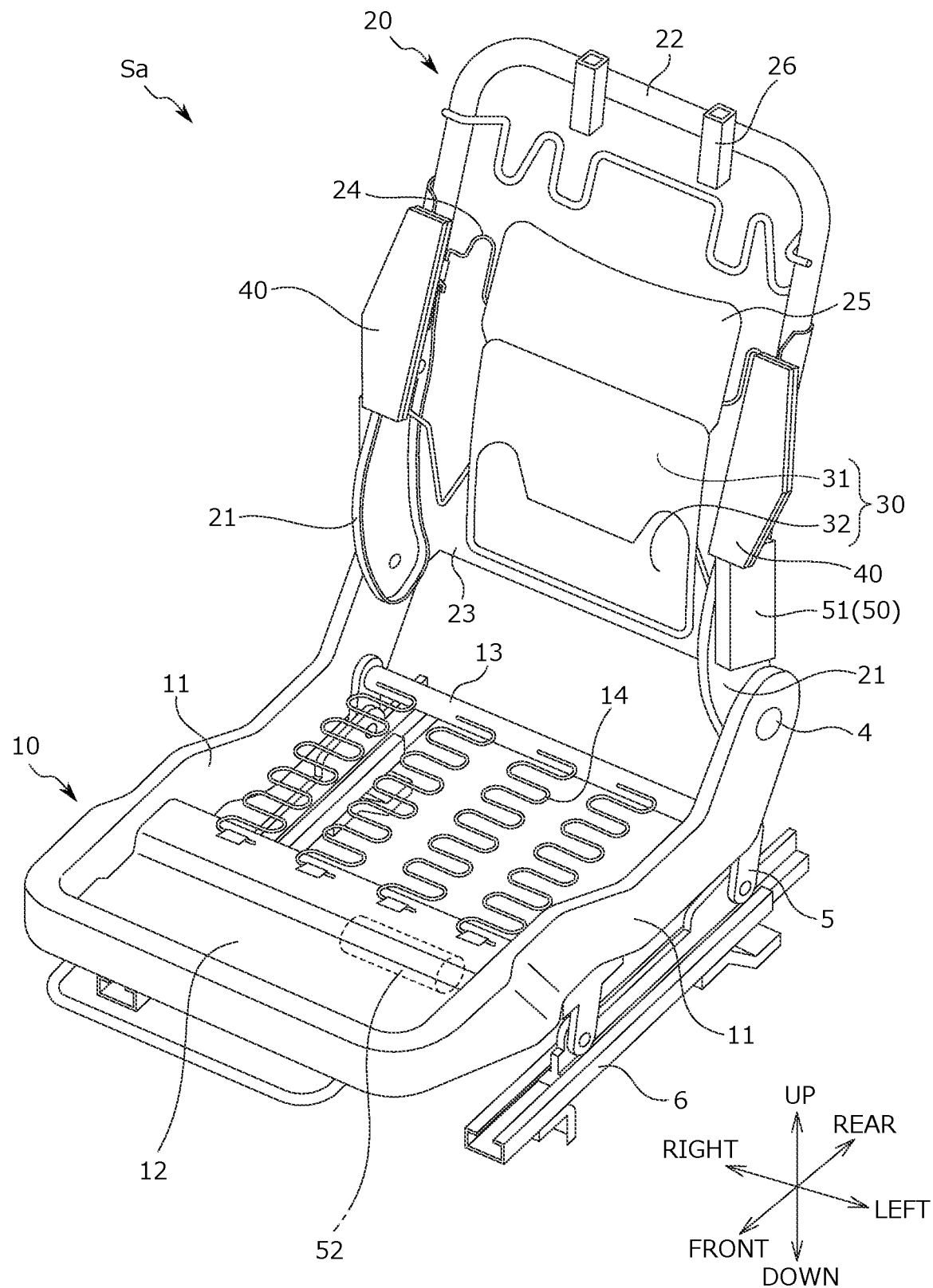
FIG. 2 is a perspective view showing a seat frame serving as a framework.

A conveyance seat S1 of a first embodiment is, as shown in FIGS. 1 and 2, a vehicle seat and includes a seat main body which includes a seat cushion 1, a seat back 2, and a headrest 3, a lumbar support member 30 that is attached inside the seat back 2 and is operated so that a center portion 2A of the seat back 2 protrudes from a normal position toward a seated occupant side, a movable body 40 (side support member) which is attached inside the seat main body and is operated so that a side portion 2B of the seat back 2 protrudes from the normal position toward the seated occupant side, and an operating device 50 (fluid supply device) which is operated so that the lumbar support member 30 and the movable body 40 are operated.

The seat cushion 1 is, as shown in FIG. 1, a seating portion which supports the seated occupant from below and has a configuration in which a cushion material 1a is placed on a cushion frame 10 serving as a framework and shown in FIG. 2 and is covered with a skin material 1b.

The seat cushion 1 includes a center portion 1A which is located at the center part in the seat width direction and right and left side portions 1B (side bolster portions) which are located on the outside of the center portion 1A in the seat width direction.

The cushion material 1a is a pad member formed of foamed urethane or the like.

Right and left pull-in grooves 1aa which extend in the front to back direction of the seat to separate the center portion 1A and the right and left side portions 1B are formed on the surface of the cushion material 1a.

The seat back 2 is, as shown in FIG. 1, a backrest portion which supports the back of the seated occupant from behind and has a configuration in which a cushion material 2a is placed on a back frame 20 serving as a framework and shown in FIG. 2 and is covered with a skin material 2b.

The seat back 2 includes a center portion 2A which is located at the center part in the seat width direction and right and left side portions 2B (side bolster portions) which are located on the outside of the center portion 2A in the seat width direction.

Right and left pull-in grooves 2aa which extend in the up to down direction to separate the center portion 2A and the right and left side portions 2B are formed on the surface of the cushion material 2a.

Figure 5A:
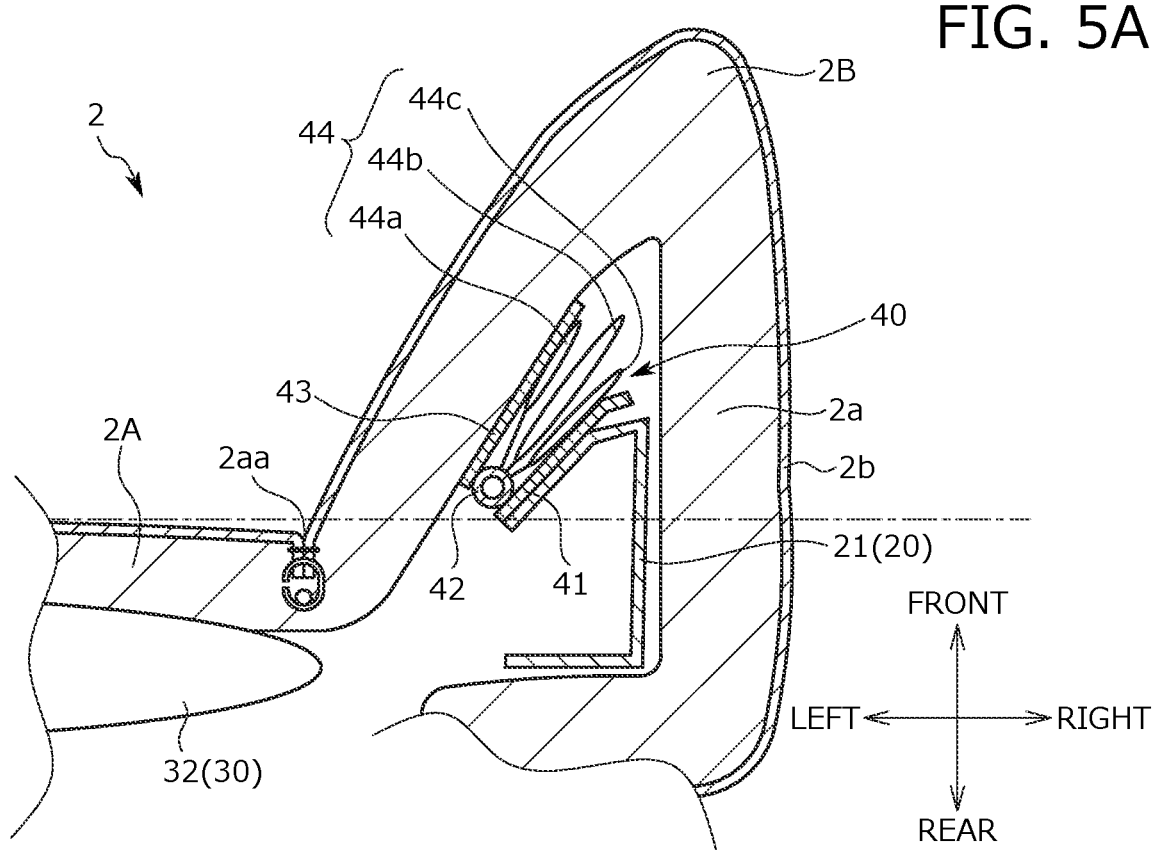
FIG. 5A is a cross-sectional view of a seat back and is a view describing a state in which the movable body is not operated and a side portion of the seat back is located at a "normal position".

Additionally, as shown in FIGS. 1 and 3, the surface (seating surface) of the center portion 2A and the surface (protruding surface) of the side portion 2B are continuously formed. Further, as shown in FIG. 5A, the back surface of the cushion material 2a of the side portion 2B forms an inclined surface along the surface (protruding surface) of the side portion 2B.

The headrest 3 is, as shown in FIG. 1, a head portion which supports the head of the seated occupant from behind and has a configuration in which a cushion material 3a is placed on a pillar 3c serving as a core material and is covered with a skin material 3b.

Additionally, a pillar attachment member 26 for attaching the pillar 3c supporting a main body of the headrest 3 is assembled to the upper portion of the back frame 20.

The cushion frame 10 consists of, as shown in FIG. 2, a rectangular frame-shaped body and mainly includes cushion side frames 11 which are disposed on the right and left sides, a plate-shaped pan frame 12 (installation frame) which is installed at the front end part of each cushion side frame 11, a rear connection frame 13 which connects a rear part of each cushion side frame 11, and a plurality of elastic members 14 (elastic springs) which are hooked to the pan frame 12 and the rear connection frame 13 and extend in the front to back direction of the seat.

The cushion side frame 11 is a plate-shaped frame which is elongated in the front to back direction of the seat.

Additionally, a reclining device 4 is attached to the rear part of the cushion side frame 11 and a rail device 6 is attached to the lower part thereof through a height link device 5.

The back frame 20 consists of, as shown in FIGS. 2 and 3, a rectangular frame-shaped body and mainly includes back side frames 21 which are disposed on the right and left sides, an inverted U-shaped upper frame 22 which connects the upper end part of each back side frame 21, a plate-shaped lower frame 23 which connects the lower end part of each back side frame 21, a plurality of wire members 24 (elastic wires) which are respectively hooked to the back side frames 21 and extend in a snake shape in the seat width direction, and a support plate 25 which is held by the plurality of wire members 24 and supports the seated occupant.

Additionally, the back frame 20 further includes a pillar attachment member 26 that is attached to the center part of the upper frame 22 in the seat width direction and attaches the pillar 3c of the headrest 3.

The back side frame 21 is a metal plate member that extends in the up to down direction and has a substantially C-shaped cross-section and the lower end part thereof is connected to the rear end part of the cushion side frame 11 through the reclining device 4.

In the above-described configuration, the back frame 20 is relatively rotatable with respect to the cushion frame 10.

In the above-described configuration, as shown in FIG. 2, the lumbar support member 30 is attached to the front surface of the lower part of the support plate 25.

Further, as shown in FIGS. 2 and 3, the right and left movable bodies 40 are attached to the front surfaces of the lower parts of the right and left back side frames 21.

The lumbar support member 30 includes, as shown in FIG. 2 to FIGS. 5A and 5B, a bag body (air cell) which inflates when a fluid is enclosed and is operated to inflate toward the seated occupant side (to protrude from the normal position toward the protruding position) when compressed air serving as a fluid is enclosed and to contract (to return to the normal position) when the enclosed compressed air is discharged.

Specifically, the lumbar support member 30 is a member that supports the lumbar of the seated occupant and is disposed between the support plate 25 and the cushion material 2a at the center portion 2A of the lower part of the seat back 2. Then, this member is operated so that the center portion 2A (cushion material 2a) protrudes toward the seated occupant side.

The lumbar support member 30 is attached to the front surface of the support plate 25 in a folded state.

The lumbar support member 30 has a rectangular shape elongated in the seat width direction and mainly includes a base member 31 (base plate) which is supported by the support plate 25 and a bag body 32 which is supported by the front surface of the base member 31.

The bag body 32 can inflate toward the seat front side when compressed air is enclosed from a folded state.

The movable body 40 includes, as shown in FIG. 2 to FIGS. 5A and 5B, a bag body (air cell) and is operated to inflate toward the seated occupant side (to protrude from the normal position toward the protruding position) when compressed air is enclosed and to contract (to return to the normal position) when the enclosed compressed air is discharged.

Specifically, the movable body 40 is a side support member that supports the seated occupant from the side and is disposed between the back side frame 21 and the cushion material 2a at the side portion 2B of the lower part of the seat back 2. Then, this member is operated so that the side portion 2B (cushion material 2a) protrudes toward the seated occupant side (the seat front side or the inside of the seat width direction).

The movable body 40 is attached to the front surface of the back side frame 21 in a folded state.

The movable body 40 has a substantially pentagonal shape elongated in the up to down direction and mainly includes a base member 41 that is supported by the back side frame 21, a rotating member 43 that is disposed at the seat front position in relation to the base member 41 and is rotatably attached to the base member 41 through the rotating shaft 42, and a plurality of bag bodies 44 which are disposed between the base member 41 and the rotating member 43 and are supported by the front surface of the base member 41.

The base member 41 is attached to the front surface of the back side frame 21 and extends to protrude in the seat width direction along the front surface of the back side frame.

The rotating shaft 42 is attached to the inner end portion of the front surface of the base member 41 in the seat width direction.

The rotating member 43 is attached to the base member 41 to be rotatable in the front to back direction of the seat and is rotated toward the seat front side so that the side portion 2B of the seat back 2 can protrude (be pushed out) toward the seat front side.

Additionally, the rotating member 43 is disposed at a position shifted toward the base member 41 when the seat back 2 is located at the normal position. The rotating member may be biased toward the base member 41 by a biasing spring (biasing member) (not shown).

The plurality of bag bodies 44 are supported by the base member 41 and inflate toward the seat front side when compressed air is enclosed so that the rotating member 43 can be pushed out toward the seat front side. That is, the rotating member 43 can be rotated toward the seat front side.

The plurality of bag bodies 44 are arranged at different positions in the front to back direction of the seat and the seat width direction and are configured to have different sizes.

In more detail, the plurality of bag bodies 44 are configured as three bag bodies and a first bag body 44a which is located closest to the seat front side in the plurality of bag bodies 44 is configured to have the smallest capacity than the other bag bodies. Then, the capacity of the second bag body 44b is the largest and the capacity of the third bag body 44c is medium.

With the above-described configuration, it is possible to adjust the protruding direction or protruding amount of the seat back 2 (side portion 2B) by inflating the plurality of bag bodies 44 located at different positions and having different sizes.

Further, it is possible to suppress wrinkles or saggings from occurring on the skin material 2b of the seat back 2 by adjusting the protruding direction or protruding amount of the side portion 2B of the seat back 2.

In the above-described configuration, as shown in FIG. 5A, the movable body 40 is disposed in an inner space formed between the back side frame 21 and the cushion material 2a in the side portion 2B.

Then, a portion corresponding to the cushion material 2a of the side portion 2B in the base member 41 extends to be inclined along the back surface of the cushion material 2a.

Further, a portion facing the cushion material 2a of the side portion 2B in the rotating member 43 extends to be inclined along the back surface of the cushion material 2a.

Therefore, the movable body 40 can apply a more uniform pressure to the cushion material 2a of the side portion 2B of the seat back 2. That is, the movable body 40 allows the side portion 2B of the seat back 2 to preferably protrude.

Figure 4:
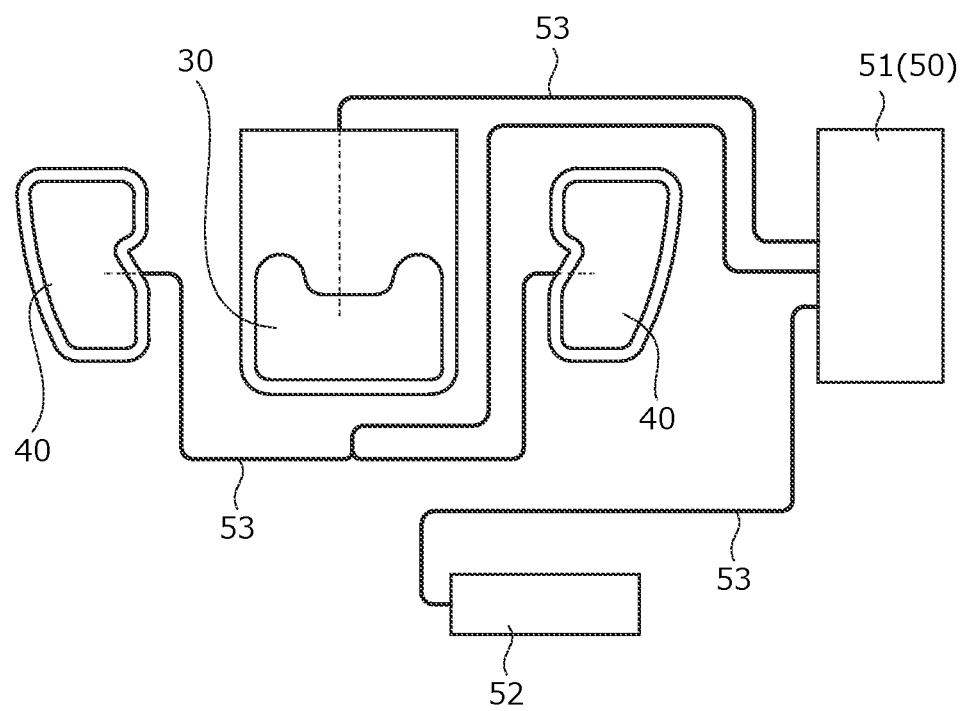
FIG. 4 is a schematic view showing the movable body, the second movable body, and an operating device.

The operating device 50 is, as shown in FIGS. 2 and 4, a fluid supply device which is attached inside the seat main body and supplies compressed air to the lumbar support member 30 (bag body 32) and the movable body 40 (bag body 44).

The operating device 50 mainly includes an air control unit 51 which is attached to the outer surface of the back side frame 21, an air pump 52 which is attached to the back surface of the cushion frame 10 (pan frame 12) and supplies (feeds) and discharges (exhausts) compressed air, and an air pipe 53 which connects the air pump 52 and the lumbar support member 30 (movable body 40).

For example, the air control unit 51 receives a predetermined control signal by accepting a selection of a predetermined user operation of the seated occupant and controls the air pump 52 so that compressed air is supplied to the bag bodies 32 and 44 or compressed air is discharged from the bag bodies 32 and 44.

In this way, it is possible to adjust the movable range of the lumbar support member 30 and the movable body 40 according to the physique of the seated occupant.

In the above-described configuration, as shown in FIG. 3, when the lumbar support member 30 allows the center portion 2A of the seat back 2 to protrude toward the maximum seat front side, the rear end portion of the movable body 40 is disposed on the seat front side in relation to the seating surface of the center portion 2A of the seat back 2.

In other words, the plurality of bag bodies 44 are arranged on the seat front side in relation to the seating surface of the center portion 2A of the seat back 2.

Therefore, it is possible to suppress wrinkles or saggings from occurring on the skin material 2b of the seat back 2.

In more detail, the lumbar support member 30 and the movable body 40 are arranged at different positions in the seat width direction and are arranged at different positions in the front to back direction of the seat. In this way, even when the lumbar support member 30 and the movable body 40 are operated at the same time, the direction or position of the force applied to the skin material 2b of the seat back 2 can be made different. As a result, it is possible to suppress wrinkles or the like from occurring on the skin material 2b of the seat back 2.

Next, the operation of the movable body 40 will be described in detail with reference to FIGS. 5A and 5B.

Figure 5B:
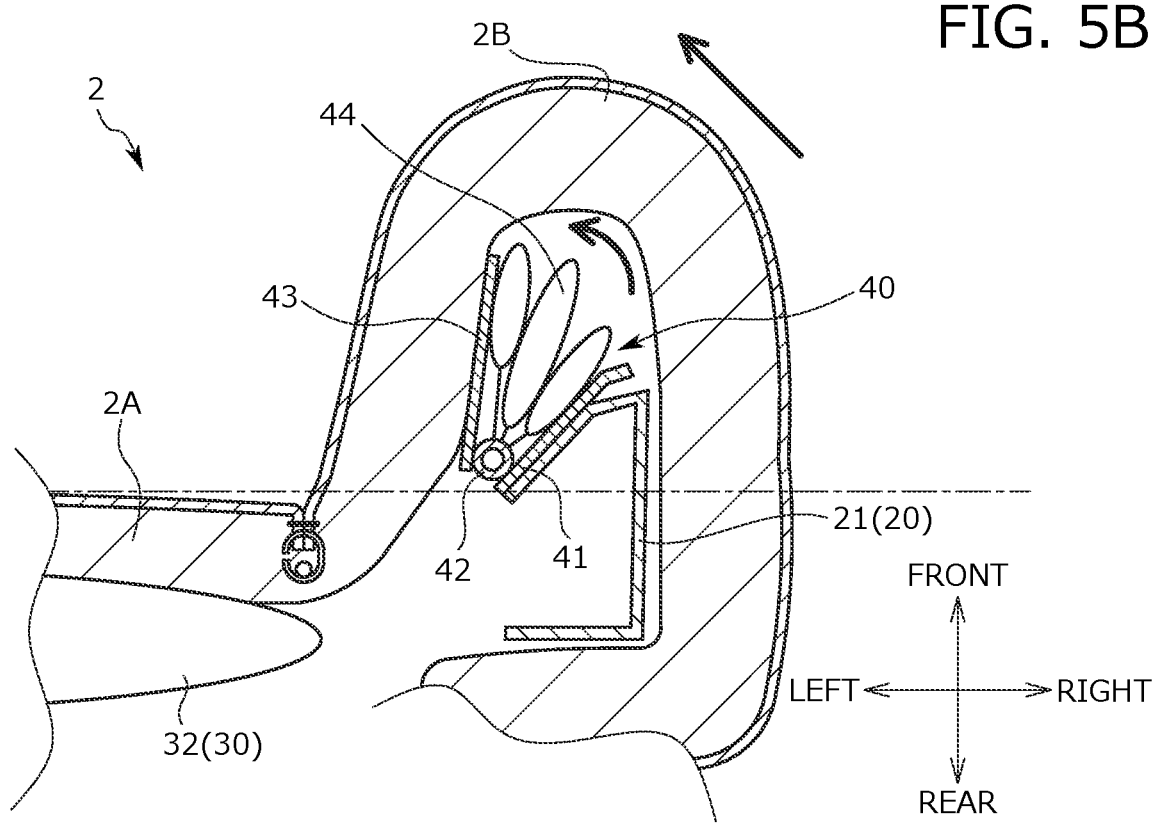
FIG. 5B is a view describing a state in which the movable body is operated and the side portion of the seat back is located at a "protruding position".

The movable body 40 can be operated (inflated) so that the side portion 2B of the seat back 2 is moved from the "normal position" shown in FIG. 5A to the "protruding position" shown in FIG. 5B.

FIG. 5A is a transverse cross-sectional view of the seat back 2 and is a view showing a state in which the side portion 2B of the seat back 2 is located at the "normal position".

The movable body 40 is disposed between the back frame 20 and the skin material 2b in the front to back direction of the seat. Specifically, the movable body is attached to the front surface of the back side frame 21 and is disposed at a position facing the back surface of the cushion material 2a.

FIG. 5B is a view showing a state in which the movable body 40 (rotating member 43) protrudes toward the seat front side and the side portion 2B of the seat back 2 moves from the "normal position" to the "protruding position".

Specifically, when compressed air is supplied from the operating device 50, the folded bag body 44 inflates and deploys toward the seat front side and the rotating member 43 is pushed out toward the seat front side so that the side portion 2B moves toward the seat front side. As a result, the side portion 2B moves to the "protruding position".

Additionally, when compressed air inside the bag body 44 is discharged by the operating device 50, the inflated bag body 44 contracts and the side portion 2B is lowered toward the seat rear side. As a result, the side portion of the seat back 2 returns from the "protruding position" to the "normal position".

In the above-described configuration, as shown in FIG. 5B, the side portion 2B of the seat back 2 is configured to protrude toward the seat front side and inward in the seat width direction in accordance with the moving operation of the movable body 40 (bag body 44).

In this way, the seating feeling of the seated occupant can be enhanced.

First to Fourth Modified Examples of Movable Body

Next, first to fourth modified examples of the movable body will be described with reference to FIGS. 6 to 9.

Additionally, the description of the content that overlaps with the conveyance seat S1 described above will be omitted.

Figure 6:
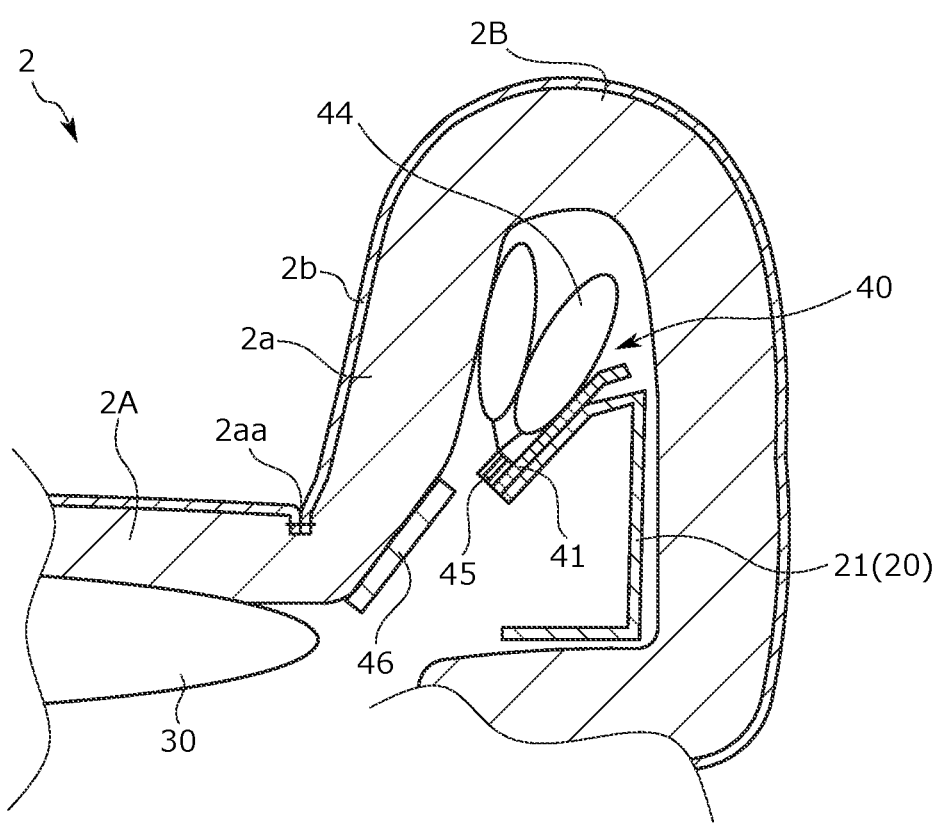
FIG. 6 is a view showing a first modified example of the movable body and is a cross-sectional view of the seat back.

The movable body 40 of the first modified example includes, as shown in FIG. 6, the base member 41 that is supported by the back side frame 21 and the plurality of bag bodies 44 which are supported by the front surface of the base member 41.

The plurality of bag bodies 44 are supported by the base member 41 and can inflate toward the seat front side when compressed air is enclosed from a folded state.

Additionally, the plurality of bag bodies 44 are attached to the base member 41 by an attachment member 45 provided at the inner end portion of the front surface of the base member 41 in the seat width direction.

FIG. 6 is a view showing a state in which the movable body 40 (bag body 44) protrudes toward the seat front side and the side portion 2B of the seat back 2 moves from the "normal position" to the "protruding position".

Specifically, when compressed air is supplied from the operating device 50, the folded bag body 44 inflates and deploys toward the seat front side so that the side portion 2B is directly pushed out toward the seat front side. As a result, the side portion 2B of the seat back 2 moves to the "protruding position".

In the above-described configuration, as shown in FIG. 6, a cushion deformation suppressing portion 46 for suppressing the deformation of the cushion material 2a in the periphery of a pull-in groove 2aa is attached to a portion corresponding to the pull-in groove 2aa in the back surface of the cushion material 2a.

Strictly speaking, the "periphery of the pull-in groove 2aa" is a position on the outside of the pull-in groove 2aa in the seat width direction.

The cushion deformation suppressing portion 46 is a resin plate which is attached to the back surface of the cushion material 2a, is disposed at the seat rear position in relation to the rear end portion of the movable body 40, and is disposed on the inside of the seat width direction in relation to the inner end portion of the movable body 40 in the seat width direction.

Therefore, it is possible to suppress wrinkles or saggings from occurring on the skin material 2b of the seat back 2. Particularly, it is possible to suppress wrinkles or saggings of the skin material 2b from occurring at the boundary portion between the center portion 2A and the side portion 2B of the seat back 2 (the portion corresponding to the pull-in groove 2aa).

Additionally, the cushion deformation suppressing portion 46 may be a cloth member such as a non-woven fabric instead of the resin plate.

Figure 7:
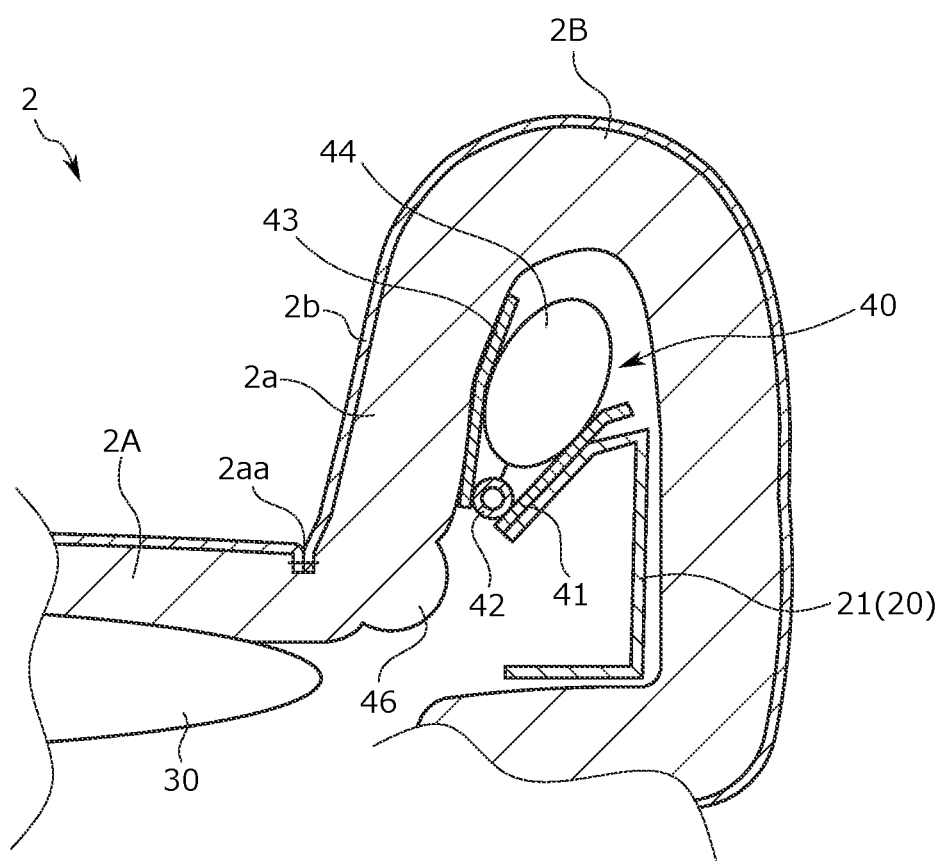
FIG. 7 is a view showing a second modified example of the movable body and is a cross-sectional view of the seat back.

The movable body 40 according to the second modified example includes, as shown in FIG. 7, the base member 41, the rotating member 43 that is rotatably attached to the base member 41 through the rotating shaft 42, and one bag body 44 which is disposed between the base member 41 and the rotating member 43 and is supported by the front surface of the base member 41.

Additionally, the rotating member 43 is a plate body having a slightly curved shape. Therefore, the contact area between the rotating member 43 and the cushion material 2a is slightly reduced and the pushing force of the rotating member 43 is efficiently transmitted to the cushion material 2a.

In the above-described configuration, as shown in FIG. 7, the cushion deformation suppressing portion 46 for suppressing the deformation of the cushion material 2a in the periphery of the pull-in groove 2aa is attached to a portion corresponding to the pull-in groove 2aa in the back surface of the cushion material 2a.

The cushion deformation suppressing portion 46 is a cushion thick portion which is provided on the back surface of the cushion material 2a, is disposed at a seat rear position in relation to the movable body 40, and is disposed on the inside of the movable body 40 in the seat width direction.

Therefore, it is possible to suppress wrinkles or saggings of the skin material 2b from occurring at the boundary portion between the center portion 2A and the side portion 2B of the seat back 2 (the portion corresponding to the pull-in groove 2aa).

Additionally, the cushion deformation suppressing portion 46 may be formed as a high hardness portion (high hardness cushion portion) instead of the cushion thick portion.

Figure 8:
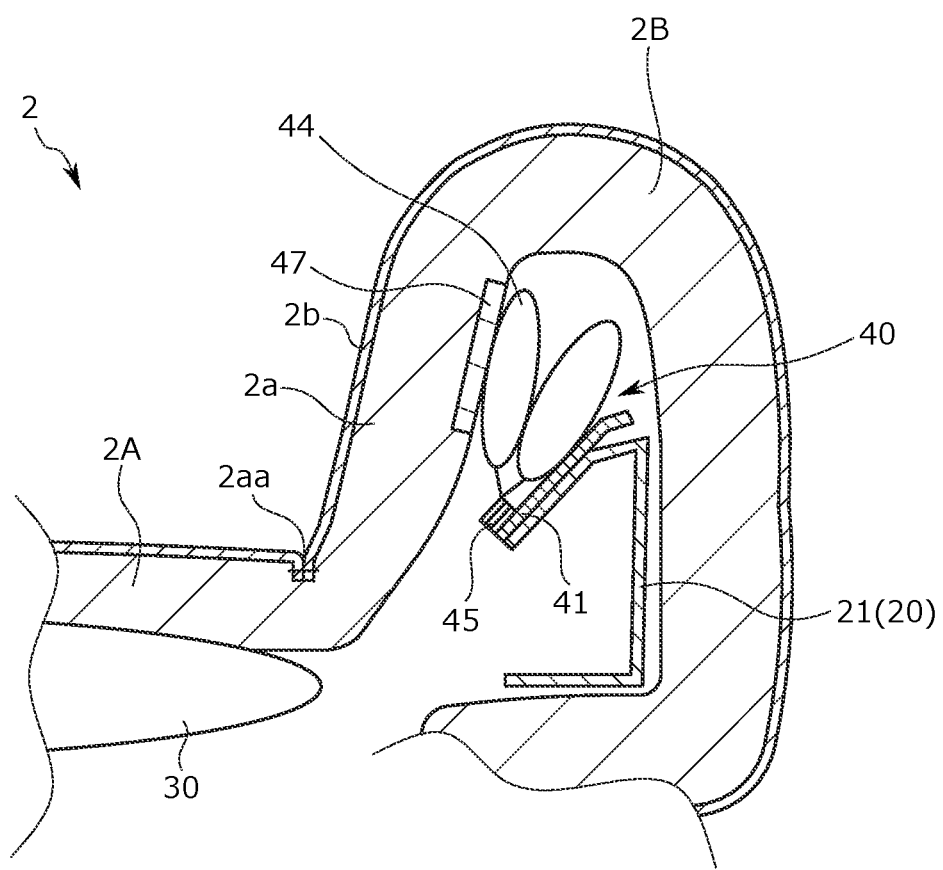
FIG. 8 is a view showing a third modified example of the movable body and is a cross-sectional view of the seat back.

The movable body 40 of the third modified example includes, as shown in FIG. 8, the base member 41 and the plurality of bag bodies 44 which are supported by the front surface of the base member 41.

FIG. 8 is a view showing a state in which the movable body 40 (bag body 44) protrudes toward the seat front side and the side portion 2B of the seat back 2 moves from the "normal position" to the "protruding position".

In the above-described configuration, as shown in FIG. 8, a high hardness cushion portion 47 having hardness higher than that of the cushion material 2a is provided in a portion facing the movable body 40 in the back surface of the cushion material 2a.

The high hardness cushion portion 47 is formed integrally with the cushion material 2a in the back surface of the cushion material 2a and is a portion which is disposed on the seat front position in relation to the seating surface of the center portion 2A of the seat back 2 and is directly pushed by the movable body 40.

Therefore, the movable body 40 can be pushed out so that the side portion 2B of the seat back 2 preferably protrudes.

Further, it is possible to suppress wrinkles or the like from occurring on the skin material 2b of the seat back 2 by allowing the side portion 2B to preferably protrude.

Figure 9:
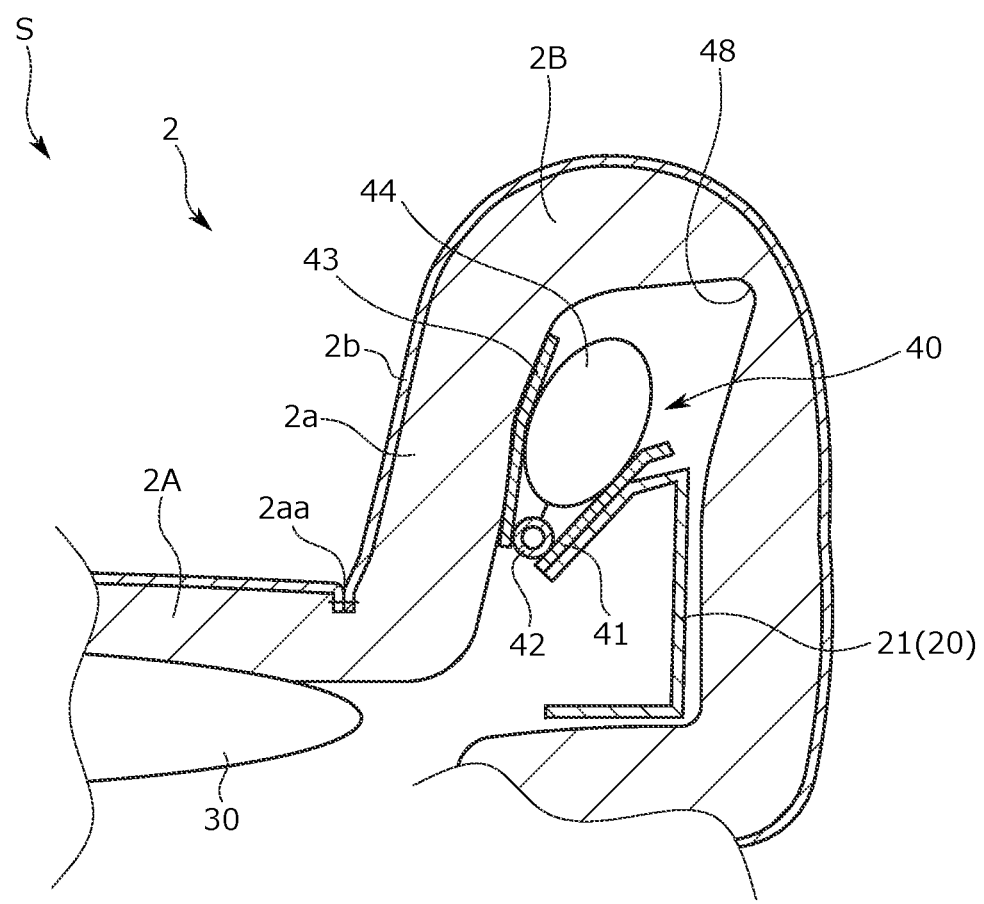
FIG. 9 is a view showing a fourth modified example of the movable body and is a cross-sectional view of the seat back.

The movable body 40 of the fourth modified example includes, as shown in FIG. 9, the base member 41, the rotating member 43 that is rotatably attached to the base member 41 through the rotating shaft 42, and one bag body 44 which is disposed between the base member 41 and the rotating member 43 and is supported by the front surface of the base member 41.

In the above-described configuration, as shown in FIG. 9, a cushion deformation prompting portion 48 for prompting the deformation of the cushion material 2a is formed in a portion located on the outside of the movable body 40 in the back surface of the cushion material 2a.

The cushion deformation prompting portion 48 is a cushion thin portion which is provided on the back surface of the cushion material 2a, is slightly disposed at the seat front position in relation to the movable body 40, and is disposed on the outside of the movable body 40 in the seat width direction.

Therefore, the cushion material 2a of the side portion 2B is preferably easily bent and the movable body 40 allows the cushion material 2a of the side portion 2B to easily protrude. As a result, an unnecessary force is not applied to the skin material 2b of the seat back 2 and wrinkles or the like can be suppressed from occurring on the skin material 2b.

Others

In the above-described embodiments, as shown in FIG. 1, the lumbar support member 30 is attached to the seat back 2, but may be attached to the seat cushion 1 without any particular limitation.

In the above-described embodiments, as shown in FIGS. 5A and 5B, the lumbar support member 30 is configured as a bag body (air cell) and the operating device 50 is configured as a fluid supply device. However, these can be changed without any particular limitation.

For example, the "movable body" and the "operating device" may be configured as mechanical mechanisms. Specifically, the "movable body" may be configured to be operated by a link mechanism, hinge mechanism, or the like and the "operating device" may be configured as a driving device and the like operated by a motor or a hydraulic pressure.

In the above-described embodiments, as shown in FIGS. 5A and 5B, the lumbar support member 30 is disposed on the back surface side of the cushion material 2a, but may be disposed on the surface side of the cushion material 2a without any particular limitation.

In the above-described embodiments, as shown in FIG. 5B, the movable body 40 allows the side portion 2B of the seat back 2 to protrude toward the seat front side and the inside of the seat width direction, but may protrude only toward the seat front side and may protrude only the inside of the seat width direction without any particular limitation.

Second Embodiment of Conveyance Seat

Next, a conveyance seat S2 of a second embodiment will be described with reference to FIGS. 10 to 15.

Additionally, the description of the content that overlaps with the conveyance seat S1 described above will be omitted.

Figure 10:
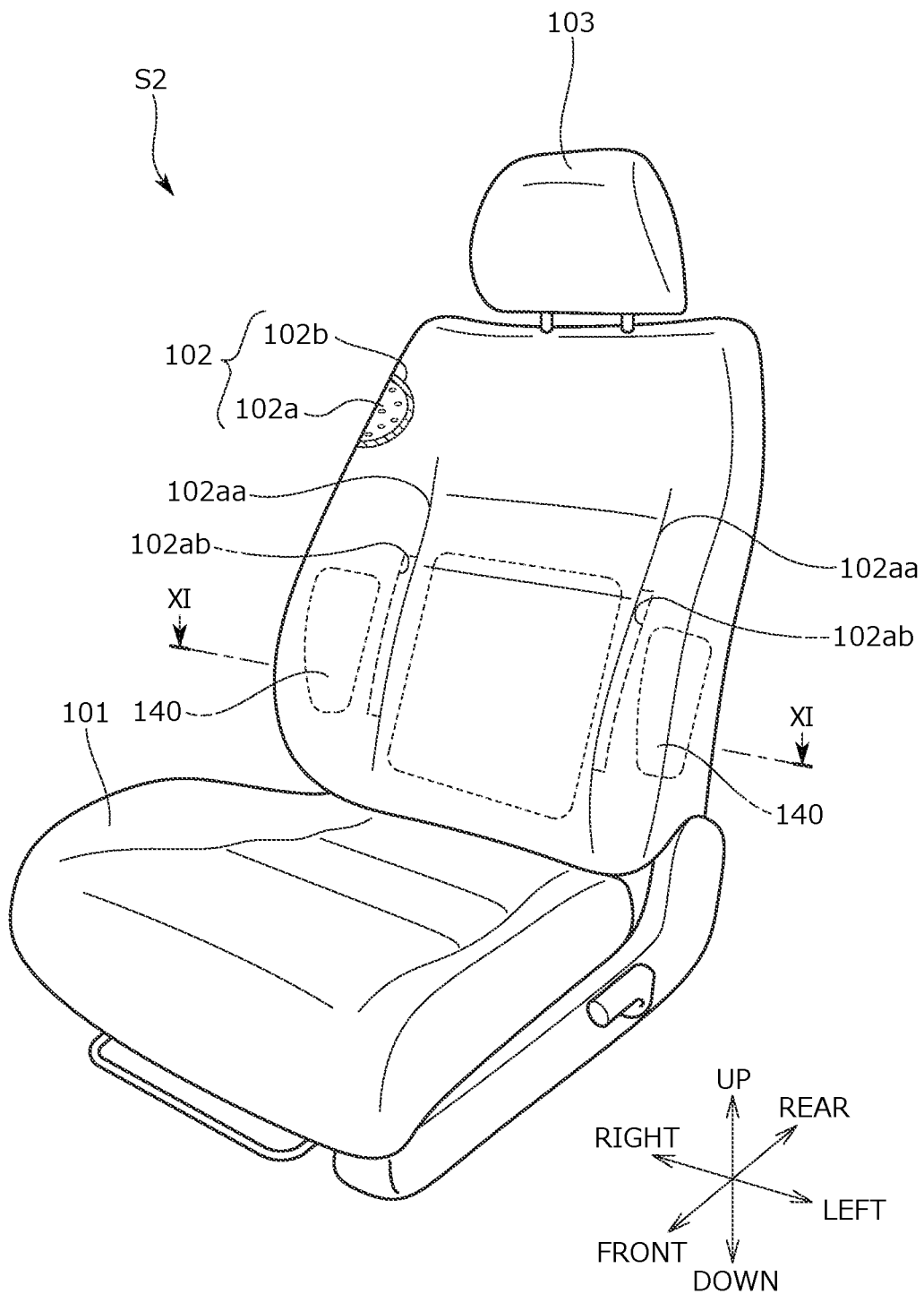
FIG. 10 is an external perspective view of a conveyance seat of a second embodiment.

The conveyance seat S2 includes, as shown in FIG. 10, a seat main body which includes a seat cushion 101, a seat back 102, and a headrest 103 and a movable body 140 (side support member).

Right and left pull-in grooves 102aa and right and left pull-in holes 102ab which extend in the up to down direction are formed on the surface of the cushion material 102a of the seat back 102 to separate the center portion 102A and the right and left side portions 102B.

A pull-in hole 102ab is a through hole which penetrates the cushion material 102a in the front to back direction of the seat, is formed at a position (overlapping position) corresponding to the movable body 140 in the up to down direction and the front to back direction of the seat, and extends to be elongated in the up to down direction.

Additionally, a pull-in groove 102aa is formed at a position above and below the pull-in hole 102ab and the pull-in groove 102aa and the pull-in hole 102ab are continuously formed in the up to down direction.

Figure 11:
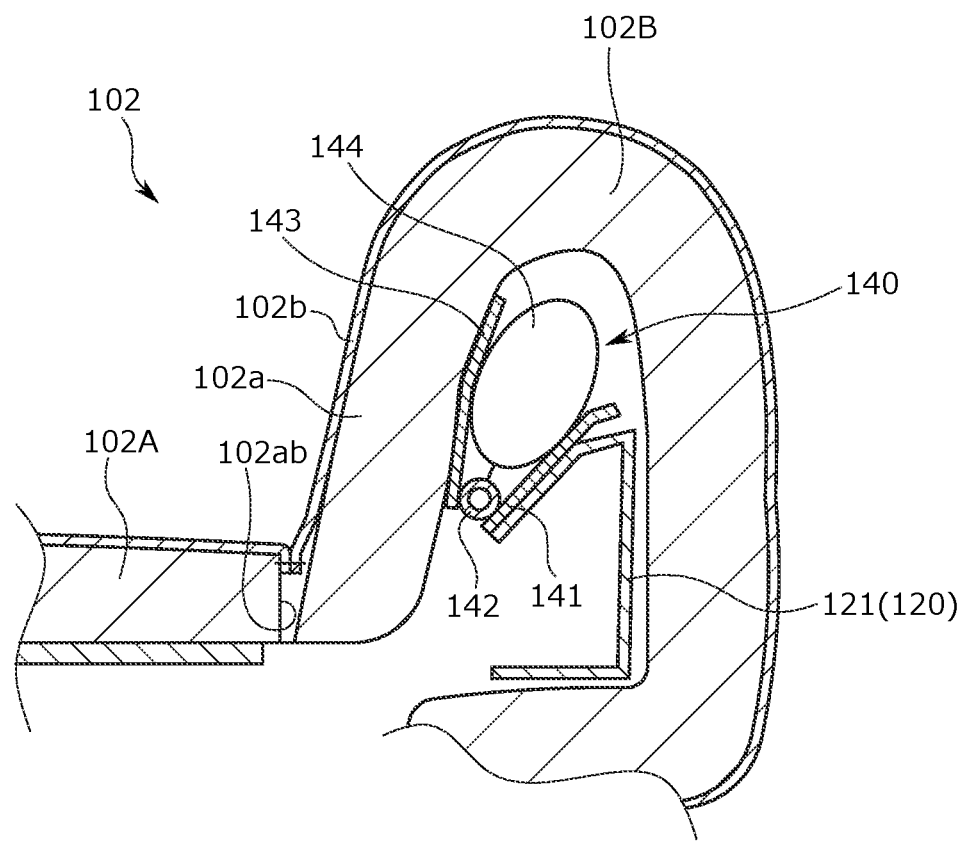
FIG. 11 is a cross-sectional view taken along a line XI-XI of FIG. 10 and is a cross-sectional view of a seat back.

The movable body 140 includes, as shown in FIG. 11, a base member 141 that is supported by a back side frame 121, a rotating member 143 that is rotatably attached to the base member 141 through a rotating shaft 142, and one bag body 144 which is disposed between the base member 141 and the rotating member 143 and is supported by the front surface of the base member 41.

FIG. 11 is a view showing a state in which the movable body 140 (bag body 144) protrudes toward the seat front side and the side portion 102B of the seat back 102 moves from the "normal position" to the "protruding position".

In the above-described configuration, as shown in FIG. 11, the pull-in hole 102ab is formed to become wider from the back surface toward the surface of the cushion material 102a.

In more detail, the inner surface located on the outside of the seat width direction in the inner surface of the pull-in hole 102ab spreads while being inclined from the back surface toward the surface of the cushion material 102a.

That is, the cushion material 102a (skin material 102b) of the center portion 102A of the seat back 102 and the cushion material 102a (skin material 102b) of the side portion 102B are arranged at slightly separated positions.

In this way, it is possible to suppress an unintended contact between the cushion materials 102a and between the skin materials 102b when the movable body 140 allows the side portion 102B to protrude toward the seat front side. As a result, it is possible to suppress wrinkles or the like from occurring on the skin material 102b at the boundary portion between the center portion 102A and the side portion 102B.

Further, the cushion material 102a can be easily bent without lowering the rigidity of the seat back 2.

Additionally, the pull-in hole 102ab does not necessarily have to be formed as a through hole, and may be formed as a hole having a greater depth than the pull-in groove 102aa, for example.

Fifth to Eighth Modified Examples of Movable Body

Next, fifth to eighth modified examples of the movable body will be described with reference to FIGS. 12A and 12B to FIG. 15.

Additionally, the description of the content that overlaps with the conveyance seat S2 described above will be omitted.

Figure 12A:
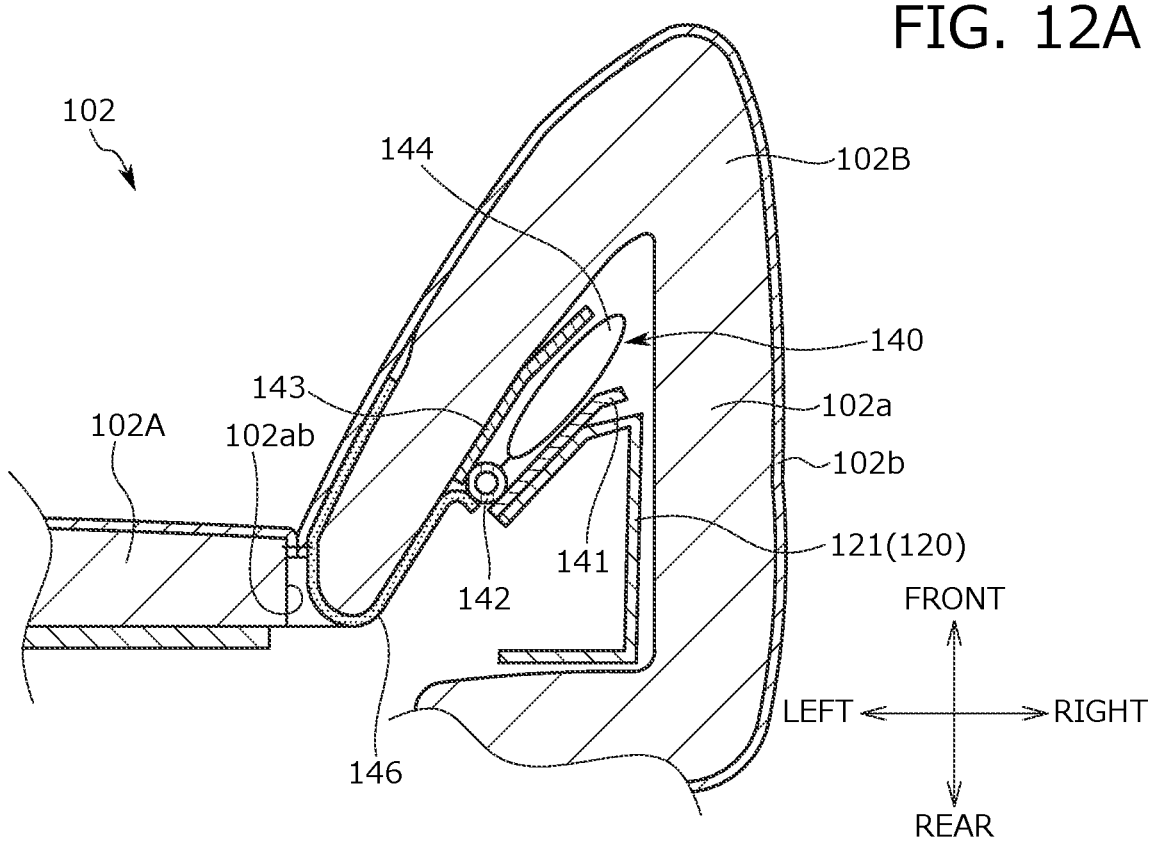
FIG. 12A is a view showing a fifth modified example of the movable body and is a cross-sectional view describing a state in which a side portion of the seat back is located at a "normal position".

The movable body 140 of the fifth modified example includes, as shown in FIG. 12A, the base member 141, the rotating member 143 that is rotatably attached to the base member 141 through the rotating shaft 142, and one bag body 144 which is disposed between the base member 141 and the rotating member 143.

Figure 12B:
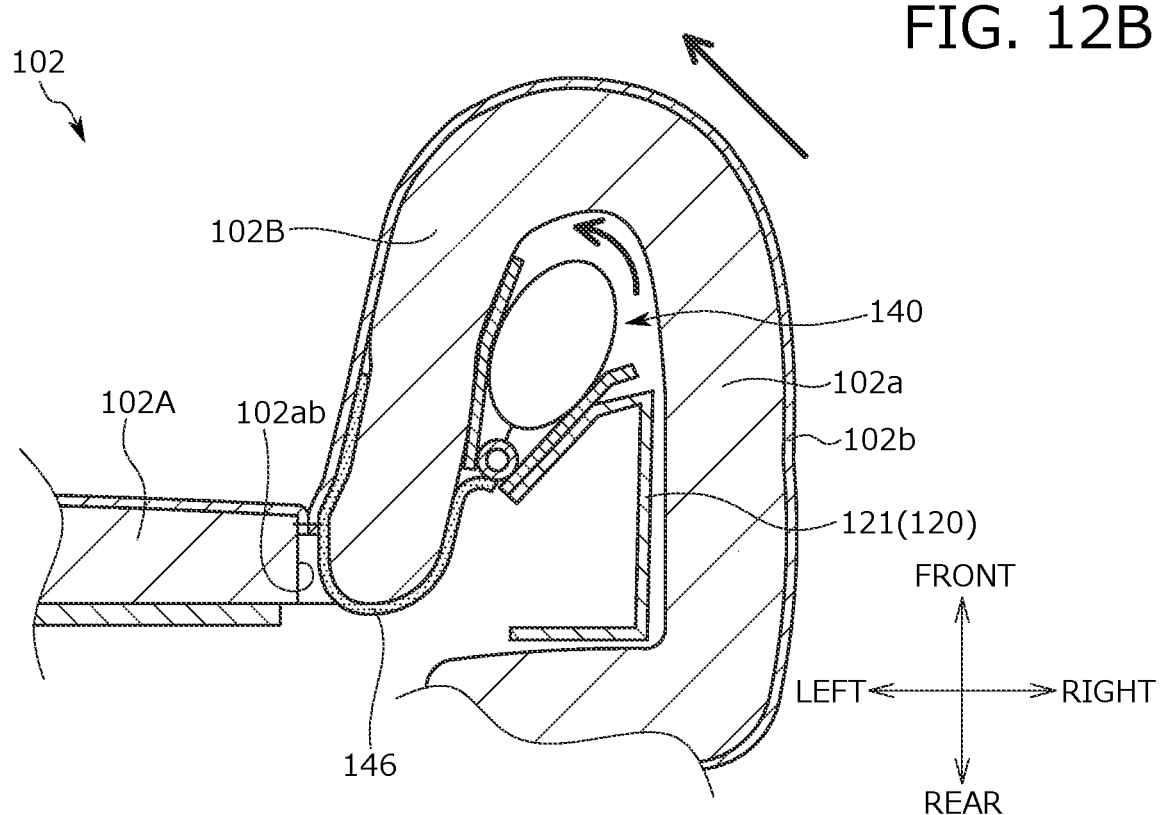
FIG. 12B is a cross-sectional view describing a state in which the side portion of the seat back is located at a "protruding position".

FIG. 12B is a view showing a state in which the movable body 140 protrudes toward the seat front side and the side portion 102B of the seat back 102 moves from the "normal position" to the "protruding position".

At the cross-sectional position shown in FIGS. 12A and 12B (the cross-sectional position in which the pull-in hole 102ab is formed), a cloth guide member 146 that guides the protruding direction of the side portion 102B is attached to the back surface of the skin material 102b of the side portion 102B.

In the guide member 146, one end portion is attached to the back surface of the skin material 102b by sewing and passes through the pull-in hole 102ab of the cushion material 102a and the other end portion is attached to the movable body 140 (rotating shaft 142).

With this configuration, it is possible to suppress the side portion 102B from unintentionally protruding toward the center portion 102A (inward in the seat width direction) when the side portion 102B of the seat back 102 protrudes toward the seat front side in accordance with the operation of the movable body 140.

As a result, it is possible to suppress wrinkles or the like from occurring on the skin material 102b at the boundary portion between the center portion 102A and the side portion 102B.

Figure 13:
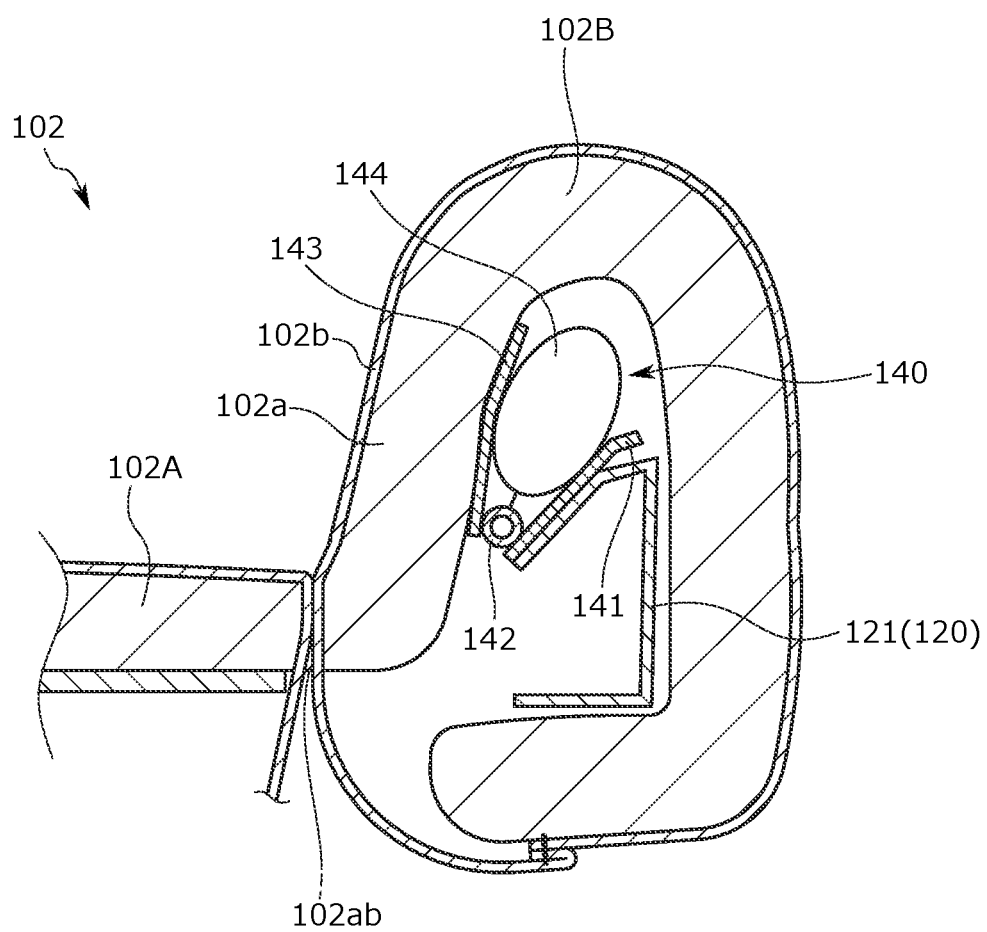
FIG. 13 is a view showing a sixth modified example of the movable body and is a cross-sectional view of the seat back.

The movable body 140 of the seventh modified example includes, as shown in FIG. 13, the base member 141, the rotating member 143 that is rotatably attached to the base member 141 through the rotating shaft 142, and one bag body 144 which is disposed between the base member 141 and the rotating member 143.

At the cross-sectional position shown in FIG. 13, the skin material 102b of the center portion 102A and the skin material 102b of the side portion 102B are formed to be separated from each other.

That is, the skin material 102b of the center portion 102A is formed to independently cover the cushion material 102a of the center portion 102A and the skin material 102b of the side portion 102B is formed to independently cover the cushion material 102a of the side portion 102B.

Instead of the skin material 102b, the cloth guide member 146 may be provided in a portion which passes through the pull-in hole 102ab of the cushion material 102a and wraps around the back surface of the cushion material 102a in the skin material 102b.

In this way, it is possible to suppress the side portion 102B from unintentionally protruding toward the center portion 102A when the side portion 102B of the seat back 102 protrudes toward the seat front side in accordance with the operation of the movable body 140.

As a result, it is possible to suppress wrinkles or the like of the skin material 102b from occurring at the boundary portion between the center portion 102A and the side portion 102B.

Further, it is possible to avoid an influence that the end portion of the skin material 102b stands out from the design surface at the boundary portion between the center portion 102A and the side portion 102B.

Figure 14:
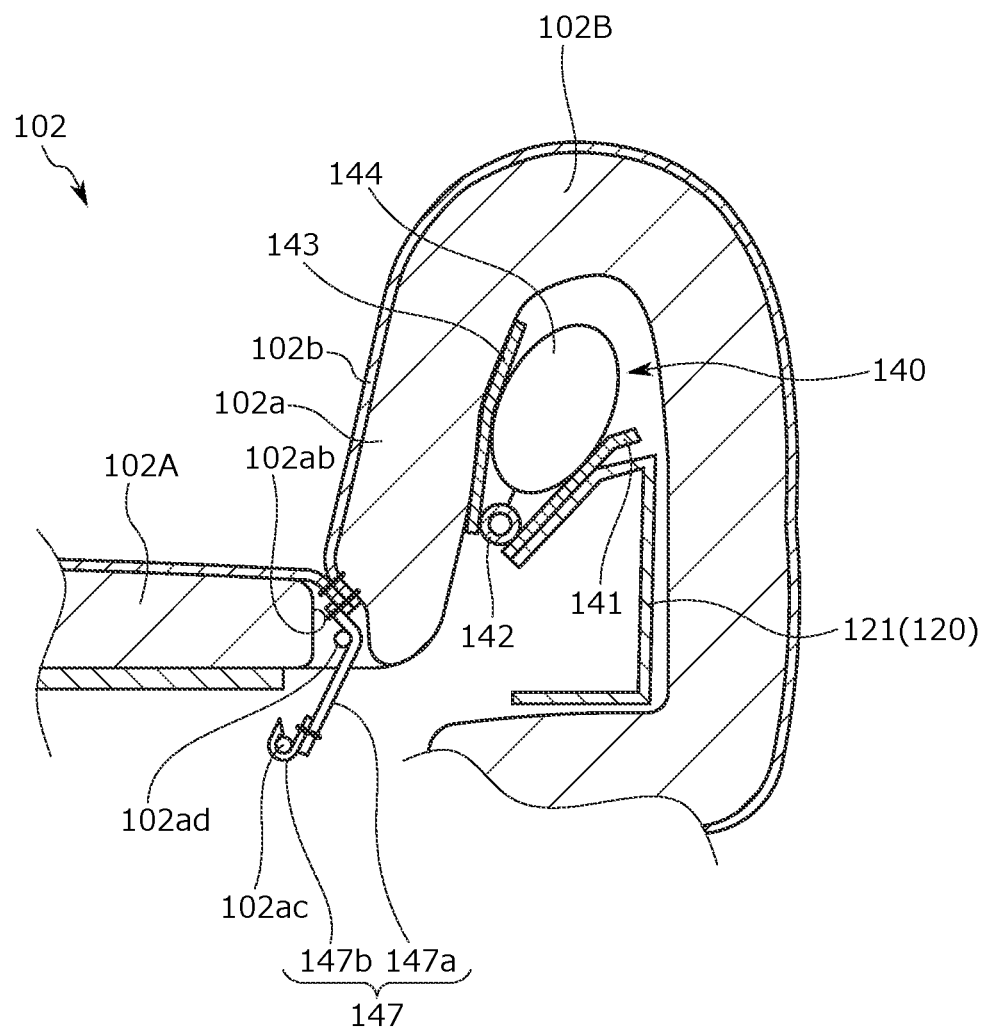
FIG. 14 is a view showing a seventh modified example of the movable body and is a cross-sectional view of the seat back.

The movable body 140 of the eighth modified example includes, as shown in FIG. 14, the base member 141, the rotating member 143 that is rotatably attached to the base member 141 through the rotating shaft 142, and one bag body 144 which is disposed between the base member 141 and the rotating member 143.

At the cross-sectional position shown in FIG. 14, a skin material pull-in portion 147 which passes through the pull-in hole 102*ab* and is hooked to a hooking wire 102*ac* (hook portion) provided inside the seat back 102 is attached to the end portion of the skin material 102*b*.

The skin material pull-in portion 147 is hooked to the hooking wire 102*ac* while being pulled outward in the seat width direction by a pulling wire 102*ad* (pulling portion) provided inside the seat back 102.

Specifically, the skin material pull-in portion 147 includes a cloth pull-in main body 147*a* which is attached to the end portion of the skin material 102*b* and extends from the end portion to pass through the pull-in hole 102*ab* and a pull-in hook 147*b* which is attached to the extension end portion of the pull-in main body 147*a*.

The pull-in main body 147*a* is supported by the pulling wire 102*ad* provided inside the cushion material 102*a* and is pulled outward in the seat width direction.

The pull-in hook 147*b* is hooked to the hooking wire 102*ac* which is disposed at the seat rear position in relation to the pulling wire 102*ad* and is disposed on the inside of the seat width direction.

With the above-described configuration, the tension of the skin material 102*b* can be increased and wrinkles or the like can be suppressed from occurring on the skin material 102*b* even when the movable body 140 is operated. Particularly, the tension of the skin material 102*b* of the center portion 102A in the seat width direction can be increased and wrinkles or the like of the skin material 102*b* can be further suppressed from occurring at the boundary portion between the center portion 102A and the side portion 102B.

Figure 15:
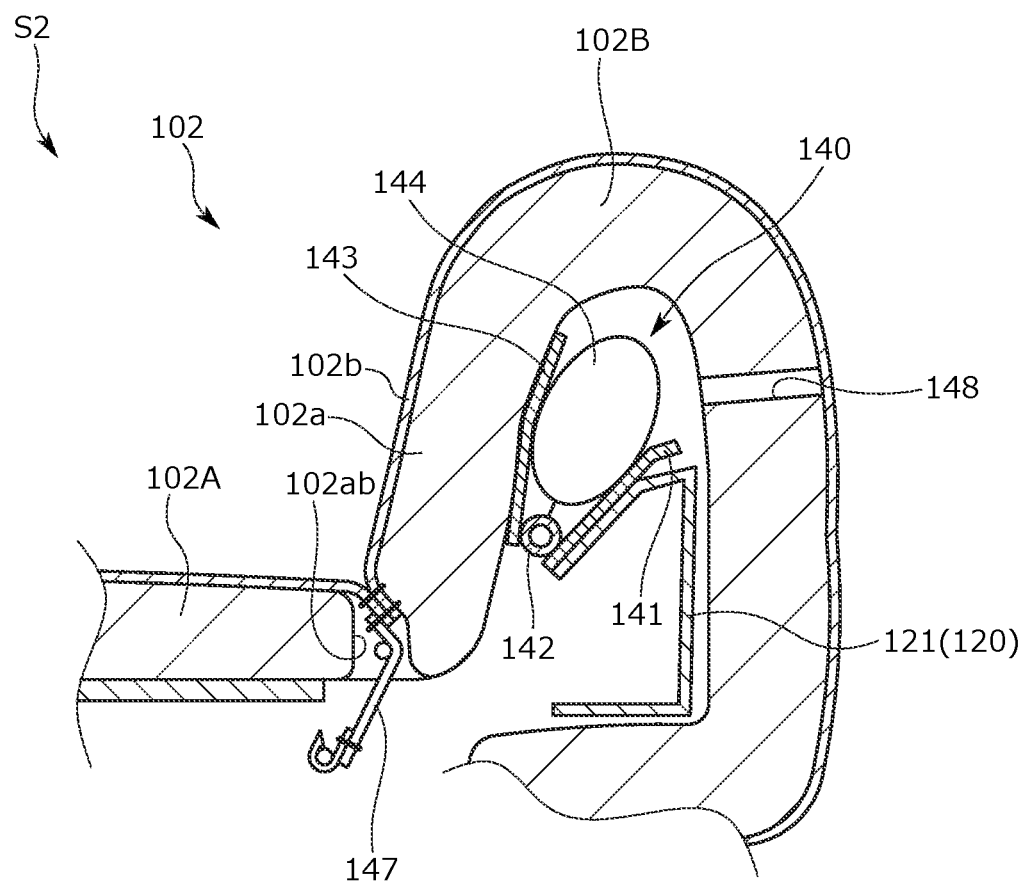
FIG. 15 is a view showing an eighth modified example of the movable body and is a cross-sectional view of the seat back.

The movable body 140 of the ninth modified example includes, as shown in FIG. 15, the base member 141, the rotating member 143 that is rotatably attached to the base member 141 through the rotating shaft 142, and one bag body 144 which is disposed between the base member 141 and the rotating member 143.

At the cross-sectional position shown in FIG. 15, the skin material pull-in portion 147 is attached to the end portion of the skin material 102*b* similarly to the eighth modified example.

Further, a through hole 148 which penetrates from the outer surface of the cushion material 102*a* to the inner space is formed on the outer surface of the cushion material 102*a* in the side portion 102B.

The through hole 148 is disposed at a position overlapping the movable body 140 in the front to back direction of the seat and extends to be elongated in the up to down direction.

Since the through hole 148 is formed as described above, the cushion material 102*a* of the side portion 102B is preferably easily bent.

Therefore, the movable body 140 allows the cushion material 102*a* of the side portion 102B to easily protrude and an unnecessary force is not applied to the skin material 102*b* of the seat back 102. As a result, it is easy to suppress wrinkles or the like from occurring on the skin material 102*b*.

Third Embodiment of Conveyance Seat

Next, a conveyance seat S3 of a third embodiment will be described with reference to FIGS. 16 to 22C.

Additionally, the description of the content that overlaps with the conveyance seats S1 and S2 described above will be omitted.

Figure 16:
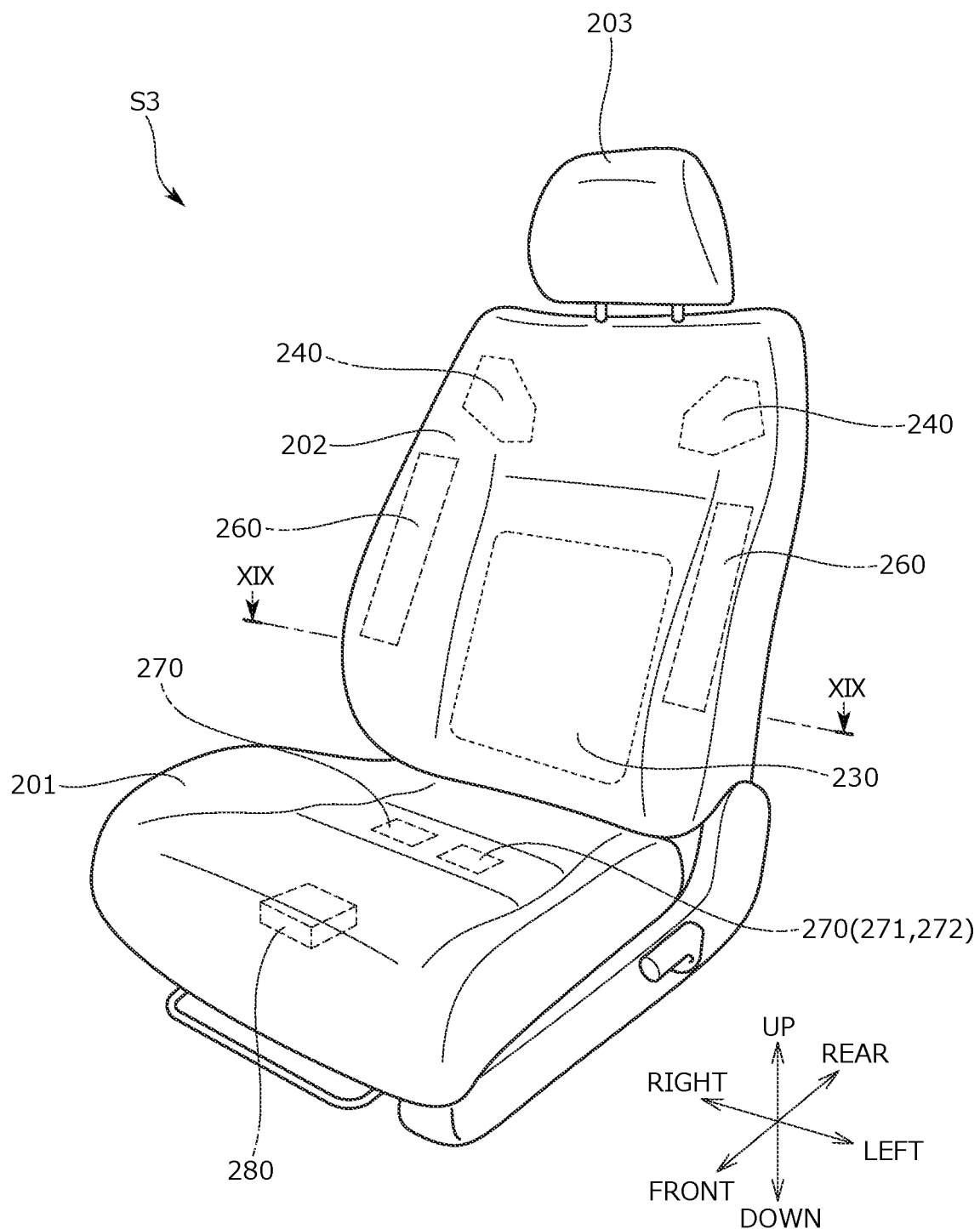
FIG. 16 is an external perspective view of a conveyance seat of a third embodiment.
Figure 17:
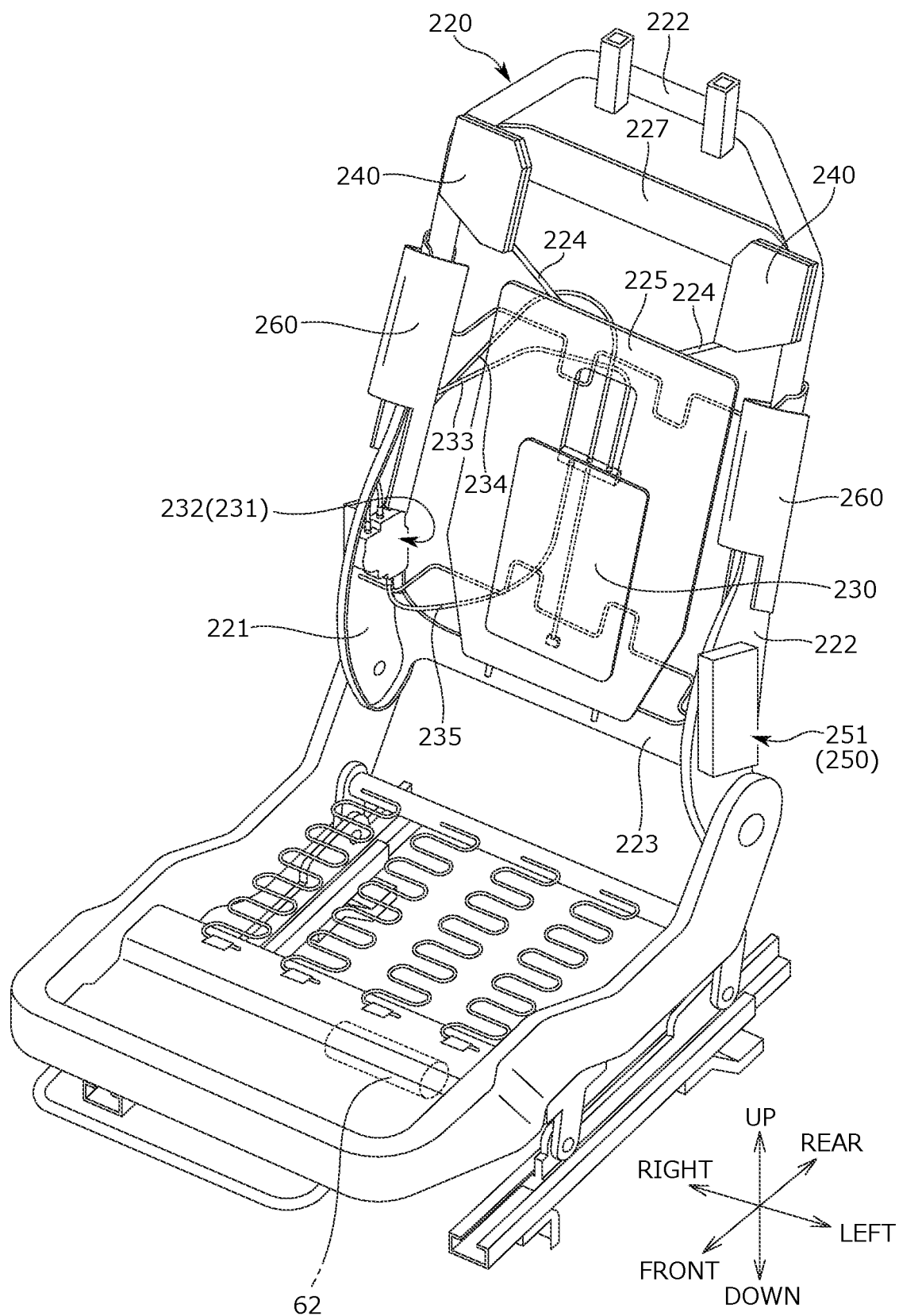
FIG. 17 is a perspective view showing a seat frame serving as a framework.

The conveyance seat S3 includes, as shown in FIGS. 16 and 17, a seat main body which includes a seat cushion 201, a seat back 202, and a headrest 203, a lumbar support member 230 that is attached inside the seat back 202 and is operated so that a center portion 202A of the seat back 202 protrudes from the normal position toward the seated occupant side, a driving device 231 (actuator) which drives the lumbar support member 230, a movable body 240 (shoulder support member) which is attached inside the seat back 202 and is operated so that the side portion 2B of the seat back 2 protrudes from the normal position toward the seated occupant side, and an operating device 250 (fluid supply device) which is operated so that the movable body 240 is operated.

Further, the conveyance seat S3 includes side support members 260 that are arranged on the right and left sides of the seat back 202 and support the seated occupant from the side of the seat width direction, a sheet-shaped seating sensor 270 which is attached inside the seat cushion 201 and detects an electrical signal (biological signal) according to the biopotential of the seated occupant, and a control device 280 which receives the biological signal detected by the seating sensor 270 and transmits the received biological signal to the outside.

The back frame 220 consists of, as shown in FIG. 17, a rectangular frame-shaped body and mainly includes back side frames 221 which are arranged on the right and left sides, an inverted U-shaped upper frame 222 which connects the upper end part of each back side frame 221, a plate-shaped lower frame 223 which connects the lower end part of each back side frame 21, a plate-shaped connection frame 227 (cross member) which connects the right and left extending portions of the upper frame 222, right and left wire members 224 (elastic wires) which are respectively hooked to the connection frame 227 and the lower frame 223 and extend in the up to down direction, and a support plate 225 which is held by the right and left wire members 224 and supports the seated occupant.

In the above-described configuration, as shown in FIG. 17, the lumbar support member 230 is attached to the front surface of the support plate 225 and the driving device 231 which drives the lumbar support member 230 is attached to the inner surface of the right back side frame 221.

Further, the right and left movable bodies 240 are attached to the front surfaces of the upper parts of the right and left wire members 224 and the operating device 250 for operating the movable body 240 is attached to the outer surface of the left back side frame 221.

Further, the right and left side support members 260 are attached to the front surfaces of the right and left back side frames 221.

The lumbar support member 230 is, as shown in FIG. 17, a lumbar support member that is disposed at the lower part of the seat back 202 and supports the lumbar of the seated occupant.

The lumbar support member 230 is a member that is disposed between a cushion material 202*a* and the support plate 225 and is operated so that the center portion 202A (cushion material 202*a*) of the seat back 202 protrudes toward the seated occupant side.

Specifically, the lumbar support member 230 is a substantially rectangular movable plate which is supported by the front surface of the support plate 225 and can be curved to protrude toward the seat front side.

The lumbar support member 230 has a flat plate shape and is attached to the front surface of the support plate 225. When the driving device 231 is driven, the lumbar support member is curved to be bent in the up to down direction and the center portion 202A of the seat back 202 can protrude toward the seat front side.

The driving device 231 is, as shown in FIG. 17, an actuator which is fixed to the inner surface of the back side frame 221 and is driven so that the movable body 240 is operated in the front to back direction of the seat and the up to down direction.

Specifically, the driving device 231 includes a driving main body portion 232 and a plurality of cables 233, 234, and 235 which connect the driving main body portion 232 and the lumbar support member 230 and operate the lumbar support member 230 in accordance with the operation of the driving main body portion 232.

The first cable 233 extends upward from the upper end portion of the driving main body portion 232, is curved to wrap around the back surface of the support plate 225, extends downward, and is connected to the back surface of the lower end portion of the lumbar support member 230.

When the first cable 233 is pulled along with the driving of the driving main body portion 232, the lumbar support member 230 is curved to be bent in the up to down direction and can be operated toward the seat front side. Further, the lumbar support member 230 can return to the flat plate shape by releasing the pulling of the first cable 233.

The second cable 234 extends from the upper end portion of the driving main body portion 232 toward the seat rear side, is curved to wrap around the back surface of the support plate 225, extends inward in the seat width direction, and is connected to the back surface of the upper end portion of the lumbar support member 230.

Further, the third cable 235 extends from the lower end portion of the driving main body portion 232 toward the seat rear side, is curved to wrap around the back surface of the support plate 225, extends inward in the seat width direction, and is connected to the back surface of the upper end portion of the lumbar support member 230.

When the second cable 234 and the third cable 235 are pulled along with the driving of the driving main body portion 232, the lumbar support member 230 can be operated upward. Further, the lumbar support member 230 can be operated downward by releasing the pulling of the second and third cables 234 and 235.

The movable body 240 includes, as shown in FIG. 17 to FIGS. 19A and 19B, a bag body (air cell) and is operated to inflate toward the seated occupant side (to protrude from the normal position toward the protruding position) when compressed air is enclosed in the bag body as a fluid and to contract (to return to the normal position) when the enclosed compressed air is discharged from the bag body.

Specifically, the movable body 240 is a shoulder support member that is attached to the back surface of the cushion material 202a in a side portion 202B of the upper part of the seat back 202 and is operated so that the side portion 202B protrudes toward the seated occupant side.

The movable bodies 240 are arranged on the right and left sides with a predetermined gap therebetween in the seat width direction and are respectively attached to the front surfaces of the wire member 224 and the upper frame 222.

Additionally, the movable body 240 is attached in a folded state.

The movable body 240 has a substantially pentagonal shape elongated in the seat width direction and extends to protrude outward in the seat width direction from the wire member 224.

In more detail, the movable body 240 mainly includes a base member 241 that is supported by the wire member 224 and the upper frame 222, a rotating member 243 that is disposed at the front position in relation to the base member 241 and is rotatably attached to the base member 241 through the rotating shaft 242, and a bag body 244 which is supported by the front surface of the base member 241.

The base member 241 is a plate member that is elongated in the seat width direction and is bridged (connected) between the front surface of the wire member 224 and the front surface of the upper frame 222.

The rotating shaft 242 is attached to the inner end portion of the front surface of the base member 241 in the seat width direction. In other words, the rotating shaft is attached to an overlapping portion of the base member 241 and the wire member 224.

The rotating member 243 is attached to the base member 241 to be rotatable in the front to back direction of the seat and is rotated toward the seat front side so that the side portion 202B of the seat back 202 can protrude toward the seat front side.

The bag body 244 is supported by the base member 241 and inflates toward the seat front side when compressed air is enclosed so that the rotating member 243 can be pushed out toward the seat front side.

Figure 19A:
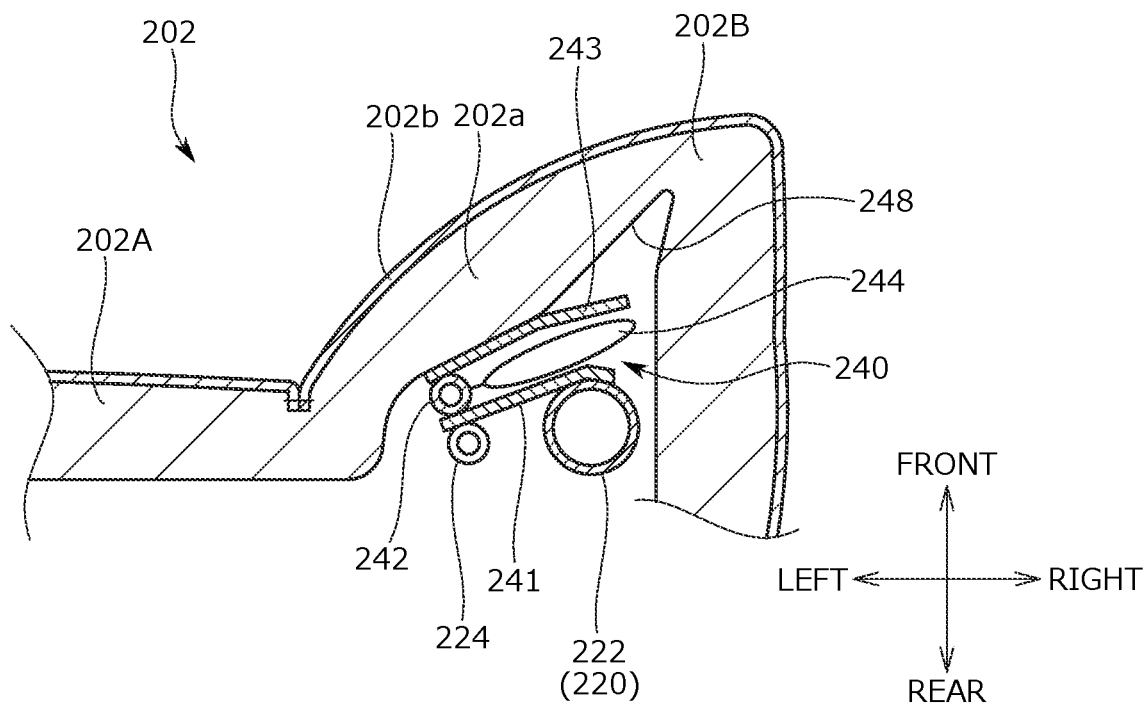
FIG. 19A is a cross-sectional view taken along a line XIX-XIX of FIG. 16 and is a view describing a state in which a side portion of a seat back is located at a "normal position".
Figure 19B:
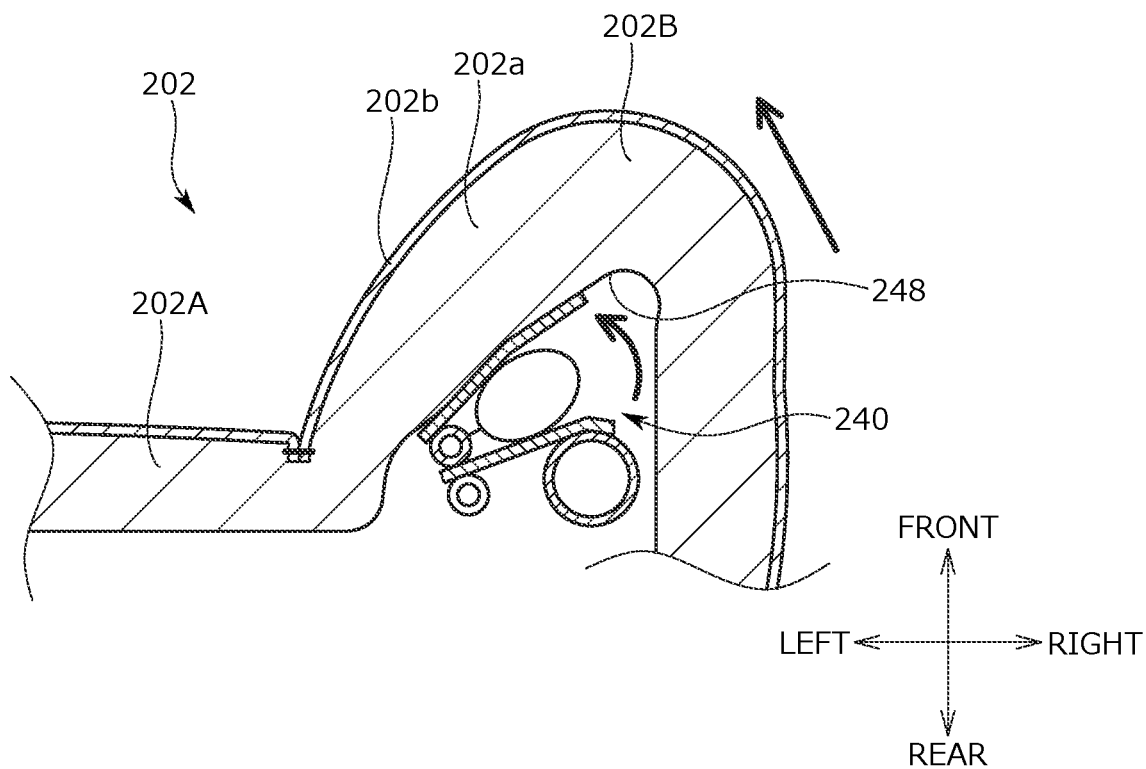
FIG. 19B is a view describing a state in which the movable body is operated and the side portion of the seat back is located at a "protruding position".

FIG. 19B is a view showing a state in which the movable body 240 (rotating member 243) protrudes toward the seat front side and the side portion 202B of the seat back 202 moves from the "normal position" to the "protruding position".

Specifically, when compressed air is supplied from the operating device 250, the folded bag body 244 inflates and deploys toward the seat front side and the rotating member 243 is pushed out toward the seat front side, so that the side portion 202B moves toward the seat front side. As a result, the side portion 202B moves to the "protruding position".

Figure 18:
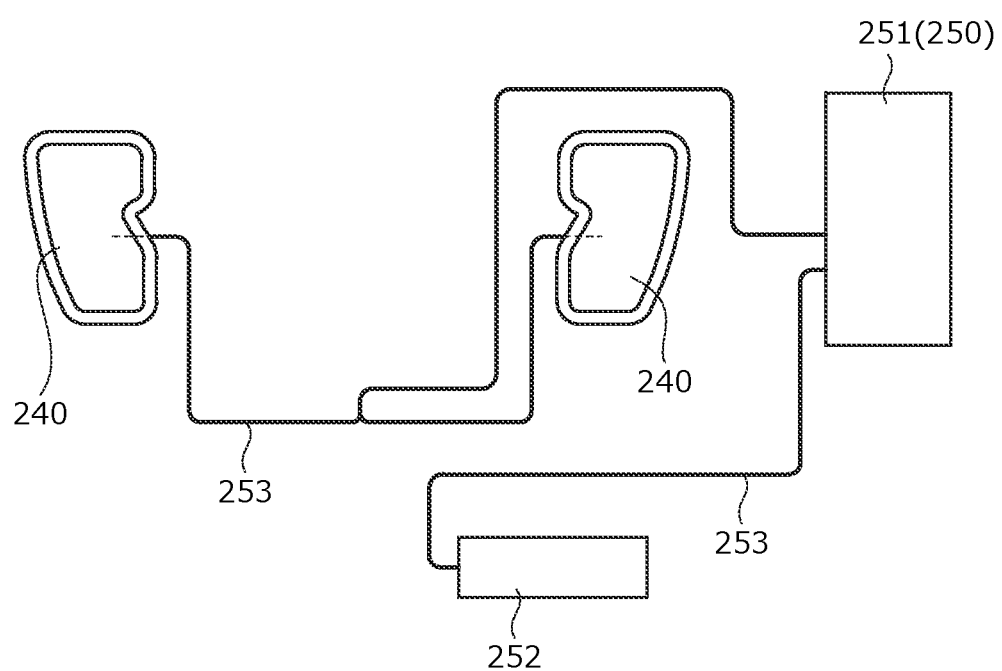
FIG. 18 is a schematic view showing a movable body and an operating device.

Additionally, the operating device 250 mainly includes, as shown in FIGS. 17 and 18, an air control unit 251 which is attached to the outer surface of the back side frame 21, an air pump 252, and an air pipe 253 which connects the air pump 252 and the movable body 240.

In the above-described configuration, as shown in FIGS. 19A and 19B, a cushion deformation prompting portion 248 (cushion thin-walled portion) for prompting the deformation of the cushion material 202a is formed in a portion located on the front side of the movable body 240 in the back surface of the cushion material 202a.

The cushion deformation prompting portion 248 is a cushion thin portion which is provided on the back surface of the cushion material 202a, is disposed at the seat front position in relation to the movable body 240, and is slightly disposed on the outside of the seat width direction in relation to the movable body 240.

Therefore, the cushion material 202a of the side portion 202B is preferably easily bent and the movable body 240 allows the cushion material 202a of the side portion 202B to easily protrude. As a result, an unnecessary force is not applied to the skin material 202b of the seat back 202 and wrinkles or the like can be suppressed from occurring on the skin material 202b.

The cushion deformation prompting portion 248 is formed at a position (overlapping position) corresponding to the extension end portion of the rotating member 243 and is formed along the extension end portion of the rotating member 243.

Therefore, the degree of freedom of deformation of the portion of the cushion material 202a that faces the rotating member 243 can be locally increased. As a result, it is possible to adjust the shape of the seat back 202 to absorb the difference in the physique of the seated occupant.

Particularly, since the cushion deformation prompting portion 248 is formed at the side portion 202B in which a gap is likely to occur due to the difference in physique of the seated occupant, the movable body 240 can be operated to preferably absorb the difference in physique of the seated occupant.

Figure 20:
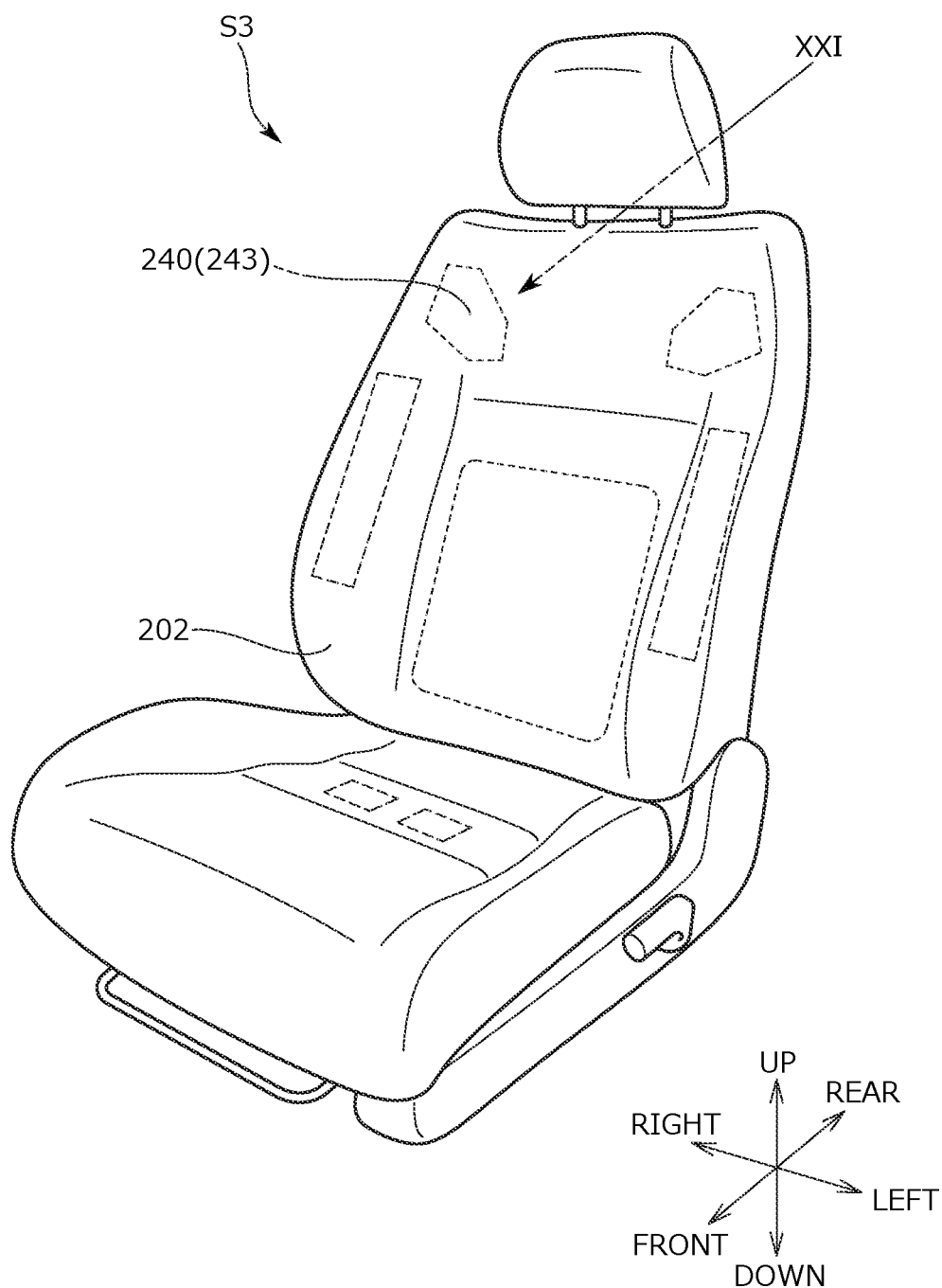
FIG. 20 is an external perspective view of the conveyance seat.
Figure 21:
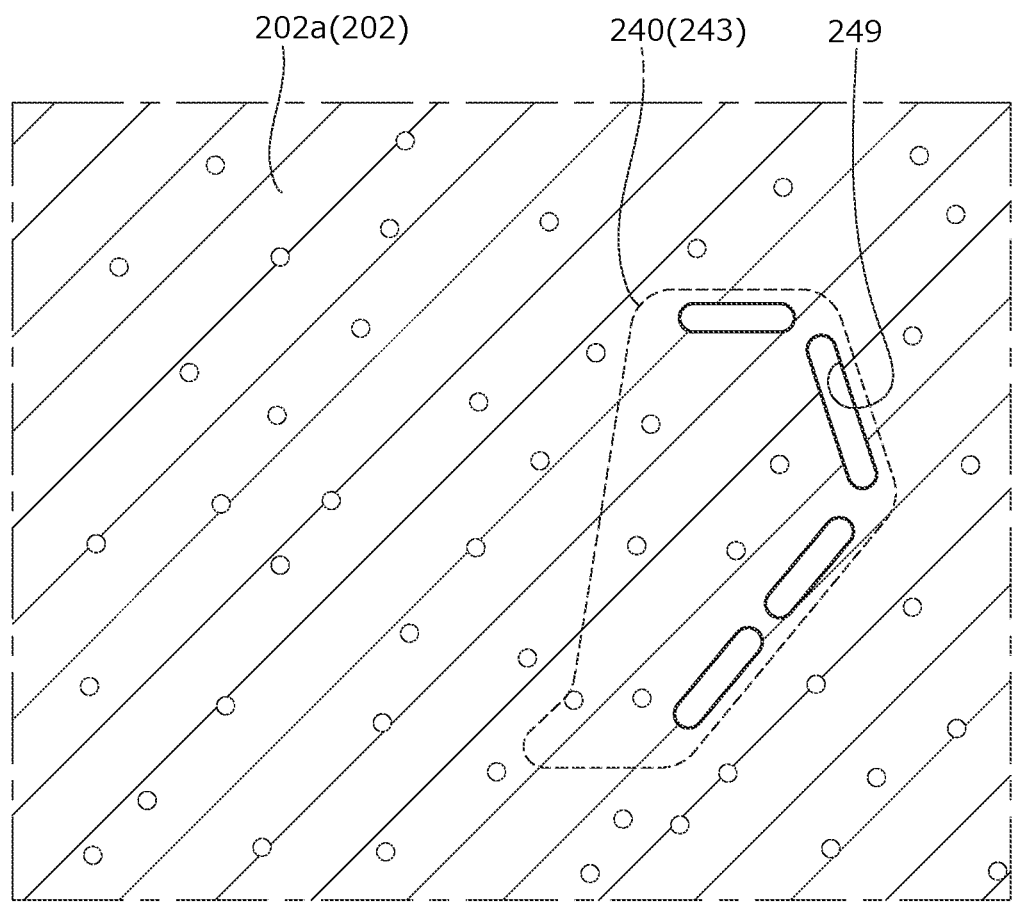
FIG. 21 is a view on an arrow XXI of FIG. 20 and is a main enlarged view showing a slit portion.

Further, in the above-described configuration, as shown in FIGS. 20 and 21, a slit hole 249 is formed at a position (facing position) corresponding to the movable body 240 (rotating member 243) in the back surface of the cushion material 202a along the outer shape of the rotating member 243.

A plurality of the slit holes 249 are formed along the outer edge of the rotating member 243 at a predetermined interval. In other words, the slit holes extend discontinuously along the outer edge of the rotating member 243.

Therefore, the degree of freedom of deformation of the portion of the cushion material 202a that faces the rotating member 243 can be locally increased. As a result, it is possible to adjust the shape of the seat back 202 to absorb the difference in physique of the seated occupant. Further, it is possible to operate the movable body 240 to absorb the difference in physique of the seated occupant.

A side support member 260 is, as shown in FIG. 17 and FIGS. 22A, 22B, and 22C, a member that extends to be elongated in the up to down direction along the back side frame 221 and holds the seated occupant against an external force applied from the side of the seat width direction and is formed of, for example, a resin material.

The side support member 260 mainly includes an inner wall portion 261 which is disposed on the inside of the back side frame 221 and the upper frame 222, an outer wall portion 262 which is disposed on the outside of the back side frame 221 and the upper frame 222, a connection wall portion 263 which is disposed on the front side of the back side frame 221 and the upper frame 222 and connects the inner wall portion 261 and the outer wall portion 262, and a plurality of reinforcement ribs 264 which are surrounded by the inner wall portion 261, the outer wall portion 262, and the connection wall portion 263 and connect the inner wall portion 261, the outer wall portion 262, and the connection wall portion 263.

The inner wall portion 261 has a curved shape and is formed so that a gap with respect to the outer wall portion 262 becomes wider as it goes from the front end portion toward the rear end portion. In other words, the inner wall portion extends toward the seat rear side while being inclined inward in the seat width direction.

The outer wall portion 262 has a substantially flat plate shape and extends to be elongated in the up to down direction from the inner wall portion 261.

The connection wall portion 263 has a curved shape curved toward the seat front side and is disposed so that the front end portion of the inner wall portion 261 is connected to the front end portion of the upper part of the outer wall portion 262.

The plurality of reinforcement ribs 264 have a flat plate shape and are arranged at a predetermined interval in the up to down direction in a region surrounded by the inner wall portion 261, the outer wall portion 262, and the connection wall portion 263.

Additionally, the length of the reinforcement rib 264 in the front to back direction of the seat is formed to be shorter than those of the inner wall portion 261 and the outer wall portion 262. Then, a predetermined space is formed between the inner wall portion 261 and the outer wall portion 262 at the rear position of the reinforcement rib 264. A portion formed by connecting the back side frame 221 and the upper frame 222 is accommodated in that space.

Figure 22A:
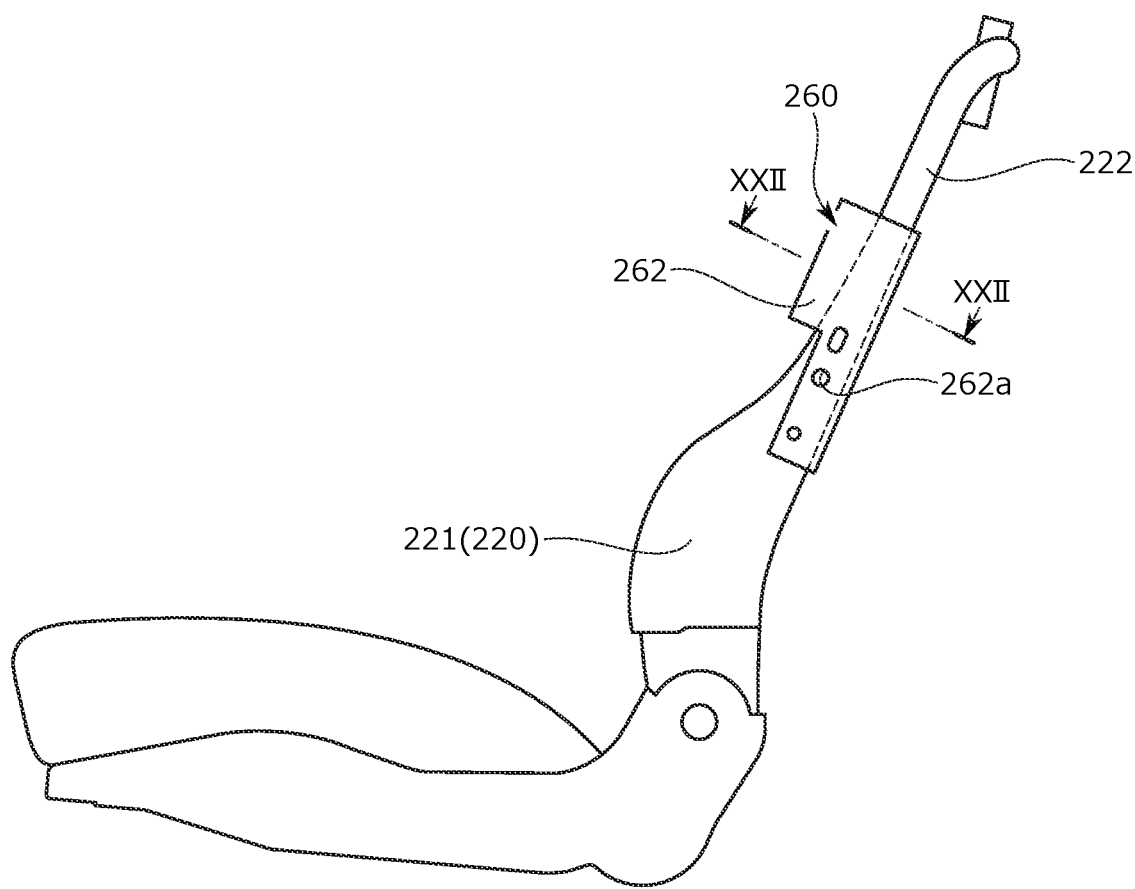
FIG. 22A is a side view showing a side frame and a side support member.
Figure 22B:
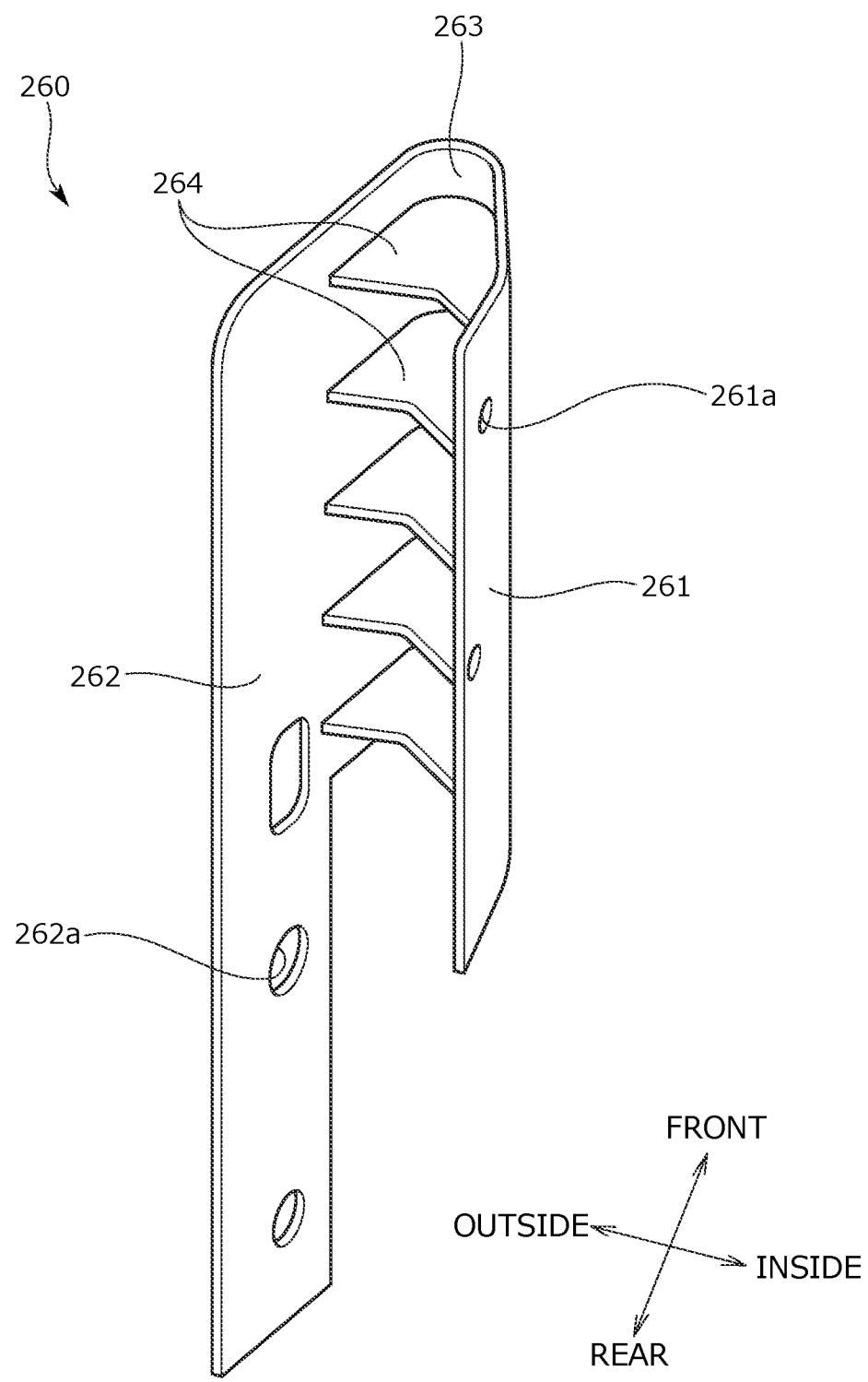
FIG. 22B is a perspective view of the side support member.

As shown in FIGS. 22A, 22B, and 22C, a frame attachment hole 261a for attaching to an attachment hole 222a (covering portion) provided on the inner surface of the back frame 220 (upper frame 222) is provided on the side surface of the inner wall portion 261.

A plurality of frame attachment holes 261a are arranged at a predetermined interval in the up to down direction.

In more detail, an attachment member 265 is attached while the attachment hole 222a and the frame attachment hole 261a communicate with each other.

Frame attachment holes 262a are also formed on the outer surface of the outer wall portion 262 at a predetermined interval in the up to down direction.

In the above-described configuration, as shown in FIG. 17, the movable body 240 and the side support member 260 are arranged at different positions (non-overlapping positions) in the up to down direction and are arranged at an overlapping position in the seat width direction.

In this way, it is possible to avoid the interference between the movable body 240 and the side support member 260 when the movable body 240 is operated. Further, the seated occupant can be preferably held by the side portion 202B of the seat back 202.

Additionally, the positional relationship between the movable body 240 and the side support member 260 may be appropriately changed in addition to the above-described positional relationship.

For example, the movable body 240 and the side support member 260 may be arranged at different positions (non-overlapping positions) in the seat width direction and may be arranged at an overlapping position in the up to down direction.

Even in that case, it is possible to avoid the interference between the movable body 240 and the side support member 260 and to preferably hold the seated occupant by the side portion 202B.

At this time, the front surface of the movable body 240 and the front surface of the side support member 260 may be configured to form a projecting surface (protruding surface) substantially equal to the back frame 220. In other words, the front surface of the movable body 240 and the front surface of the side support member 260 may form the same plane.

In this way, it is possible to more preferably hold the seated occupant.

The seating sensor 270 is, as shown in FIG. 17, a sheet-shaped pressure sensor which detects a seating pressure applied to the seating surface of the seat cushion 201 when the occupant sits on the seat main body and is attached between the cushion material 201a and the skin material 201b.

A plurality of the seating sensors 270 are attached to a center portion of a cushion center portion 201A at a predetermined interval.

Specifically, the seating sensor 270 includes a sensor detection unit 271 which detects the seating pressure of the seated occupant and a transmission path 272 which outputs a detection signal when the sensor detection unit 271 detects the seating pressure.

The sensor detection unit 271 is a pressure sensitive switch bonded to the conductive sheet.

The transmission path 272 is formed by bonding a conductive line serving as a transmission path onto a conductive sheet.

The control device 280 is, as shown in FIG. 17, a device which processes a detection signal detected by the seating sensor 270 and is attached to the bottom surface of the cushion frame 210 through a holder (not shown).

The control device 280 includes a communication unit which receives a detection signal detected by the seating sensor 270 and wirelessly transmits the detection signal to the outside and a control unit which performs a process of transmitting the detection signal detected by the seating sensor 270 to the communication unit.

The communication unit uses wireless communication technology to connect to an external terminal to transmit and receive electrical signals (data signals).

The control unit corresponds to a microcomputer and comprehensively executes electrical control.

In the above-described configuration, the control device 280 is connected to the driving device 231 and the operating device 250 via a network, receives a detection signal from the seating sensor 270, and controls the driving of the driving device 231 and the operation of the operating device 250.

The control device 280 can adjust the movable amount (protruding amount) of the lumbar support member 230 by controlling the driving device 231. Further, it is possible to adjust the movable amount (protruding amount) of the movable body 240 by controlling the operating device 250.

Specifically, when the control device 280 determines that the occupant does not sit on the seat main body on the basis of the detection signal of the seating sensor 270, the movable amount of the movable body 240 is adjusted to be limited (the movable amount of the movable body 240 is reduced and the movable body 240 is returned to the normal position).

Further, when the control device 280 determines that the occupant does not sit on the seat main body, the movable amount of at least one of (or both) the lumbar support member 230 and the movable body 240 is limited.

When the control device 280 determines the seated occupant performs an elevating operation on the basis of the detection signal of the seating sensor 270, the movable amount of at least one of (or both) the lumbar support member 230 and the movable body 240 is limited.

Further, when it is determined that the occupant does not sit on the seat main body on the basis of the detection signal of the seating sensor 270 and the lumbar support member 230 is already operated toward the seat front side, the control device 280 limits the movable amount of the movable body 240 as compared with a case in which the lumbar support member 230 is not operated (the movable amount of the movable body 240 is further reduced and the movable body 240 is returned to the normal position).

Further, when it is determined that the seated occupant performs an elevating operation on the basis of the detection signal of the seating sensor 270 and the lumbar support member 230 is already operated toward the seat front side, the control device 280 limits the movable amount of the movable body 240 as compared with a case in which the lumbar support member 230 is not operated.

As described above, it is possible to further enhance the sitting feeling of the seated occupant in such a manner that the control device 280 controls the driving device 231 and the operating device 250.

Fourth Embodiment of Conveyance Seat

Next, a conveyance seat S4 of a fourth embodiment will be described with reference to FIG. 23 to FIGS. 27A and 27B.

Additionally, the description of the content that overlaps with the conveyance seats S1 to S3 described above will be omitted.

Conventionally, a vehicle seat including a cushion length adjusting device capable of adjusting the length of a seat cushion in the front to back direction of the seat is known.

For example, the vehicle seat described in Patent Literature (JP 2015-47384 A) includes a cushion length adjusting device including a plurality of bag bodies (air cells) and adjusting the length of the seat cushion when compressed air is enclosed in the bag body or compressed air is discharged from the bag body.

In such a case, it was necessary to preferably dispose an air pipe supplying and discharging compressed air into and from the bag body inside the seat main body. For example, it has been necessary to prevent damage to the air pipe and generation of contact noise due to contact between the air pipe and other components.

Here, the conveyance seat S4 realizes a conveyance seat including a cushion length adjusting device capable of preferably disposing an air pipe inside a seat main body.

Figure 23:
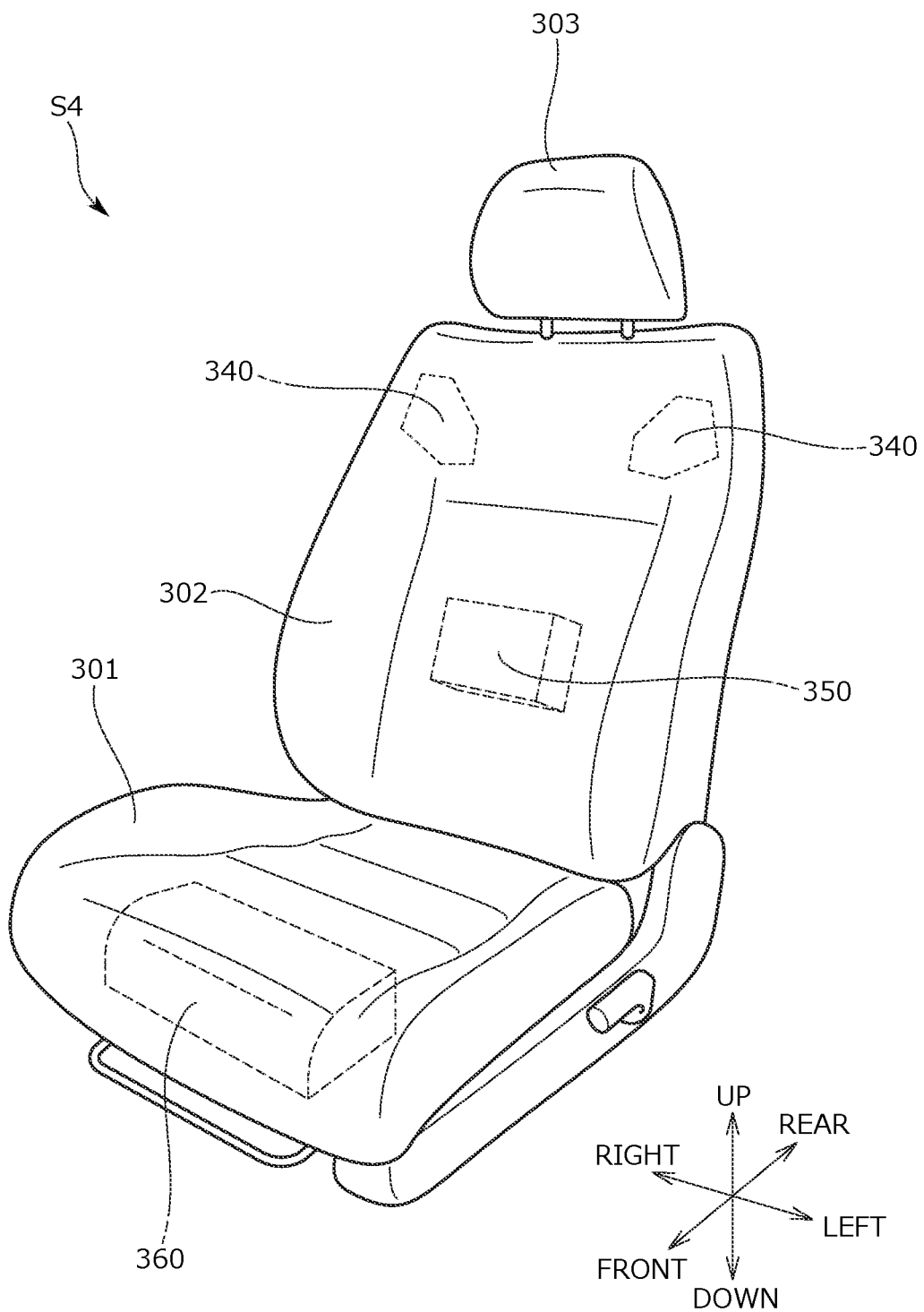
FIG. 23 is an external perspective view of a conveyance seat of a fourth embodiment.

The conveyance seat S4 includes, as shown in FIG. 23, a seat main body which includes a seat cushion 301, a seat back 302, and a headrest 303, a movable body 340 (shoulder support member) which is attached inside the seat back 302 and is operated so that a side portion 302B of the seat back 302 protrudes from the normal position toward the seated occupant side, a cushion length adjusting device 360 which is attached inside the seat cushion 301 and is able to adjust the length of the seat cushion 301 in the front to back direction of the seat, and an operating device 350 (fluid supply device) which is operated so that the movable body 340 and the cushion length adjusting device 360 are operated.

Additionally, since the configuration of the movable body 340 is the same as that of the movable body 240 described above, the description will be omitted.

Figure 24:
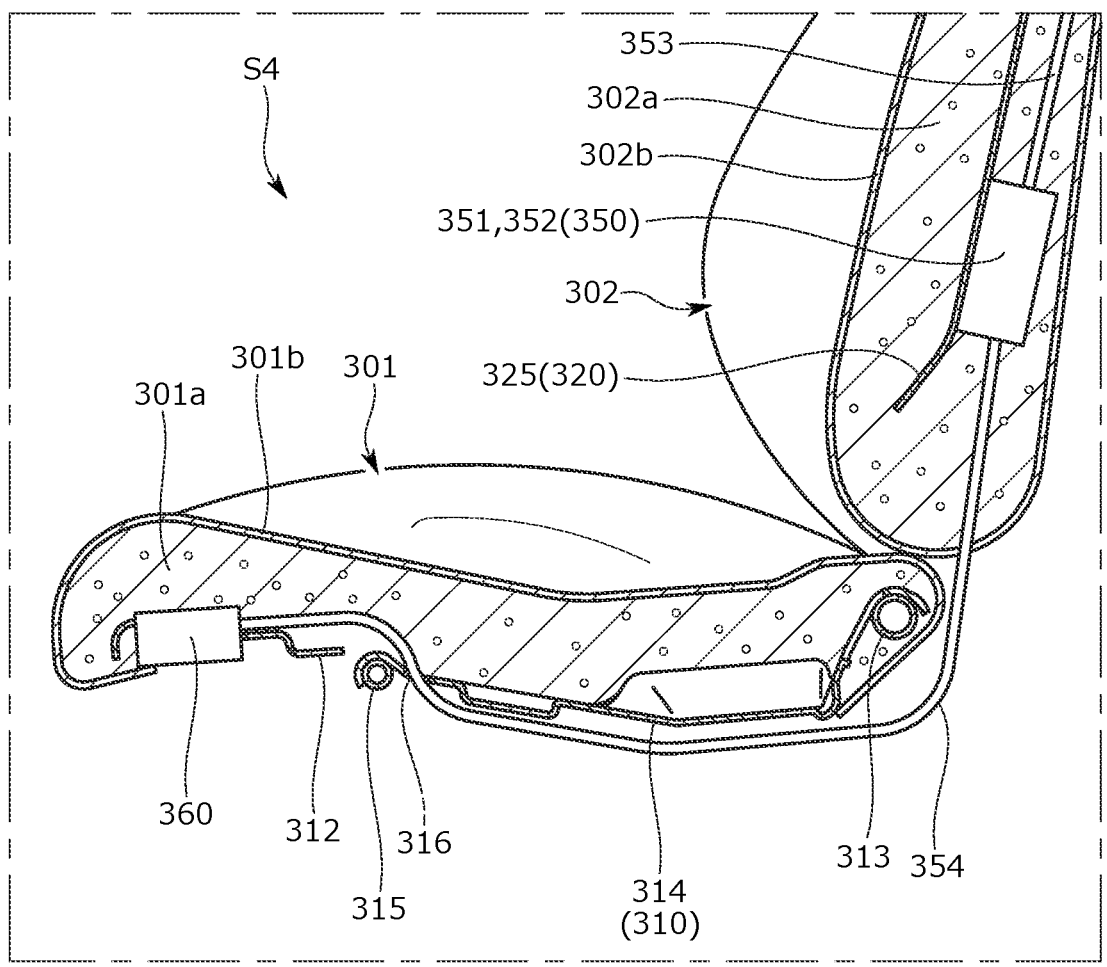
FIG. 24 is a cross-sectional view of the conveyance seat and is a view showing a cushion front/rear adjusting device, an air pipe, and an operating device.
Figure 25:
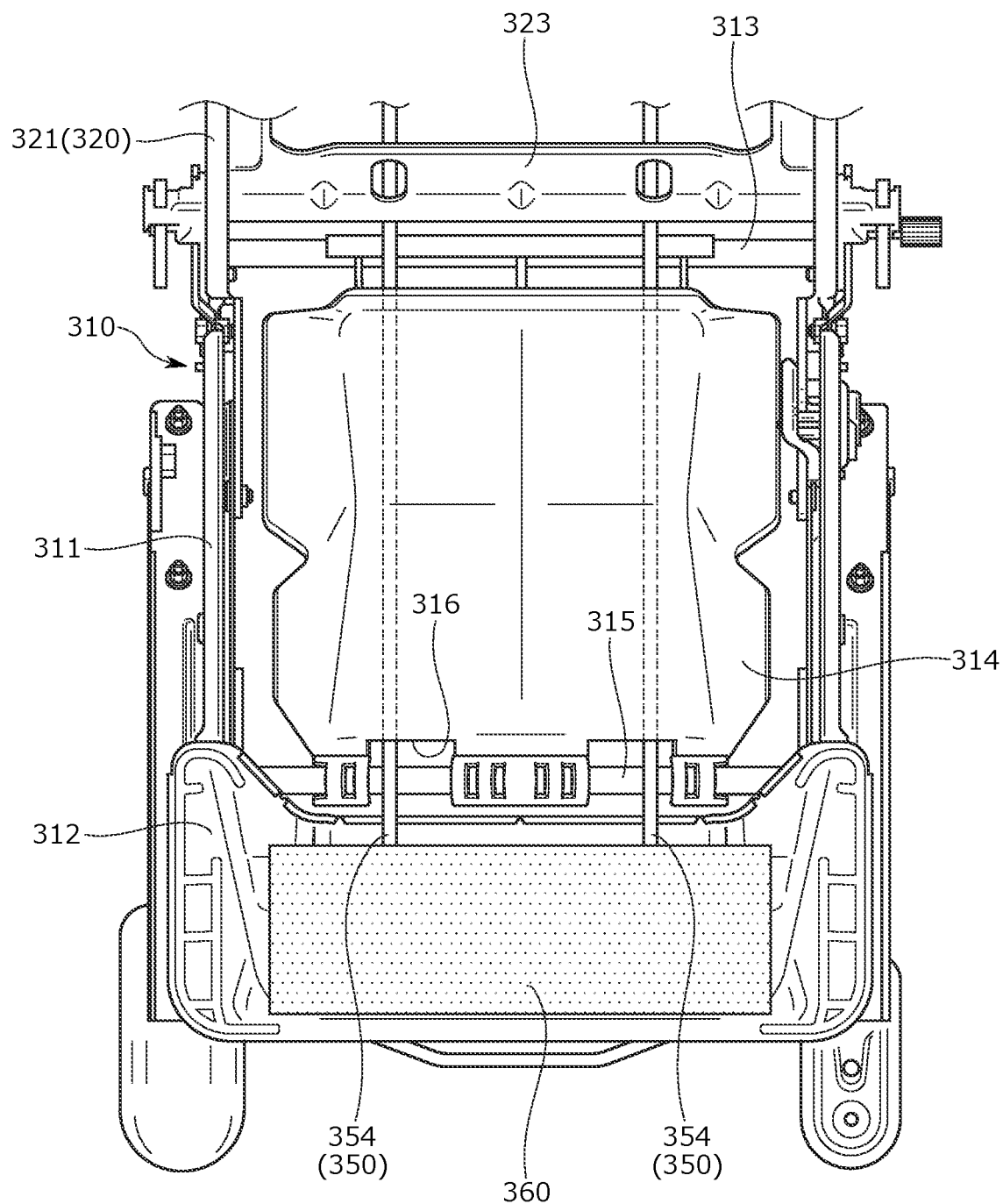
FIG. 25 is a plan view of a seat frame and is a view showing the cushion front/rear adjusting device and the air pipe.

The cushion frame 310 consists of, as shown in FIGS. 24 and 25, a rectangular frame-shaped body and mainly includes cushion side frames 311 which are arranged on the right and left sides, a plate-shaped pan frame 312 which is installed in the front end part of each cushion side frame 311, a pipe-shaped front connection frame 315 which connects the front part of each cushion side frame 311, a pipe-shaped rear connection frame 313 which connects the rear part of each cushion side frame 311, and a support plate 314 which is hooked to the front connection frame 315 and the rear connection frame 313 and supports the seated occupant.

Additionally, the cushion length adjusting device 360 is attached to the upper surface of the pan frame 312.

The support plate 314 is, as shown in FIG. 25, a rectangular plate body and includes a front hook portion 314a which is provided at the front end part with a gap in the seat width direction and is hooked to the front connection frame 315 and a rear hook portion 314b which is provided at the rear end part of the support plate 314 with a gap in the seat width direction and is hooked to the rear connection frame 313.

In the above-described configuration, an opening portion 316 which opens in the up to down direction is formed in a region surrounded by the main body portion of the support plate 314, the plurality of front hook portions 314a, and the front connection frame 315.

Similarly to the above-described back frame 220 (see FIG. 17), the back frame 320 mainly includes right and left back side frames 321, an upper frame 322, a lower frame 323, a plate-shaped connection frame 327 which connects the right and left extending portions of the upper frame 322, right and left wire members 324 (elastic wires) that are respectively hooked to the connection frame 327 and the lower frame 323 and extend in the up to down direction, and a support plate 325 which is held by the right and left wire members 324 and supports the seated occupant.

The operating device 350 is, as shown in FIGS. 24 and 25, a fluid supply device which is attached inside the seat main body and supplies compressed air to the movable body 340 (bag body 344) and the cushion length adjusting device 360 (bag bodies 361 and 362).

The operating device 350 mainly includes an air control unit 351 which is attached to the back surface of the back frame 320, an air pump 352, a first air pipe 353 which connects the air control unit 351 and the movable body 340, and a second air pipe 354 which connects the air control unit 351 and the cushion length adjusting device 360.

Additionally, the air pump 352 may be installed outside the seat main body or may be disposed to be adjacent to the air control unit 351. Alternatively, the air pump may be disposed at a predetermined position of the seat main body.

As shown in FIG. 24, the air control unit 351 is hooked and fixed to the back surfaces of the right and left wire members 324 and the support plate 325 in the back frame 320.

In this way, the support plate 325 can preferably support the seated occupant even when an impact is applied to the conveyance seat S4.

That is, the air control unit 351 does not disturb the movement of the support plate 325 in the front to back direction of the seat. In other words, the air control unit 351 moves together with the support plate 325 and the support plate 325 can preferably support the seated occupant.

As described above, it is possible to realize the conveyance seat S4 in which the operating device 350 (air control unit 351) does not influence the sitting posture of the seated occupant even when an impact is applied from the outside as compared with a conventional vehicle seat (for example, JP 2018-243012 A).

As shown in FIG. 24, the first air pipe 353 extends upward from the upper end portion of the air control unit 351 and is connected to the right and left movable bodies 340.

As shown in FIGS. 24 and 25, the second air pipe 354 extends downward from the lower end portion of the air control unit 351, is curved from the rear end portion of the seat cushion 301 toward the seat front side, extends toward the seat front side along the seat cushion 301, and is connected to the cushion length adjusting device 360.

In more detail, the second air pipe 354 passes through the rear position of the rear connection frame 313 inside the seat cushion, extends toward the seat front side while passing through the lower position of the support plate 314, passes through the opening portion 316, passes through the upper position of the support plate 314 and the front connection frame 315, and is connected to the cushion length adjusting device 360.

Since the second air pipe 354 is disposed as described above, the second air pipe 354 can be preferably disposed inside the seat main body.

Specifically, it is possible to suppress damage to the second air pipe 354 and generation of contact noise due to contact between the second air pipe 354 and other components.

Further, the second air pipe 354 can be preferably positioned in such a manner that the second air pipe 354 passes through the opening portion 316.

The cushion length adjusting device 360 is, as shown in FIGS. 24 and 25, a device which is attached to the upper surface of the cushion frame 310 (pan frame 312) and is operated to adjust the length of the seat cushion 301.

Figure 26A:
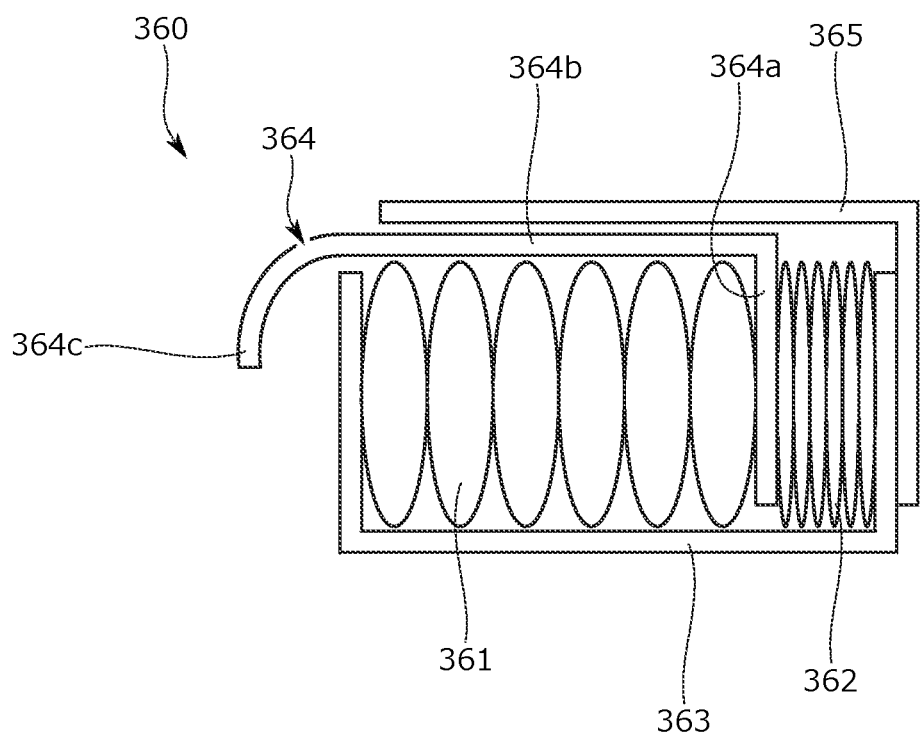
FIG. 26A is a view showing a cushion length adjusting device and is a view describing a state in which a protrusion is located at a "normal position".
Figure 26B:
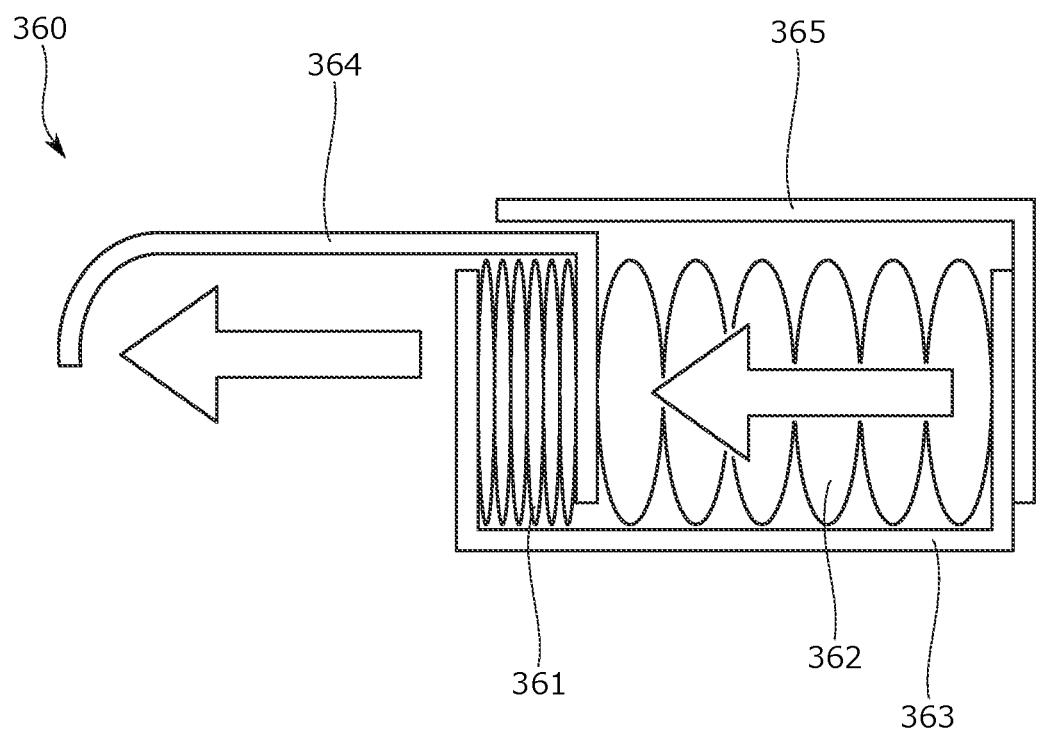
FIG. 26B is a view describing a state in which the protrusion is located at a "protruding position".

As shown in FIGS. 26A and 26B, the cushion length adjusting device 360 deploys toward the seated occupant side (protrudes from the normal position toward the protruding position) when compressed air is enclosed in the deployment bag body and contracts (returns to the normal position) when compressed air is enclosed in the storage bag body.

Specifically, the cushion length adjusting device 360 mainly includes a first bag body 361 for storage, a second bag body 362 for deployment, a housing 363 which accommodates the first bag body 361 and the second bag body 362, a protrusion 364 which is accommodated in the housing 363, is disposed to partition the first bag body 361 and the second bag body 362, and partially protrudes from the housing 363, and a cover body 365 which is integrally attached to the rear surface of the housing 363 and covers the first bag body 361, the second bag body 362, and the protrusion 364 from above.

These components 361 to 365 are members elongated in the seat direction.

The first bag body 361 and the second bag body 362 may be arranged side by side in the front to back direction of the seat.

The protrusion 364 includes a partition wall portion 364a which partitions the first bag body 361 and the second bag body 362, an upper wall portion 364b which extends from the upper end portion of the partition wall portion 364a toward the seat front side and partially protrudes from the housing 363, and a contact wall portion 364c which protrudes to be curved downward from the extension end portion of the upper wall portion 364b and contacts the seat cushion 301 (cushion material 301a).

The cushion length adjusting device 360 is operated so that the protrusion 364 is moved from the "normal position" shown in FIG. 26A to the "protruding position" shown in FIG. 26B.

Specifically, as shown in FIG. 26A, when the first bag body 361 inflates and the second bag body 362 contracts by receiving compressed air from the operating device 350, the protrusion 364 is disposed at the "normal position". In other words, the protrusion 364 is accommodated in the housing 363.

On the other hand, when the operating device 350 discharges compressed air inside the first bag body 361 and inflates the second bag body 362, the protrusion 364 is disposed at the "protruding position". In other words, the protrusion 364 protrudes from the housing 363.

Figure 27A:
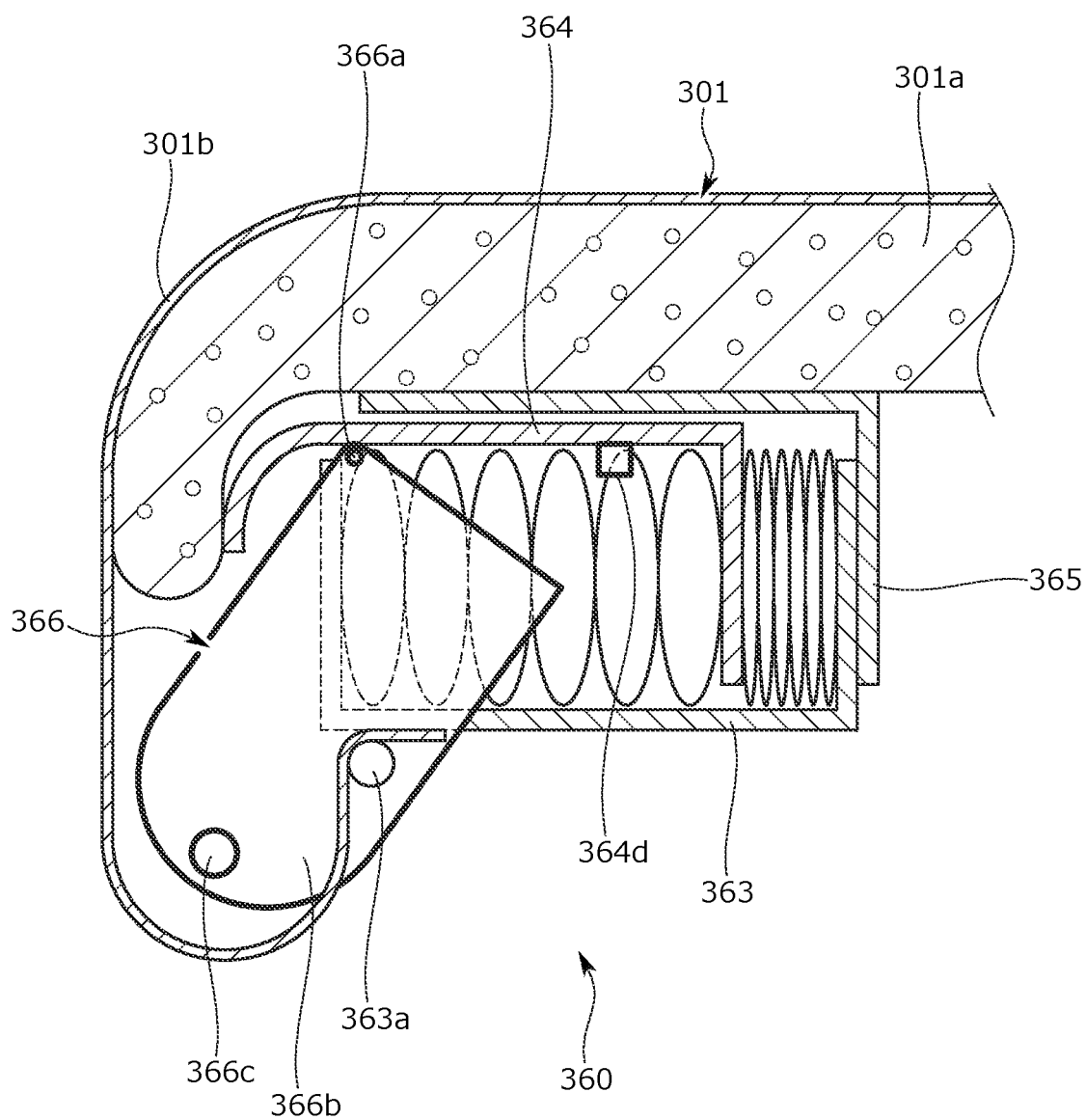
FIG. 27A is a view describing a state in which a seat cushion is located at a "normal position" and a cushion length adjusting device (rotating body) is located at a "disengagement position".

With the above-described configuration, as shown in FIG. 27A, when the protrusion 364 is located at the "normal position", the seat cushion 301 is disposed at the "normal position". That is, the length of the seat cushion 301 in the front to back direction of the seat is a normal length.

Figure 27B:
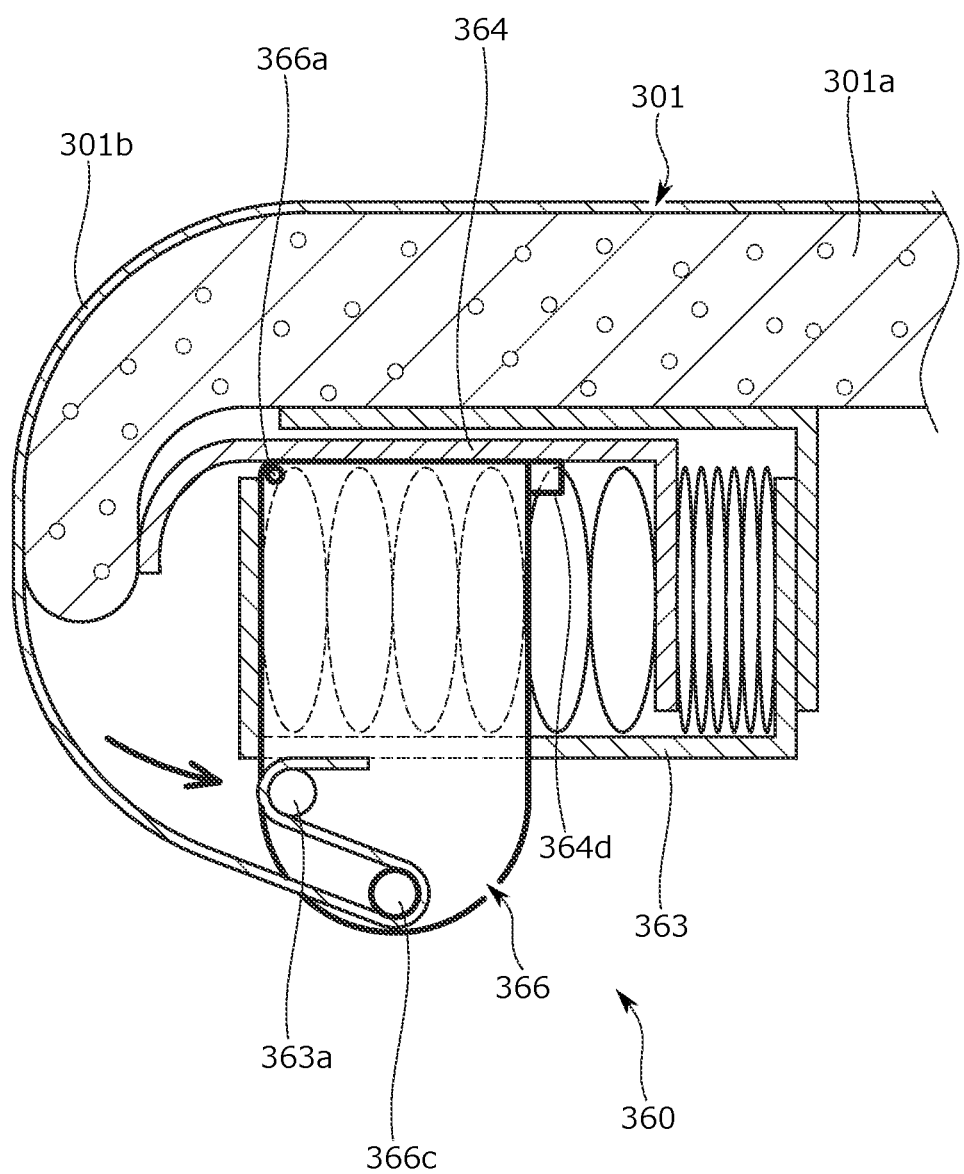
FIG. 27B is a view describing a state in which the seat cushion is located at a "normal position" and the rotating body is located at an "engagement position".
Figure 27C:
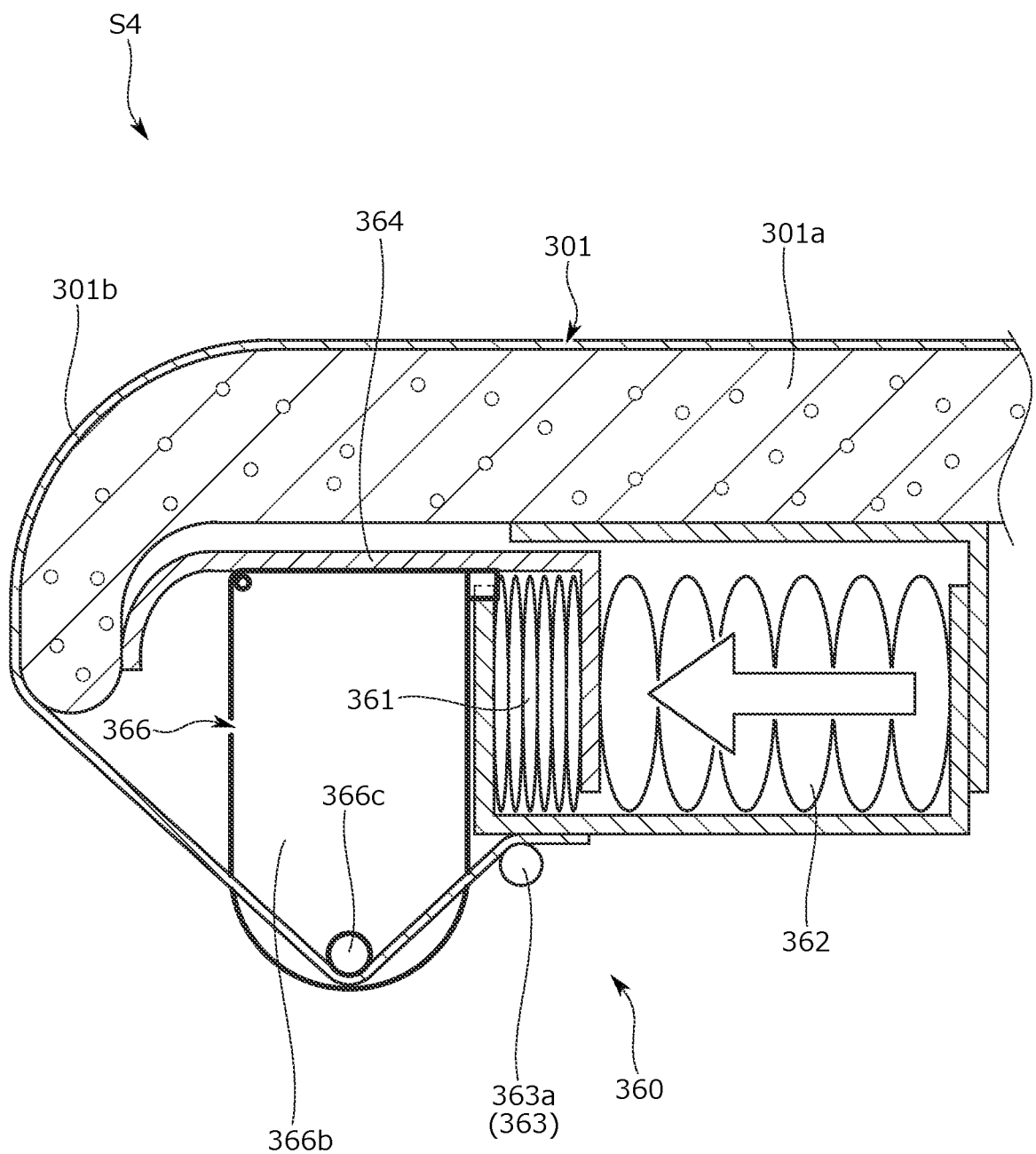
FIG. 27C is a view describing a state in which the seat cushion is located at a "protruding position" and the rotating body is located at an "engagement position".

On the other hand, as shown in FIG. 27C, when the protrusion 364 moves from the "normal position" to the "protruding position", the protrusion 364 pushes the front end portion of the seat cushion 301 (cushion material 301a) so that the seat cushion 301 moves from the "normal position" to the "protruding position". That is, the seat cushion 301 extends in the front to back direction of the seat.

Incidentally, in a conventional vehicle seat including a cushion length adjusting device (for example, JP 2014-118114 A), a winding device is attached to an end portion of a skin material in order to maintain the tension of the skin material when a seat cushion is expanded and contracted. Therefore, the interior of the seat cushion has a relatively complicated structure, and the cost is high.

Here, there has been a demand for a simple mechanism that operates in conjunction with the expansion and contraction of the seat cushion and that can appropriately maintain the tension of the skin material.

In order to cope with the above, the cushion length adjusting device 360 further includes, as shown in FIGS. 27A to 27C, a skin material pulling member 366 capable of maintaining the tension of the skin material 301b in conjunction with the expansion and contraction of the seat cushion 301.

The skin material pulling member 366 includes a rotating shaft 366a which is attached to the bottom surface of the front part of the protrusion 364 and is elongated in the seat width direction and right and left rotating bodies 366b which are arranged at positions sandwiching the protrusion 364 in the seat width direction and are attached to the protrusion 364 to be rotatable about the rotating shaft 366a.

The rotating body 366b is a flat plate-shaped member that is rotatable between the "disengagement position" shown in FIG. 27A and the "engagement position" shown in FIG. 27B.

The rotating body 366b is biased toward the "disengagement position" by a biasing spring (not shown) and engages with an engagement portion 364d provided on the bottom surface of the rear part of the protrusion 364 when the rotating body is rotated to the "engagement position" against the biasing force of the biasing spring.

The inner surface of the lower end part of the rotating body 366b is provided with a skin material pulling portion 366c which protrudes inward in the seat width direction and pulls in the end portion of the skin material 201b.

Further, the bottom surface of the front part of the housing 363 is provided with a skin material hook portion 363a which extends to be elongated in the seat width direction and hooks the end portion of the skin material 201b.

Hereinafter, a method of hooking the end portion of the skin material 201b will be described.

First, as shown in FIG. 27A, the end portion of the skin material 201b is passed between the skin material pulling portion 366c and the skin material hook portion 363a and the end portion is hooked to the skin material hook portion 363a.

Then, when the rotating body 366b is rotated from the "disengagement position" to the "engagement position" shown in FIG. 27B while the end portion of the skin material 201b is hooked, the skin material pulling portion 366c can pull in the end portion of the skin material 201b.

In this way, it is possible to preferably maintain the tension of the skin material 201b.

In more detail, FIG. 27B is a view describing a state in which the seat cushion 201 is located at the "normal position" and the rotating body 366b is located at the "engagement position".

At this time, the skin material 201b is pulled by the rotating body 366b (skin material pulling portion 366c) and the tension of the skin material 201b is appropriately maintained.

Then, when the cushion length adjusting device 360 is operated and the protrusion 364 moves from the "normal position" shown in FIG. 27B to the "protruding position" shown in FIG. 27C, the seat cushion 201 moves from the "normal position" to the "protruding position".

At this time, the rotating body 366b moves toward the seat front side in conjunction with the protrusion 364 and the pulling force of the skin material 201b by the skin material pulling portion 366c becomes smaller. As a result, the tension of the skin material 201b is appropriately maintained even when the seat cushion 201 moves to the "protruding position".

With the above-described configuration, the cushion length adjusting device 360 (skin material pulling member 366) is operated in conjunction with the expansion and contraction of the seat cushion 301 and can preferably maintain the tension of the skin material 301b.

Further, the tension of the skin material 301b can be maintained with a simple structure without separately providing an elastic member such as a rubber material in the skin material 301b.

Fifth Embodiment of Conveyance Seat

Figure 28:
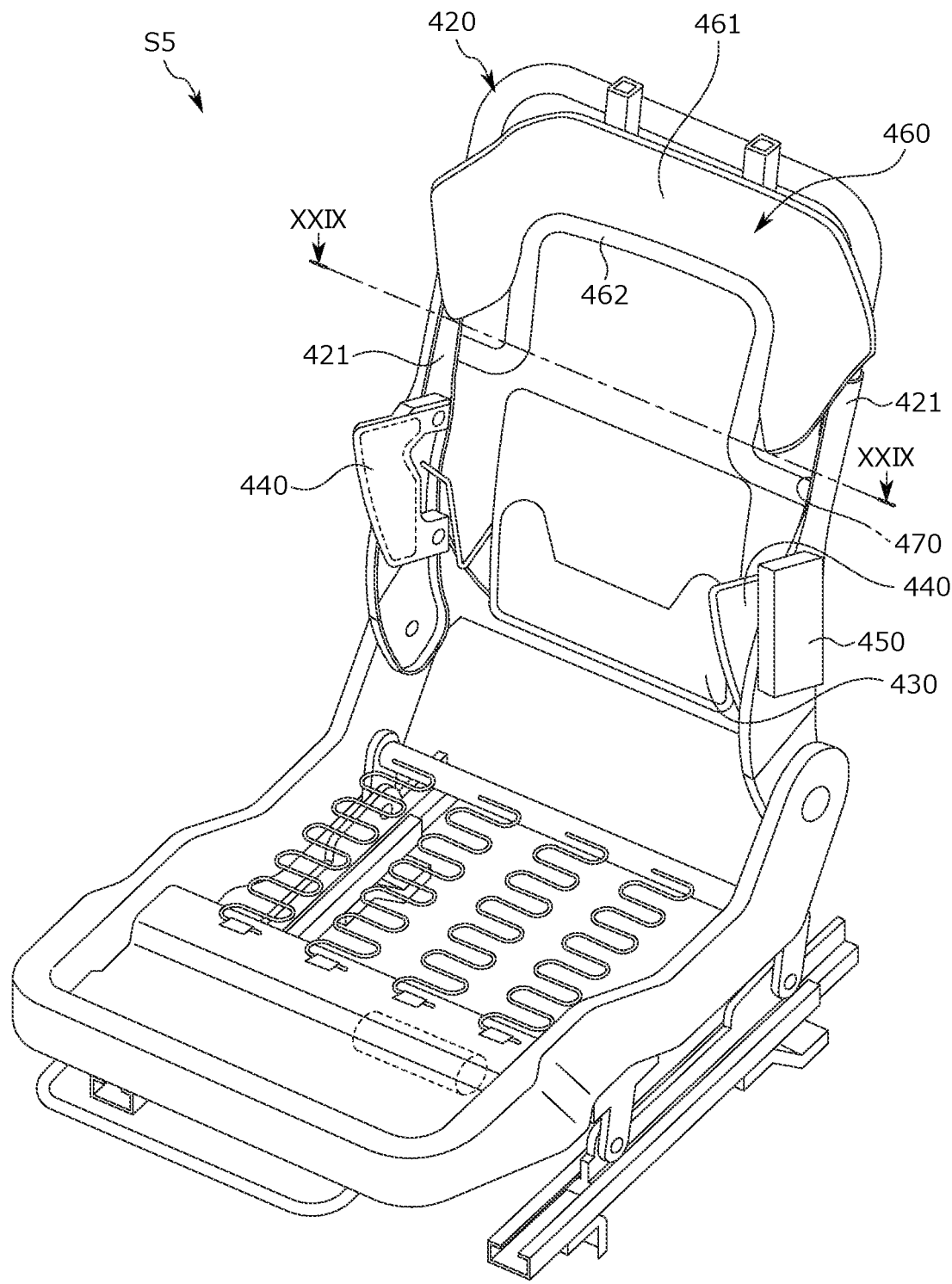
FIG. 28 is a perspective view showing a seat frame of a conveyance seat of a fifth embodiment.

Next, a conveyance seat S5 of a fifth embodiment will be described with reference to FIGS. 28 and 29.

Additionally, the description of the content that overlaps with the conveyance seats S1 to S4 described above will be omitted.

The conveyance seat S5 provides a conveyance seat capable of suppressing wrinkles or saggings from occurring on a surface of a seat main body even when a portion of the seat main body protrudes toward a seated occupant side.

The conveyance seat S5 includes a seat main body, a lumbar support member 430, a movable body 440 (side support member), an operating device 450 (fluid supply device), a shoulder support member 460 that is operated so that the upper part of the seat back 402 protrudes from the normal position toward the seated occupant side, and a driving device 470 which drives the shoulder support member 460.

The shoulder support member 460 is a movable body for supporting the shoulder of the seated occupant.

Specifically, the shoulder support member 460 includes a movable main body 461 which is disposed in the upper part of the back frame 420 and a rotating shaft 462 which connects the movable main body 461 and the back frame 420 and is rotatable together with the movable main body 461 with respect to the back frame 420.

The driving device 470 is an actuator which is fixed to the back surface of the back side frame 421 and is driven to rotate the rotating shaft 462.

With the above-described configuration, the shoulder support member 460 can be rotated with respect to the back frame 420 in the front to back direction of the seat by driving the driving device 470.

Figure 29:
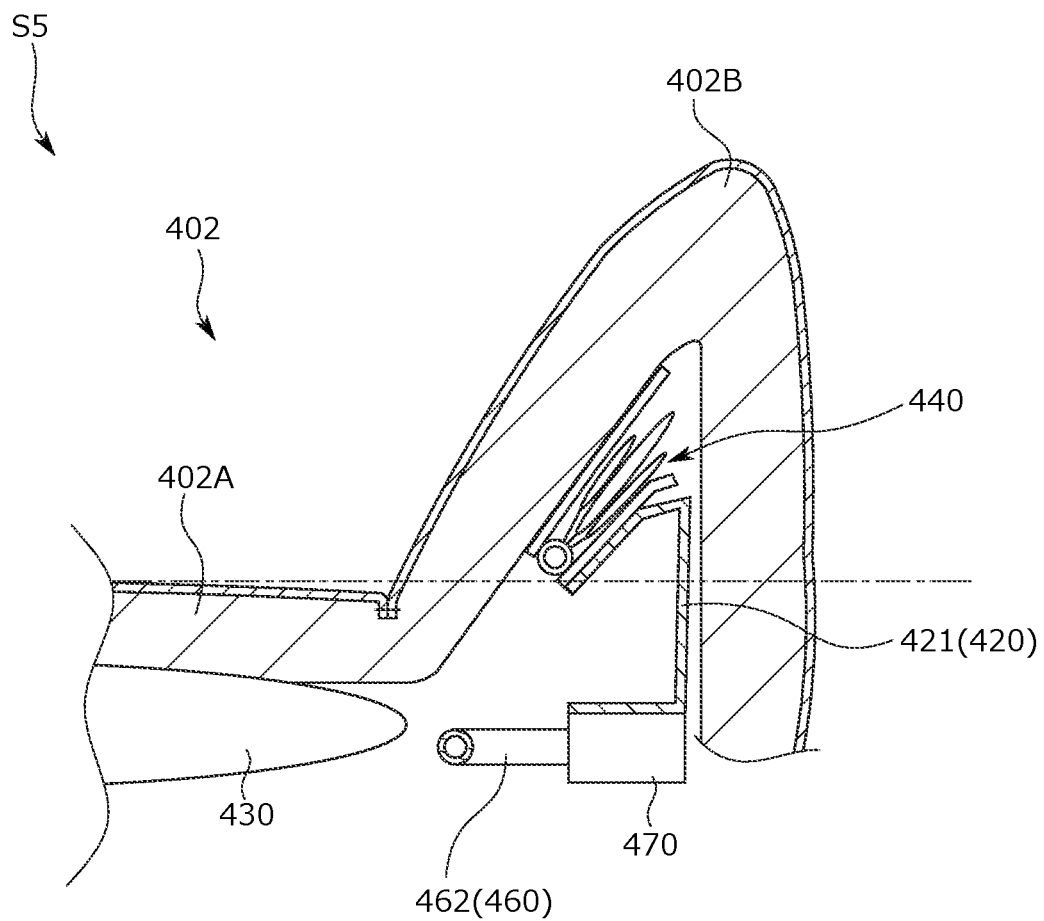
FIG. 29 is a cross-sectional view taken along a line XXIX-XXIX of FIG. 28 and is a view describing a positional relationship of a movable body, a second movable body, and a third movable body.

In the above-described configuration, as shown in FIG. 29, the movable body 440 is disposed on the seat front side in relation to the shoulder support member 460.

In other words, the movable body 440 is disposed on the seat front side in relation to the rotating shaft 462 of the shoulder support member 460.

Therefore, it is possible to stably operate movable bodies 440 and 460 while suppressing the interference between the movable body 440 and the shoulder support member 460.

Sixth Embodiment of Conveyance Seat

Next, a conveyance seat S6 of a sixth embodiment will be described with reference to FIG. 30 to FIGS. 31A and 31B.

Additionally, the description of the content that overlaps with the conveyance seats S1 to S5 described above will be omitted.

The conveyance seat S6 provides a conveyance seat capable of suppressing wrinkles or saggings from occurring on a surface of a seat main body even when a portion of the seat main body protrudes toward a seated occupant side by compactly arranging the components of the conveyance seat.

The conveyance seat S6 includes a seat main body, a lumbar support member 530, a driving device 531 (actuator), a movable body 540, an operating device 550 (fluid supply device), and a side airbag device 570 which is attached to the outer surface of the seat back 502 in the seat width direction and reduces the impact applied from the side of the conveyance.

The movable body 540 is attached to the front surface of the lumbar support member 530 in a folded state.

Specifically, the movable body 540 mainly includes a base member 541 that is supported by the outer end portion of the lumbar support member 530 in the seat width direction, a rotating member 543 that is disposed at the seat front position in relation to the base member 541 and is rotatably attached to the base member 541 through the rotating shaft 542, and one bag body 544 which is disposed between the base member 541 and the rotating member 543 and is supported by the front surface of the base member 541.

The side airbag device 570 is attached to the outer surface of the back side frame 521 and extends in the up to down direction along the back side frame 521.

At this time, the movable body 540 is attached to a position different from the position in which the side airbag device 570 is attached in the back side frame 521 and is disposed on the seat front side in relation to the side airbag device.

Therefore, the interference between the movable body 540 and the side airbag device 570 is suppressed and the movable body 540 can be more preferably operated.

Figure 30:
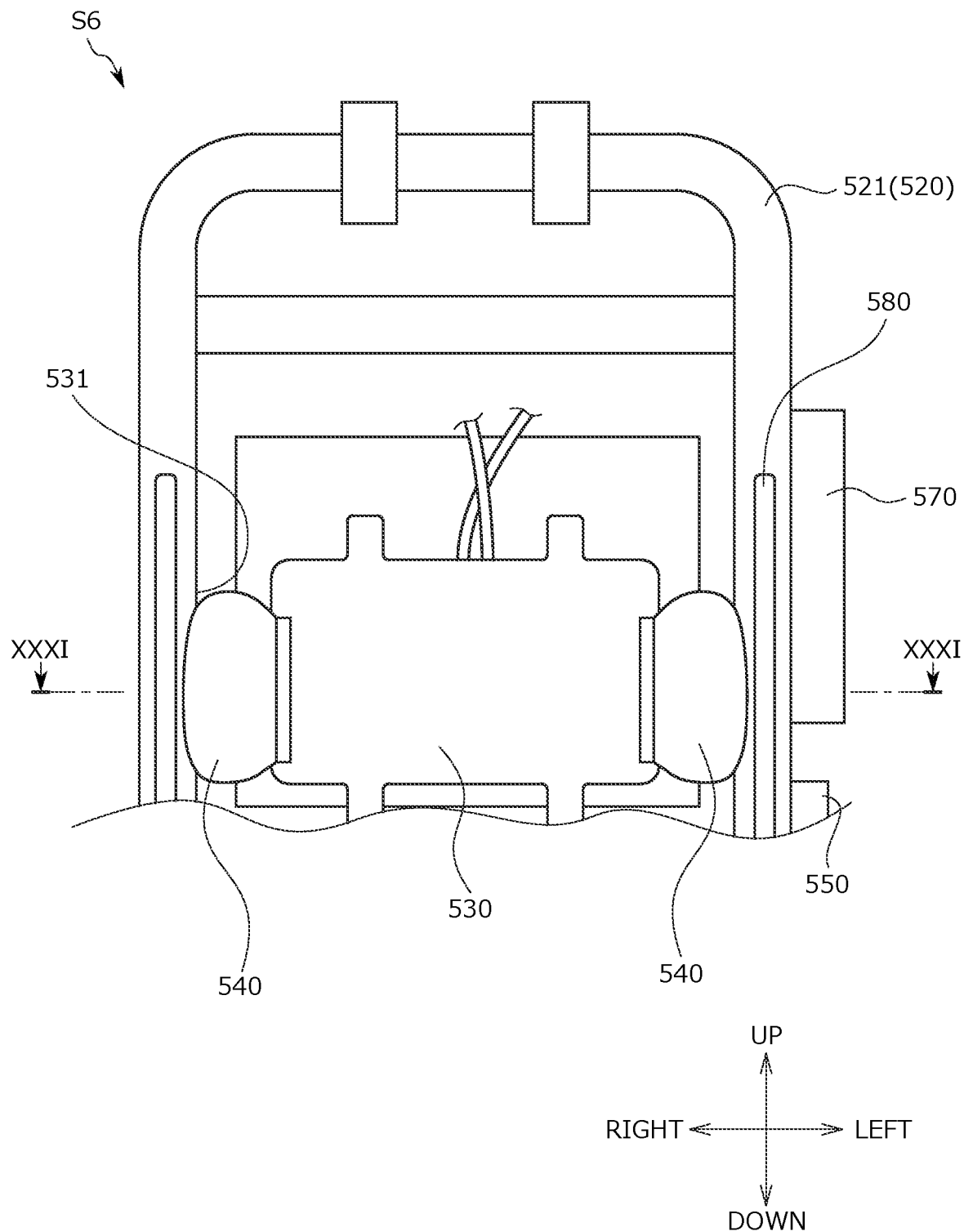
FIG. 30 is a front view showing a seat frame of a conveyance seat of a sixth embodiment.
Figure 31A:
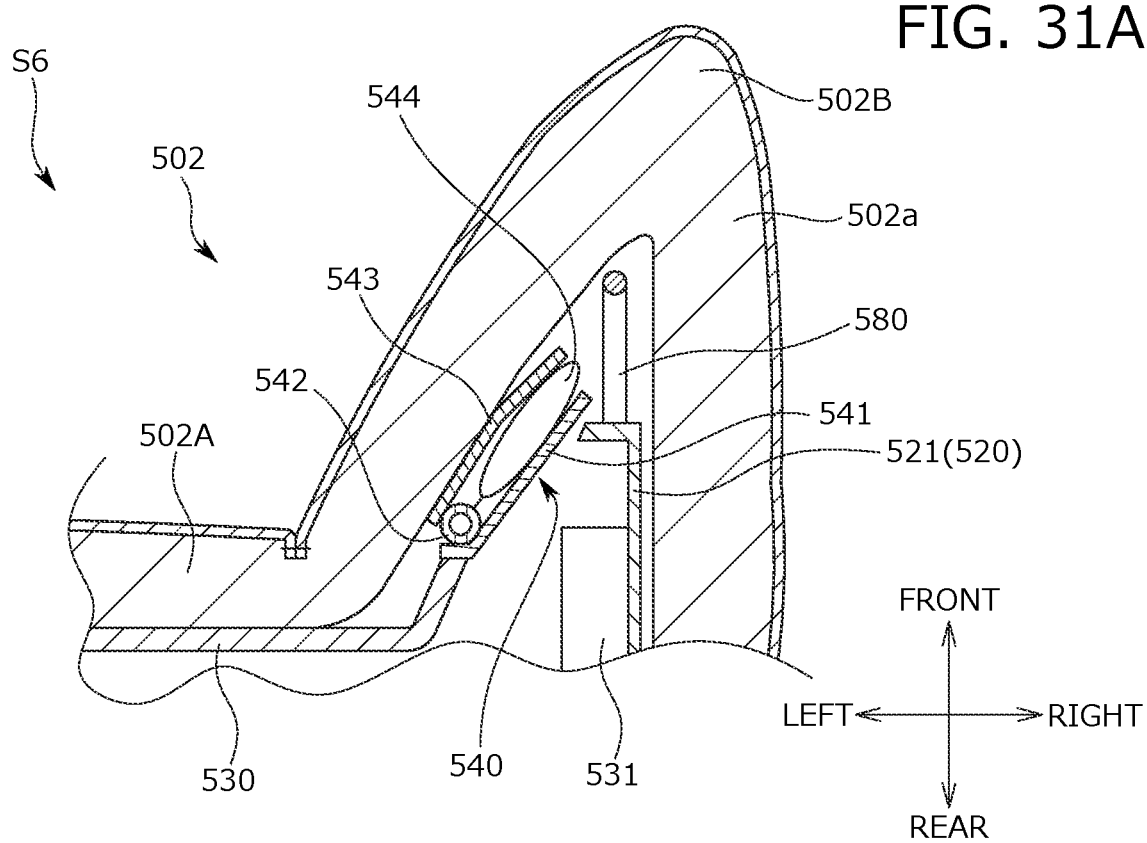
FIG. 31A is a cross-sectional view taken along a line XXXI-XXXI of FIG. 30 and is a view describing a state in which a side portion of a seat back is located at a "normal position".
Figure 31B:
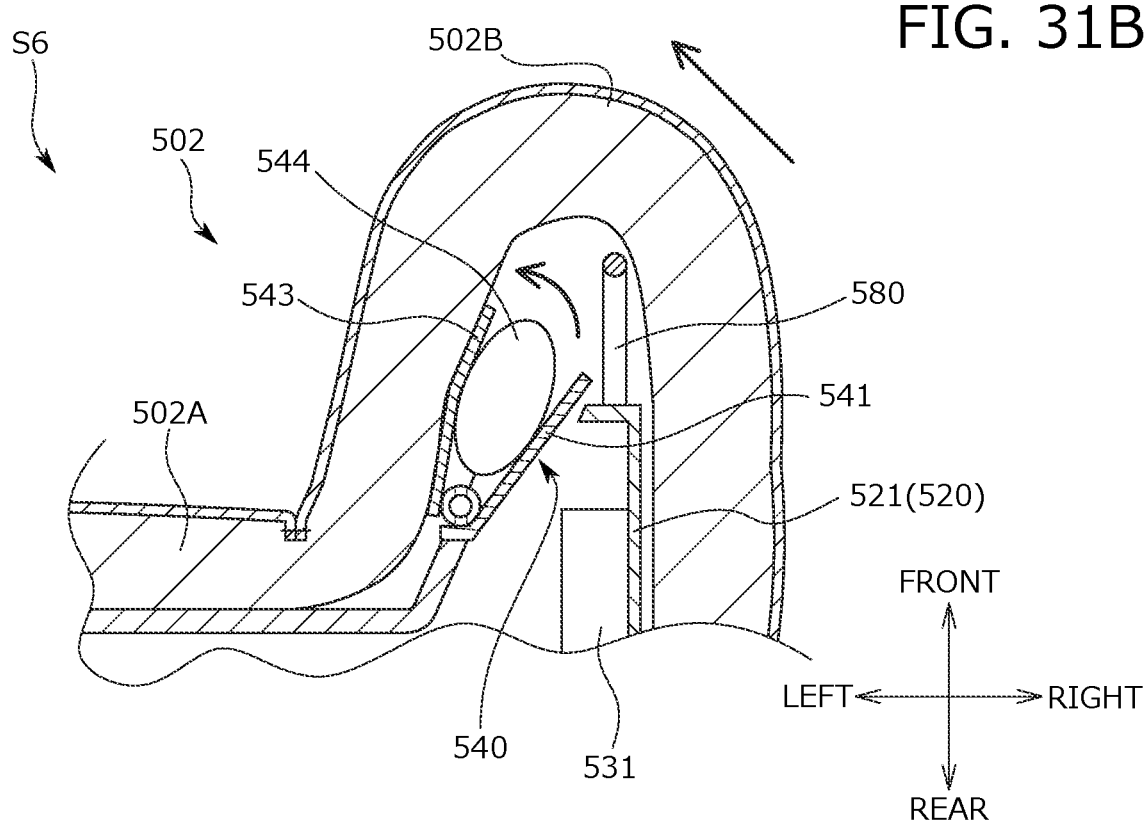
FIG. 31B is a view describing a state in which a movable body is operated and a side portion of a seat back is located at a "protruding position".

In the above-described configuration, as shown in FIG. 30 and FIGS. 31A and 31B, a linear member 580 that protrudes from the back side frame 521 toward the seat front side is attached to a position overlapping the movable body 540 in the up to down direction in the front surface of the back side frame 521.

The linear member 580 is a wire member that is elongated in the up to down direction.

At this time, the movable body 540 is disposed on the inside of the linear member 580 in the seat width direction.

In this way, the movable body 540 is protected from the outside by the linear member 580. Therefore, the movable body 540 can be preferably operated.

Additionally, a plate-shaped plate formed of a metal material or a resin material may be adopted instead of the linear member 580.

Further, in the above-described configuration, as shown in FIGS. 31A and 31B, a predetermined inner space is formed between the linear member 580 and the cushion material 502a located on the outside of the linear member 580 in the seat width direction.

In this way, it is possible to suppress the interference between the linear member 580 and the cushion material 502a (the cushion material 502a located on the outside of the linear member 580 in the seat width direction) when the movable body 540 protrudes toward the seat front side (precisely, the seat front side and the inside of the seat width direction) and the cushion material 502a is pushed out toward the seat front side. That is, the linear member 580 does not hinder the deformation of the cushion material 502a.

As a result, the movable body 540 can preferably push out the side portion 502B (cushion material 502a) of the seat back 502.

Seventh Embodiment of Conveyance Seat

Next, a conveyance seat S7 of a seventh embodiment will be described with reference to FIGS. 32 to 36.

Additionally, the description of the content that overlaps with the conveyance seats S1 to S6 described above will be omitted.

The conveyance seat S7 provides a conveyance seat capable of enhancing the holdability of a seated occupant when a movable body attached to a seat main body is operated.

Further, the conveyance seat provides a conveyance seat capable of compactly arranging components of the conveyance seat.

Figure 32:
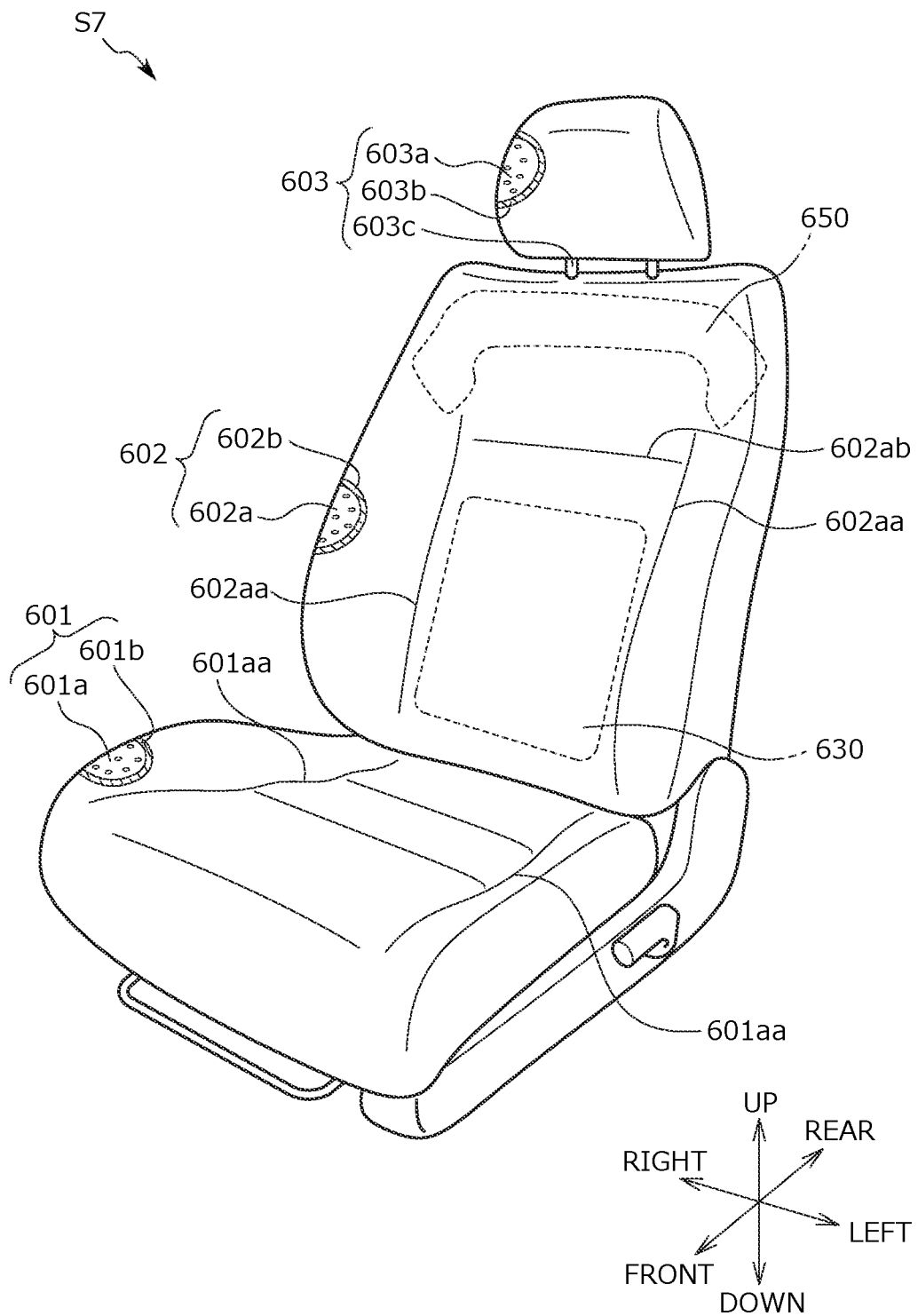
FIG. 32 is an external perspective view of a conveyance seat of a seventh embodiment.

The conveyance seat S7 is, as shown in FIG. 32, a vehicle seat and includes a seat main body which includes a seat cushion 601, a seat back 602, and a headrest 603, a lumbar support member 630 that is attached inside the seat back 602 and is operated so that the lower part of the seat back 602 protrudes from the normal position toward the seated occupant side, an operating device 640 (fluid supply device) which is operated so that the lumbar support member 630 is operated, a movable body 650 (shoulder support) which is attached inside the seat back 602 and is operated so that the upper part of the seat back 602 protrudes from the normal position toward the seated occupant side, and a driving device 660 (actuator) which drives the movable body 650.

The seat cushion 601 is, as shown in FIG. 32, a seating portion which supports the seated occupant from below and has a configuration in which a cushion material 601a is placed on a cushion frame 610 serving as a framework and shown in FIG. 33 and is covered with a skin material 601b.

The seat cushion 601 includes a center portion 601A which is located at the center part in the seat width direction and right and left side portions 601B (side bolster portions) which are located on the outside of the center portion 601A in the seat width direction.

The cushion material 601a is a pad member formed of foamed urethane or the like.

Right and left pull-in grooves 601aa which extend in the front to back direction of the seat to separate the center portion 601A and the right and left side portions 601B are formed on the surface of the cushion material 601a.

Figure 33:
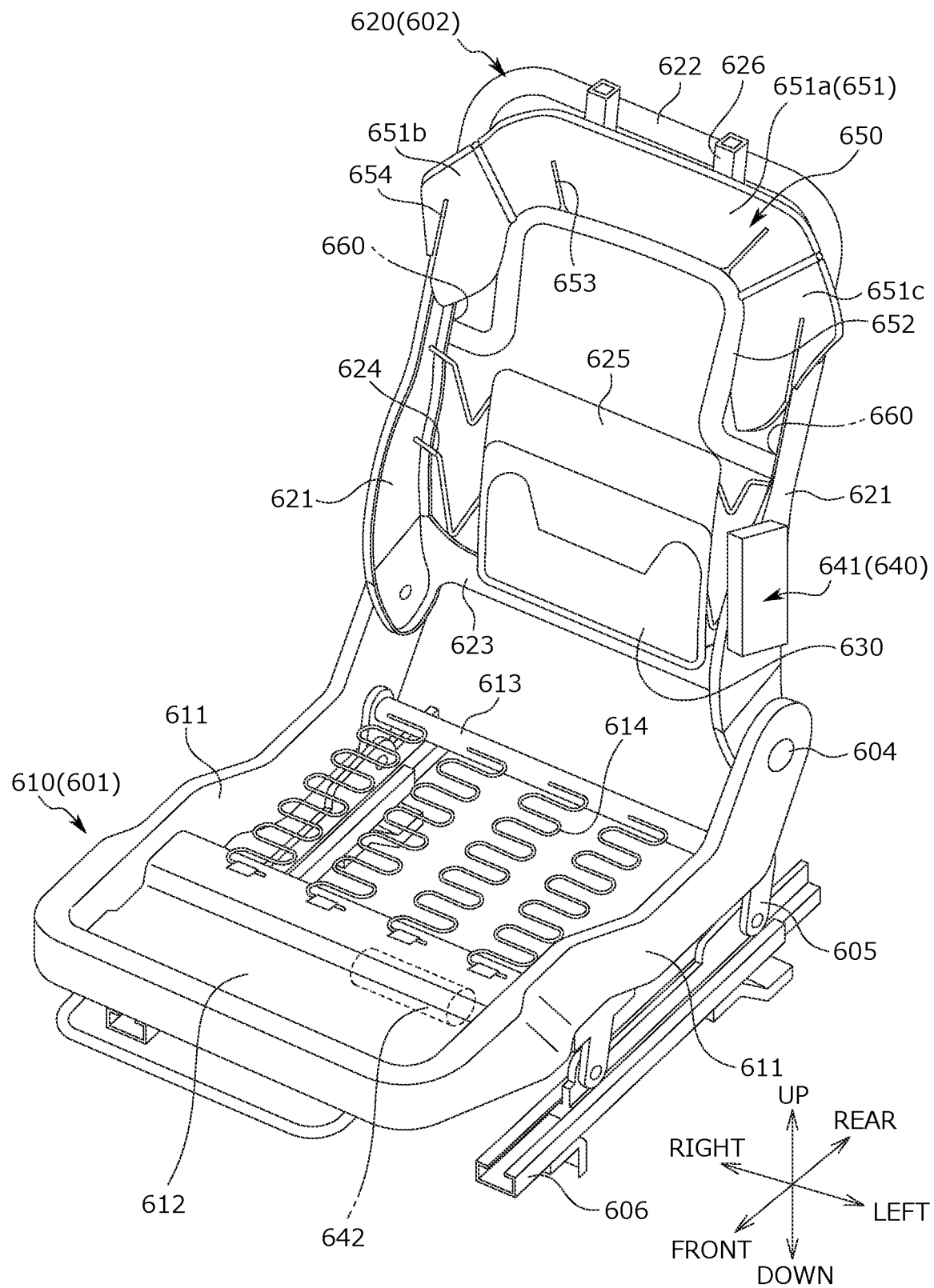
FIG. 33 is a perspective view showing a seat frame serving as a framework.

The seat back 602 is, as shown in FIG. 32, a backrest portion which supports the back of the seated occupant from behind and has a configuration in which a cushion material 602a is placed on a back frame 620 serving as a framework and shown in FIG. 33 and is covered with a skin material 602b.

The seat back 602 includes a center portion 602A which is located at the center part in the seat width direction and right and left side portions 602B (side bolster portions) which are located on the outside of the center portion 602A in the seat width direction.

Right and left pull-in groove side portions 602aa (skin material pull-in grooves) which extend in the up to down direction to separate the center portion 602A and the right and left side portions 602B and a pull-in groove upper portion 602ab (skin material pull-in groove) which extends in the seat width direction to connect the upper portions of the right and left pull-in groove side portions 602aa are formed on the surface of the cushion material 602a.

Additionally, the pull-in groove upper portion 602ab is formed at the center portion of the seat back 602 in the up to down direction or a slightly upper position of the center portion.

The headrest 603 is, as shown in FIG. 32, a head portion that supports the head of the seated occupant from behind and has a configuration in which a cushion material 603a is placed on a pillar 603c serving as a core material and is covered with a skin material 603b.

Additionally, a pillar attachment member 626 for attaching the pillar 603c supporting the main body of the headrest 603 is assembled to the upper portion of the back frame 620.

The cushion frame 610 consists of, as shown in FIG. 33, a substantially rectangular frame-shaped body and mainly includes cushion side frames 611 which are arranged on the right and left sides, a plate-shaped pan frame 612 (installation frame) which is installed in the front end part of each cushion side frame 611, a rear connection frame 613 which connects the rear part of each cushion side frame 611, and a plurality of elastic springs 614 (elastic support members) which are hooked to the pan frame 612 and the rear connection frame 613 and extend in a snake shape in the front to back direction of the seat.

The cushion side frame 611 is a plate-shaped frame which is elongated in the front to back direction of the seat.

Additionally, a reclining device 604 is attached to the rear part of the cushion side frame 611 and a rail device 606 is attached to the lower part thereof through a height link device 605.

The back frame 620 consists of, as shown in FIG. 33, a substantially rectangular frame-shaped body and mainly includes back side frames 621 which are arranged on the right and left sides, an inverted U-shaped upper frame 622 which connects the upper end part of each back side frame 621, a plate-shaped lower frame 623 which connects the lower end part of each back side frame 621, a plurality of wire members 624 (elastic wires) which are respectively hooked to each back side frame 621 and extend in a snake shape in the seat width direction, and a support plate 625 which is held by the plurality of wire members 624 and supports the seated occupant.

Additionally, the back frame 620 further includes a pillar attachment member 626 that is attached to the center part of the upper frame 622 in the seat width direction and attaches the pillar 603c of the headrest 603.

The back side frame 621 is a metal plate member that extends in the up to down direction and has a substantially C-shaped cross-section and the lower end part thereof is connected to the rear end part of the cushion side frame 611 through the reclining device 604.

In the above-described configuration, the back frame 620 is relatively rotatable with respect to the cushion frame 610.

In the above-described configuration, as shown in FIG. 33, the lumbar support member 630 is attached to the front surface of the support plate 625 and the operating device 640 is attached to the outer surface of the back side frame 621.

Further, the movable body 650 is attached to the upper part of the back frame 620 and the driving device 660 is attached to the rear surface of the back side frame 21.

Figure 34:
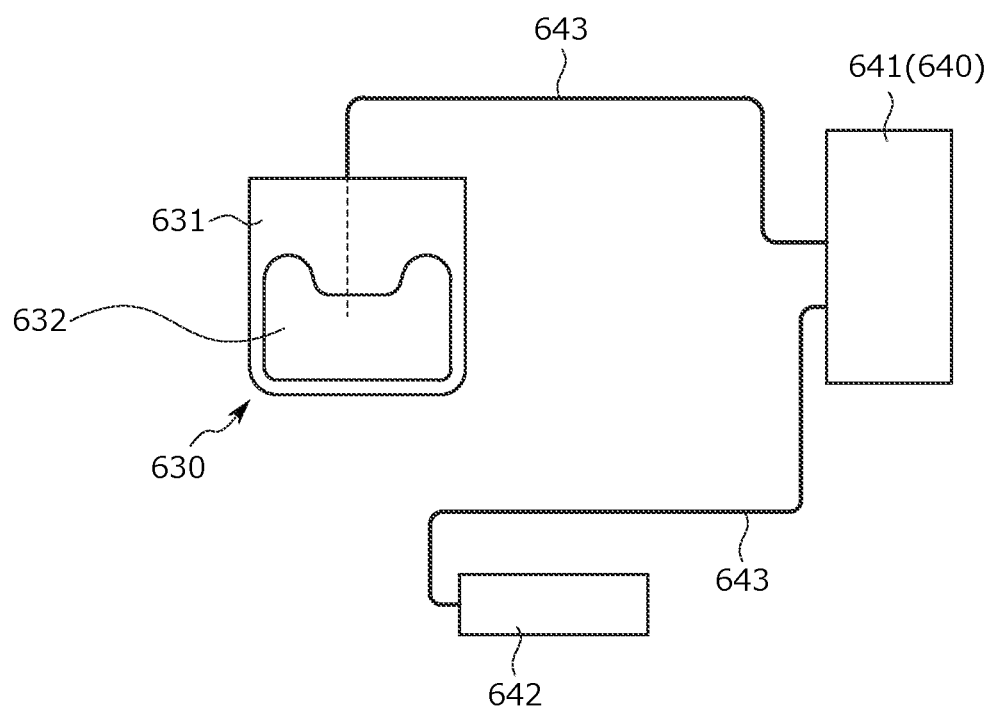
FIG. 34 is a schematic view showing a lumbar support, an air control unit, and an air pump.

As shown in FIGS. 33 and 34, the lumbar support member 630 includes a bag body (air cell) which inflates when a fluid is enclosed and is operated to inflate toward the seated occupant side (to protrude from the normal position toward the protruding position) when compressed air serving as a fluid is enclosed and to contract (to return to the normal position) when the enclosed compressed air is discharged.

Specifically, the lumbar support member 630 is a member that supports the lumbar of the seated occupant and is disposed between the support plate 625 and the cushion material 602a in the center portion 602A of the lower part of the seat back 602. Then, the lumbar support member is a member that is operated so that the center portion 602A (cushion material 602a) protrudes toward the seated occupant side.

The lumbar support member 630 is attached to the front surface of the support plate 625 in a folded state.

The lumbar support member 630 has a substantially rectangular shape elongated in the seat width direction and mainly includes a base member 631 (base plate) which is supported by the support plate 625 and a bag body 632 which is supported by the front surface of the base member 631.

The bag body 632 can inflate toward the seat front side when compressed air is enclosed from a folded state.

The operating device 640 is, as shown in FIGS. 33 and 34, a fluid supply device which is attached inside the seat main body and supplies compressed air to the lumbar support member 630 (bag body 632).

The operating device 640 mainly includes an air control unit 641 which is attached to the outer surface of the back side frame 621, an air pump 642 which is attached to the back surface of the cushion frame 610 (pan frame 612) and supplies and discharges compressed air, and an air pipe 643 which connects the air pump 642 and the lumbar support member 630.

For example, the air control unit 641 receives a predetermined control signal by accepting a selection of a predetermined user operation of the seated occupant and controls the air pump 642 so that compressed air is supplied to the bag body 632 or compressed air is discharged from the bag body 632.

In this way, it is possible to adjust the movable range of the lumbar support member 630 according to the physique of the seated occupant.

Figure 35:
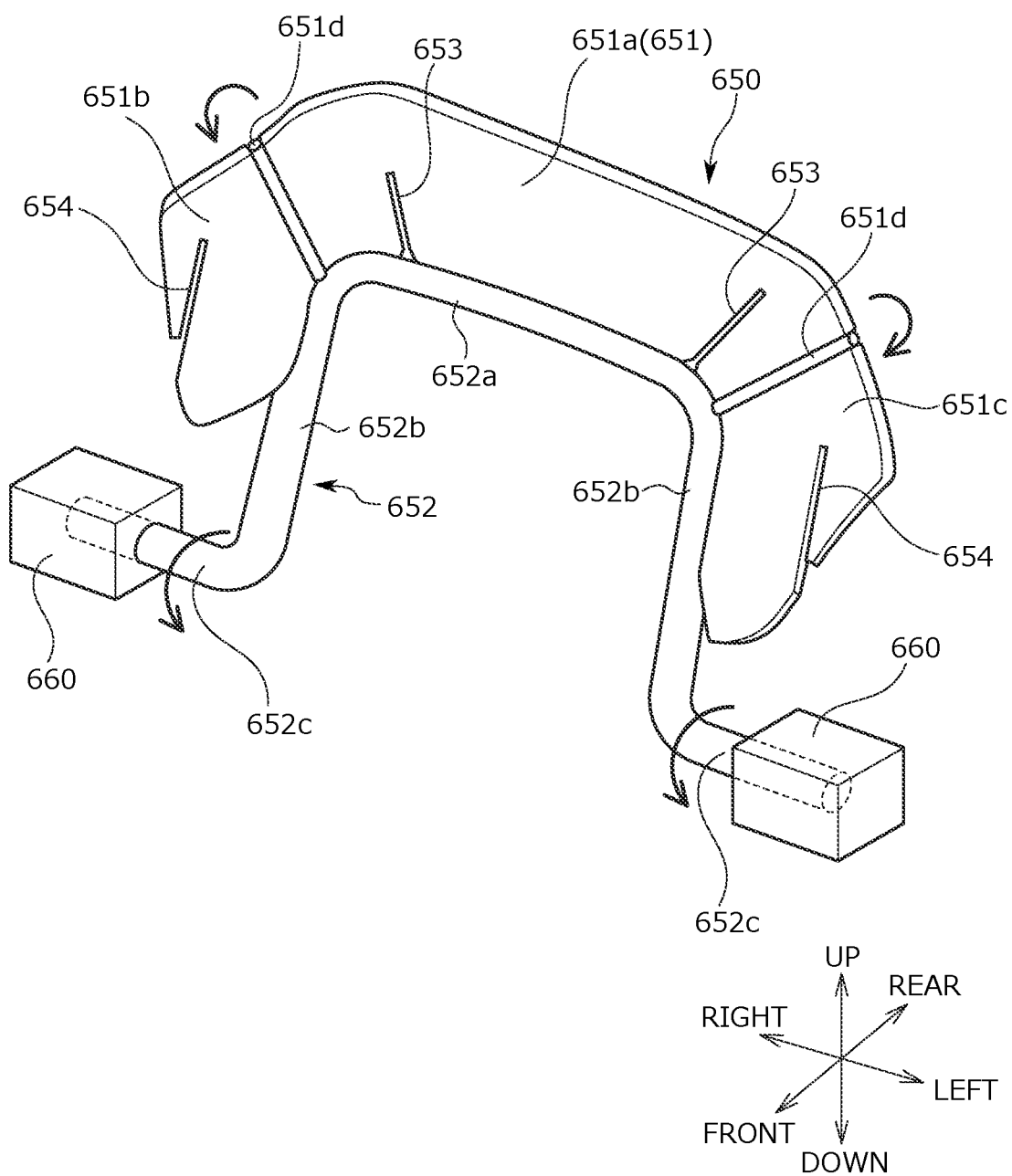
FIG. 35 is a perspective view showing a movable body and a driving device.

The movable body 650 is, as shown in FIGS. 33 and 35, a shoulder support member that is disposed in the upper part of the seat back 602 inside the seat back 602 and supports the shoulder of the seated occupant.

Specifically, the movable body 650 includes a movable main body 651 which is attached to the upper part of the back frame 620 and a rotating shaft 652 which connects the movable main body 651 and the back frame 620 and is attached to the back frame 620 to be rotatable together with the movable main body 651.

The movable main body 651 consists of a curved resin plate and includes a center movable portion 651a which is disposed at the center portion of the movable main body 651 in the seat width direction and side movable portions 651b and 651c which are respectively attached to both right and left end portions of the center movable portion 651a in the seat width direction.

The center movable portion 651a is a plate body which is elongated in the seat width direction and is formed so that the entire length in the seat width direction becomes shorter as it goes from the upper end portion toward the lower end portion.

The side movable portions 651b and 651c are rotatably attached to the center movable portion 651a through an attachment shaft 651d.

The side movable portions 651b and 651c extend to protrude downward and outward in the seat width direction from the center movable portion 651a.

Additionally, the attachment shaft 651d extends to be inclined inward in the seat width direction as it goes from the top to the bottom when viewed from the front of the seat.

The rotating shaft 652 has a substantially inverted U shape and extends to be elongated in the seat width direction.

Specifically, the rotating shaft 652 includes a shaft main body 652a which is connected to the lower end portion of the movable main body 651 (center movable portion 651a) and extends in the seat width direction, right and left first shaft extending portions 652b which are respectively curved from both right and left end portions of the shaft main body 652a and extend downward, and right and left second shaft extending portions 652c which are respectively curved from the right and left first shaft extending portions 652b and extend outward in the seat width direction. Then, the extension end portion of the second shaft extending portion 652c is connected to the driving device 660.

The driving device 660 is an actuator which is fixed to the rear surface of the back side frame 621 and is driven to rotate the rotating shaft 652.

When the driving device 660 is driven in the forward direction, the rotating shaft 652 rotates to fall toward the seat front side and the movable main body 651 rotates toward the seat front side together with the rotating shaft 652.

Further, when the driving device 660 is driven in the opposite direction, the rotating shaft 652 rotates to return to the seat rear side and the movable main body 651 rotates toward the seat rear side together with the rotating shaft 652.

Bending Prompting Portion of Movable Body

Figure 36:
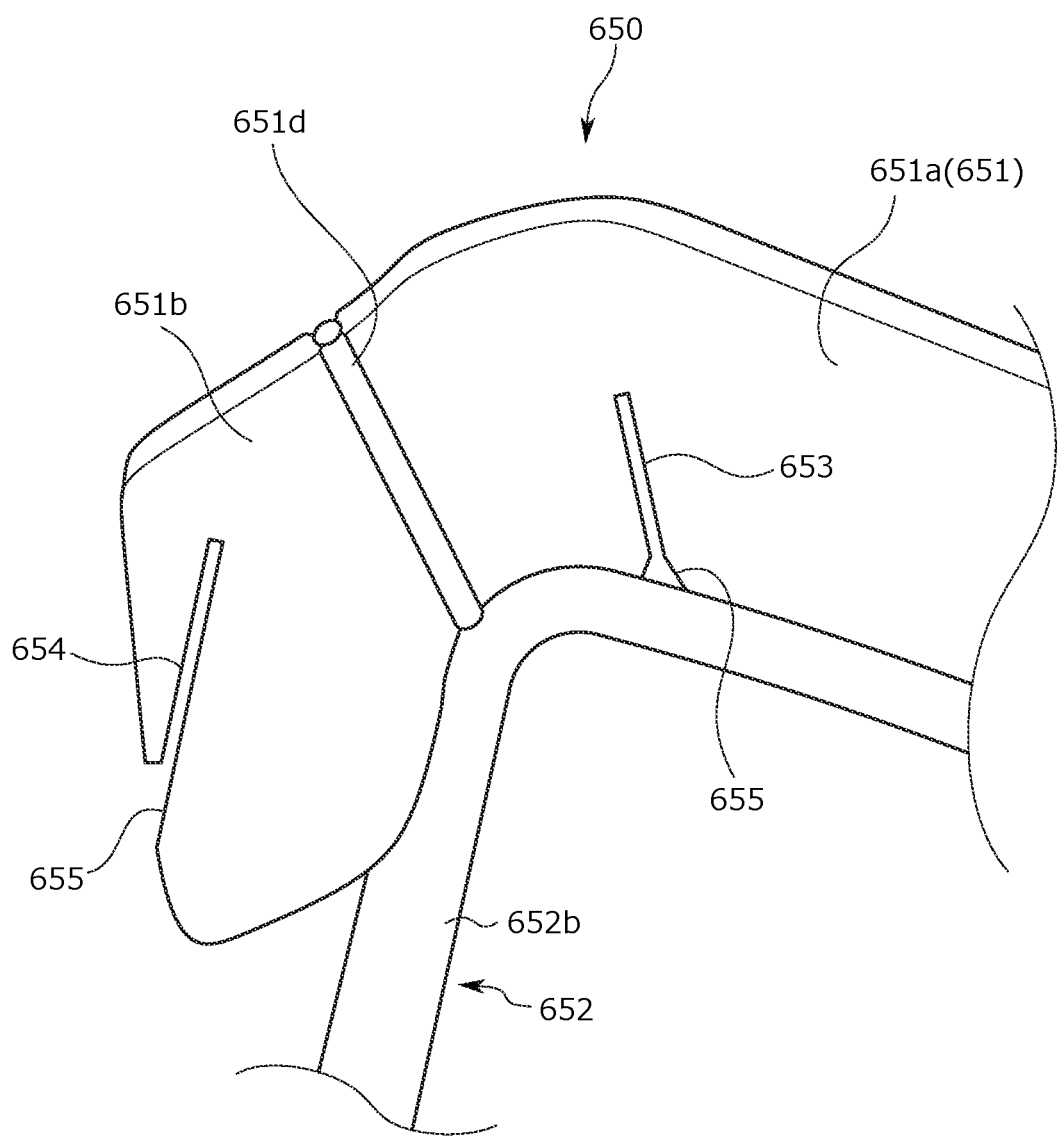
FIG. 36 is a main enlarged view showing the movable body.

As shown in FIGS. 35 and 36, the center movable portion 651a and the side movable portions 651b and 651c are provided with bending prompting portions 653 and 654 which allow the movable body 650 to be easily bent when the occupant sits on the seat main body.

The bending prompting portions 653 and 654 are slit grooves which are respectively formed on the outer edge portions of the center movable portion 651a and the side movable portion 651b.

The bending prompting portions 653 are formed on the right and left sides with a predetermined gap therebetween in the seat width direction and are formed by notching to extend upward from the lower end of the center movable portion 651a. Specifically, the bending prompting portion 653 extends upward from the lower end of the center movable portion 651a beyond the middle portion in the up to down direction.

The bending prompting portion 654 is formed by notching to extend upward from the lower ends of the side movable portions 651b and 651c. Specifically, the bending prompting portion 654 extends from the lower ends of the side movable portions 651b and 651c to the position reaching the lower end portion of the center movable portion 651a.

Alternatively, the bending prompting portion extends upward beyond the lower end portion of the center movable portion 651a.

Therefore, when the movable body 650 is applied to the seated occupant, a sitting load according to the physique of the seated occupant is applied to the movable body 650 and the movable body 650 can be preferably bent (moved). As a result, the holdability of the seated occupant can be enhanced.

In the above-described configuration, as shown in FIG. 36, the bending prompting portion 654 extends in the extension direction of the rotating shaft 652 (first shaft extending portion 652b).

Therefore, the bending prompting portion 654 (slit groove) is formed along the extension direction of the relatively rigid rotating shaft 652 and the bending direction of the movable body 650 can be stabilized by the bending prompting portion 654.

Further, in the above-described configuration, as shown in FIG. 36, a notch portion 655 (gouging portion) which suppresses the interference when partially bent with the slit groove as a boundary is formed in a portion provided with the bending prompting portions 653 and 654 (slit grooves) in the outer edge portions of the center movable portion 651a and the side movable portions 651b and 651c.

The notch portion 655 is formed at the base end portions of the bending prompting portions 653 and 654 and is formed so that the width becomes narrower as it goes from the base end portion toward the extension end portion. Specifically, the notch portion 655 is a substantially triangular notch portion.

Therefore, it is possible to suppress the partial interference when the center movable portion 651a and the side movable portions 651b and 651c are partially bent with the slit as a boundary.

Further, in the above-described configuration, as shown in FIG. 33, the bending prompting portions 653 and 654 are located in a region surrounded by the rectangular frame-shaped back frame 620.

Therefore, the movable body 650 can be more preferably bent with a simple configuration. As a result, the holdability of the seated occupant can be enhanced.

Further, in the above-described configuration, as shown in FIG. 32, the movable main body 651 is disposed at the upper position of the pull-in groove upper portion 602ab (skin material pull-in groove).

Therefore, it is possible to suppress wrinkles or saggings from occurring on the skin material 602b of the seat back 602.

In more detail, it is generally known that wrinkles or saggings noticeably occur on the skin material 602b in the periphery of the skin material pull-in groove when the movable body 650 allows the seat back 602 to protrude toward the seated occupant side. Therefore, countermeasures can be taken to suppress wrinkles or saggings from occurring on the skin material 602b in the periphery.

Further, in the above-described configuration, the bending prompting portion 654 formed in the side movable portions 651b and 651c is disposed on the outside of the right and left skin material pull-in grooves (pull-in groove side portions) in the seat width direction.

Therefore, the movable body 650 easily follows the body of the seated occupant.

According to the conveyance seat S7 of the present invention, the conveyance seat may include a seat main body on which an occupant sits and a movable body which is attached inside the seat main body and is operated so that a portion of the seat main body protrudes toward the seated occupant side, wherein the movable body may include a center movable portion which is disposed at the center portion of the movable body in the seat width direction and side movable portions which are respectively attached to both right and left end portions of the center movable portion in the seat width direction, and wherein at least one of the center movable portion and the side movable portions may be provided with a bending prompting portion which allows the movable body to be easily bent when the occupant sits on the seat main body.

In this way, it is possible to realize the conveyance seat capable of enhancing the holdability of the seated occupant when the movable body attached to the seat main body is operated.

Specifically, the movable body (the center movable portion and the side movable portion) is provided with the bending prompting portion which allows the movable body to be easily bent when the occupant sits on the seat main body. Therefore, when the movable body is applied to the seated occupant, a sitting load according to the physique of the seated occupant is applied to the movable body and the movable body can be preferably bent. As a result, the holdability of the seated occupant can be enhanced.

Further, since the movable body is easily bent, it is possible to allow the body of the seated occupant to sink into the seat main body when an excessive load is applied to the seated occupant from the outside.

At this time, the movable body is the support member that is attached to the upper part of the seat back inside the seat back and supports the seated occupant from behind and when the occupant sits on the seat main body, the center movable portion and the right and left side movable portions may move according to the sitting load applied to the seat main body.

In this way, when the movable body is applied to the seated occupant, the movable body can be preferably bent according to the physique of the seated occupant and can follow the physique of the seated occupant.

Others

In the above-described embodiments, as shown in FIG. 32, the movable body 650 is attached to the seat back 602, but may be attached to the seat cushion 601 without any particular limitation.

In the above-described embodiments, as shown in FIGS. 33 and 34, the lumbar support member 630 is configured as a bag body (air cell) and the operating device 640 is configured as a fluid supply device. However, these can be changed without any particular limitation.

For example, the "lumbar support member" and the "operating device" may be configured as mechanical mechanisms. Specifically, the "lumbar support member" may be configured to be operated by a link mechanism, a hinge mechanism, or the like and the "operating device" may be configured as a driving device and the like operated by a motor or a hydraulic pressure.

In the above-described embodiments, as shown in FIGS. 32 and 33, the lumbar support member 630 and the movable body 650 are arranged on the back surface side of the cushion material 602a, but may be arranged on the surface side of the cushion material 602a without any particular limitation.

In the above-described embodiments, as shown in FIG. 35, the center movable portion 651a and the side movable portions 651b and 651c are respectively provided with the bending prompting portions 653 and 654, but any one of them may be provided with the bending prompting portions without any particular limitation.

In the above-described embodiments, as shown in FIG. 35, the bending prompting portions 653 and 654 are formed as the slit grooves, but may be other than the slit groove without any particular limitation.

For example, the bending prompting portions 653 and 654 may be slits formed by simple cuts or may be partially thin portions. Alternatively, the bending prompting portions may be a low-hardness portion having a partially lowered hardness or a partially soft portion (flexible portion).

In the above-described embodiments, as shown in FIG. 35, the side movable portions 651b and 651c are rotatably attached to the center movable portion 651a through the attachment shaft 651d, but the attachment shaft 651d may not be provided without any particular limitation.

In that case, it is preferable that the bending prompting portion (for example, the slit groove) is formed in the connection portion between the center movable portion 651a and the side movable portions 651b and 651c.

In this way, the side movable portions 651b and 651c can be preferably bent with respect to the center movable portion 651a with a simple configuration.

In addition to the above-described embodiments, a plurality of through holes penetrating in the front to back direction of the seat may be formed in a portion facing the movable body 650 in the cushion material 602a.

At this time, it is preferable that the plurality of through holes and the bending prompting portions 653 and 654 of the movable body 650 are arranged at height positions overlapping each other in the up to down direction.

In this way, the movable body 650 easily follows the body of the seated occupant.

Eighth Embodiment of Conveyance Seat

Next, a conveyance seat S8 of an eighth embodiment will be described with reference to FIG. 37.

Additionally, the description of the content that overlaps with the conveyance seats S1 to S7 described above will be omitted.

The conveyance seat S8 includes a seat main body, a movable body 750 (shoulder support) which is operated so that an upper part of a seat back 702 protrudes toward a seated occupant side, a driving device 760 (actuator) which drives the movable body 750, and a side airbag device 770 which is attached to the outer surface of the seat back 702 in the seat width direction and reduces an impact applied from the side of the conveyance.

The side airbag device 770 is attached to the outer surface of the back side frame 721 and extends in the up to down direction of the back side frame 721.

At this time, the movable main body 751 is disposed at an upper position of the side airbag device 770 and is disposed on the inside of the side airbag device 770 in the seat width direction.

Therefore, the interference between the movable body 750 and the side airbag device 770 is suppressed and the movable body 750 can be preferably operated.

Additionally, the side airbag device 770 has a stay cloth that guides the inflating direction of the airbag module. Then, a stay cloth attachment portion (not shown) for attaching the stay cloth is fixed to a predetermined position of the back side frame 721.

At this time, the movable main body 751 is disposed above the stay cloth attachment portion.

In this way, the movable body 750 can be preferably bent.

Figure 37:
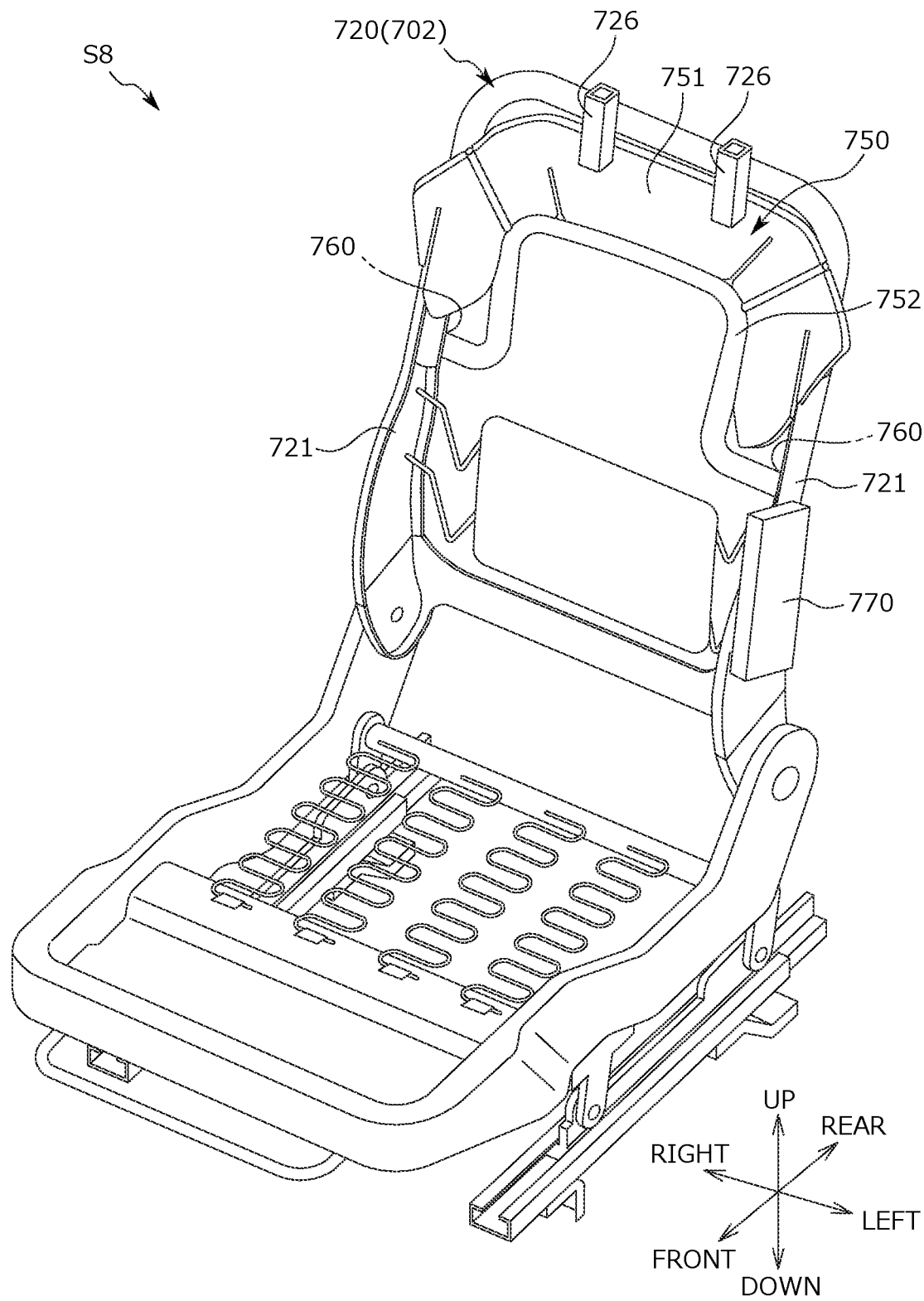
FIG. 37 is a perspective view showing a seat frame of a conveyance seat of an eighth embodiment.

In the above-described configuration, as shown in FIG. 37, a pillar attachment member 726 for attaching the pillar of the headrest is attached to the front surface of the movable body 750.

Then, the movable body 750 is rotatable in the front to back direction of the seat about a rotating shaft 752 with respect to a back frame 720 together with the headrest.

Therefore, the headrest can be preferably rotated with respect to the back frame.

Ninth Embodiment of Conveyance Seat

Next, a conveyance seat S9 of a ninth embodiment will be described with reference to FIG. 38 to FIGS. 44A and 44B.

Additionally, the description of the content that overlaps with the conveyance seats S1 to S8 described above will be omitted.

The conveyance seat S9 provides a conveyance seat capable of stably operating a movable body attached to a seat main body.

Further, the conveyance seat provides a conveyance seat capable of compactly arranging components of the conveyance seat.

Figure 38:
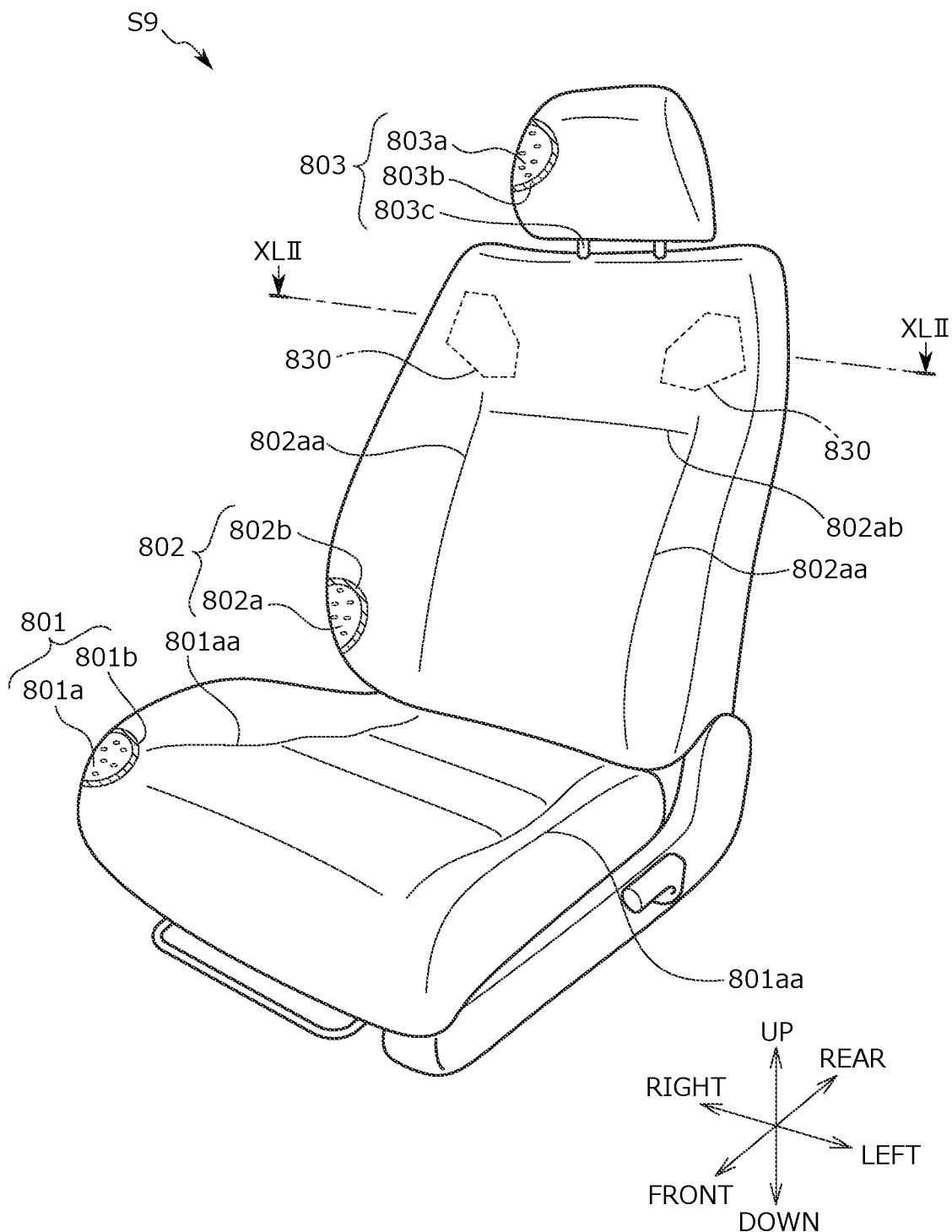
FIG. 38 is an external perspective view of a conveyance seat of a ninth embodiment.

The conveyance seat S9 is, as shown in FIG. 38, a vehicle seat and includes a seat main body which includes a seat cushion 801, a seat back 802, and a headrest 803, a movable body 830 (shoulder support member) which is attached inside the seat back 802 and is operated so that a side portion 802B of the seat back 802 moves between the "normal position" and the "protruding position" protruding from the normal position toward the seated occupant side, and an operating device 840 (fluid supply device) which is operated so that the movable body 830 is operated.

The seat cushion 801 is, as shown in FIG. 38, a seating portion which supports the seated occupant from below and has a configuration in which a cushion material 801*a* is placed on a cushion frame 810 serving as a framework and shown in FIG. 39 and is covered with a skin material 801*b*.

The seat cushion 801 includes a center portion 801A which is located at the center part in the seat width direction and right and left side portions 801B (side bolster portions) which are located on the outside of the center portion 801A in the seat width direction.

The cushion material 801*a* is a pad member formed of foamed urethane or the like.

Right and left pull-in grooves 801*aa* which extend in the front to back direction of the seat to separate the center portion 1A and the right and left side portions 1B are formed on the surface of the cushion material 801*a*.

Figure 39:
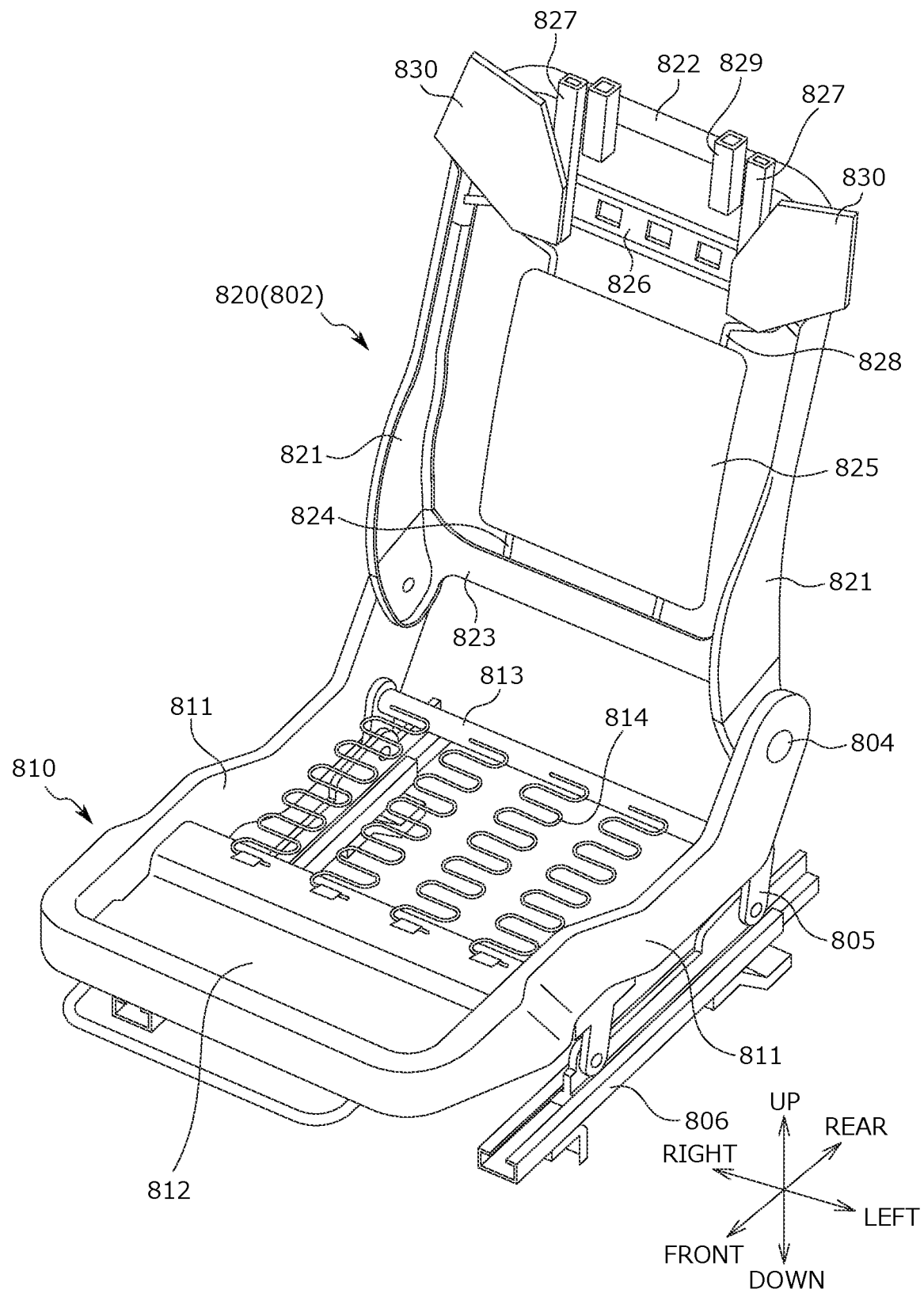
FIG. 39 is a perspective view showing a seat frame serving as a framework.

The seat back 802 is, as shown in FIGS. 38 and 41, a backrest portion which supports the back of the seated occupant from behind and has a configuration in which a cushion material 802*a* is placed on a back frame 820 serving as a framework and shown in FIG. 39 and is covered with a skin material 802*b*.

The seat back 802 includes a center portion 802A which is located at the center part in the seat width direction and right and left side portions 802B (side bolster portions) which are located on the outside of the center portion 802A in the seat width direction.

Right and left pull-in groove side portions 802*aa* (pull-in grooves) which extend in the up to down direction to separate the center portion 802A and the right and left side portions 802B and a pull-in groove upper portion 802*ab* (pull-in groove) which extends in the seat width direction to connect the upper portions of the right and left pull-in groove side portions 802*aa* are formed on the surface of the cushion material 802*a*.

The headrest 803 is, as shown in FIGS. 38 and 41, a head portion which supports the head of the occupant from behind and has a configuration in which a cushion material 803*a* is placed on a pillar 803*c* serving as a core material and is covered with a skin material 803*b*.

Additionally, as shown in FIG. 41, a pillar attachment member 829 for attaching the pillar 803*c* supporting the main body of the headrest 803 is assembled to the upper portion of the back frame 820.

The cushion frame 810 consists of, as shown in FIG. 39, a substantially rectangular frame-shaped body and mainly includes cushion side frames 811 which are arranged on the right and left sides, a plate-shaped pan frame 812 (installation frame) which is installed in the front end part of each cushion side frame 811, a rear connection frame 813 which connects the rear part of each cushion side frame 811, and a plurality of elastic springs 814 (elastic support members) which are hooked to the pan frame 812 and the rear connection frame 813 and extend in a snake shape in the front to back direction of the seat.

The cushion side frame 811 is a plate-shaped frame which is elongated in the front to back direction of the seat.

Additionally, a reclining device 804 is attached to the rear part of the cushion side frame 811 and a rail device 806 is attached to the lower part thereof through a height link device 805.

Figure 40:
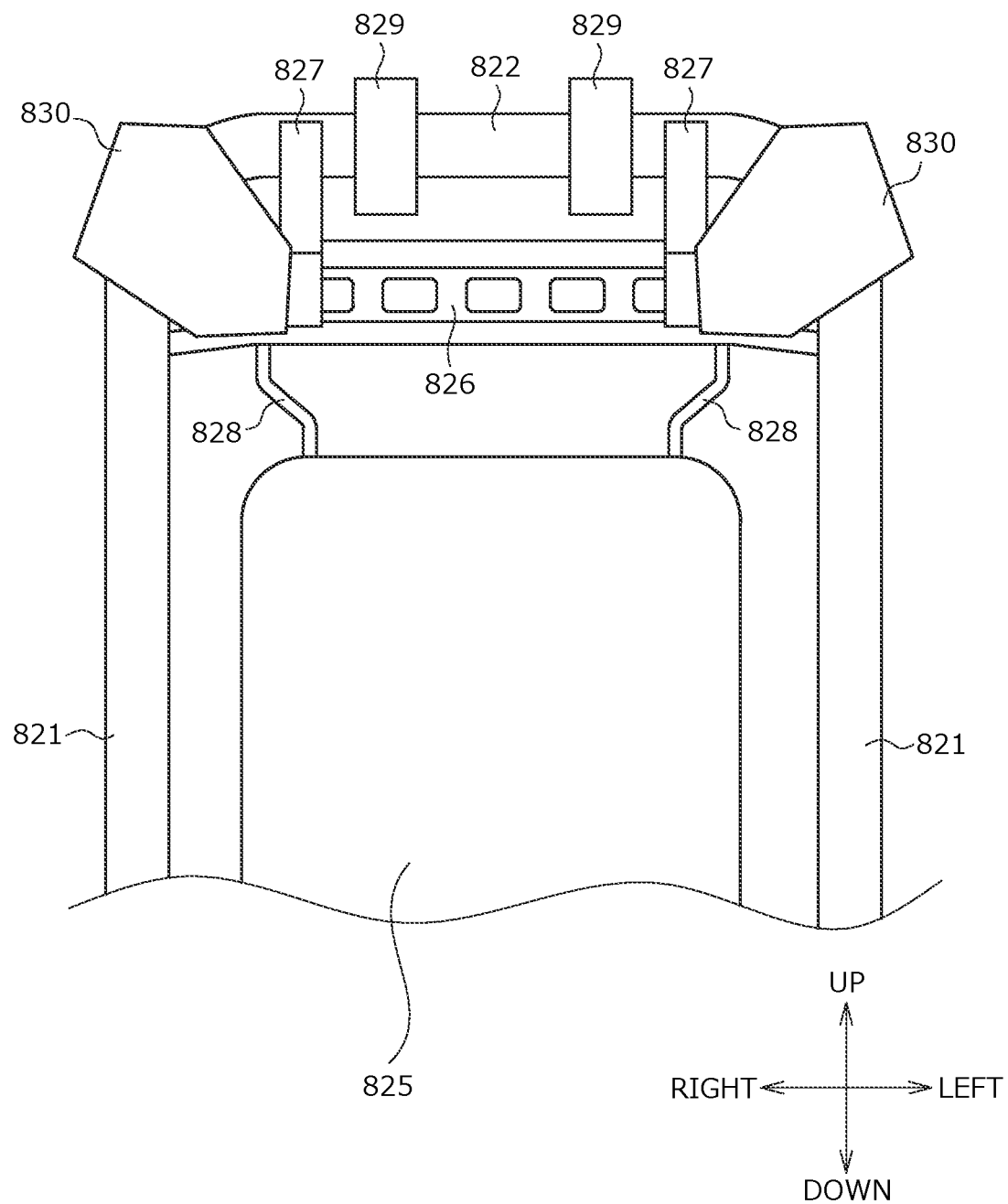
FIG. 40 is a front view showing a seat frame.

The back frame 820 consists of, as shown in FIGS. 39 to 41, a substantially rectangular frame-shaped body and mainly includes back side frames 821 which are arranged on the right and left sides, an inverted U-shaped upper frame 822 which connects the upper end part of each back side frame 821, a plate-shaped lower frame 823 which connects the lower end part of each back side frame 821, a plurality of wire members 824 (elastic wires) which extend in the up to down direction and are hooked to the lower frame 823, and a support plate 825 which is held by the plurality of wire members 824 and supports the seated occupant.

Further, the back frame 820 includes a second connection frame 826 (cross member) which is disposed at a position different from the upper frame 822 in the extension direction of the back side frame 821 and connects the upper parts of the right and left back side frames 821, a connection member 827 (connection bracket) which connects the upper frame 822 and the second connection frame 826, and a second wire member 828 which extends in the up to down direction and connects the second connection frame 826 and the support plate 825.

Further, the back frame 820 further includes a pillar attachment member 829 that is attached to the center part of the upper frame 822 in the seat width direction and attaches the pillar 803*c* of the headrest 803.

The back side frame 821 is a metal plate member that extends in the up to down direction and has a substantially C-shaped cross-section and the lower end part thereof is connected to the rear end part of the cushion side frame 811 through the reclining device 804.

In the above-described configuration, the back frame 820 is relatively rotatable with respect to the cushion frame 810.

The connection member 827 is a bracket which extends in the up to down direction and has a substantially rectangular cross-section and bridges the front surface of the upper frame 822 and the front surface of the second connection frame 826.

The connection members 827 are arranged on the right and left sides with a predetermined gap therebetween in the seat width direction.

The right and left movable bodies 830 are respectively attached to the front surfaces of the right and left connection members 827.

In the above-described configuration, as shown in FIG. 40, the connection member 827 is disposed at a position on the outside of the pillar attachment member 829 in the seat width direction.

Therefore, it is possible to suppress the interference between the movable body 830 attached to the connection member 827 and the pillar 803c attached to the pillar attachment member 829. Further, it is possible to suppress an increase in size of the conveyance seat S9 in the front to back direction of the seat.

In the above-described configuration, as shown in FIG. 40, the connection member 827 is disposed on the inside of the second wire member 828 in the seat width direction.

Therefore, it is possible to suppress the interference between the movable body 830 attached to the connection member 27 and the second wire member 828. Further, it is possible to suppress an increase in size of the conveyance seat S9 in the front to back direction of the seat.

In the above-described configuration, as shown in FIG. 41, the connection member 827 is disposed at the upper position of the pull-in groove upper portion 802ab.

Therefore, the movable body 830 attached to the connection member 827 and the skin material pull-in groove (pull-in groove upper portion 802ab) are arranged at the separated positions in the up to down direction. Therefore, it is possible to suppress wrinkles or saggings from occurring on the skin material 802b of the seat back 802.

In more detail, it is generally known that wrinkles or saggings noticeably occur on the skin material 802b in the periphery of the skin material pull-in groove when the movable body 830 allows the side portion 802B of the seat back 802 to protrude toward the seat front side. Therefore, countermeasures can be taken to suppress wrinkles or saggings from occurring on the skin material 802b in the periphery.

The movable body 830 includes, as shown in FIG. 39 to FIGS. 42A and 42B, a bag body (air cell) which inflates when a fluid is enclosed and is operated to inflate toward the seated occupant side (to protrude from the normal position toward the protruding position) when compressed air serving as a fluid is enclosed and to contract (to return to the normal position) when the enclosed compressed air is discharged.

Specifically, the movable body 830 is a shoulder support member that is attached to the back surface of the cushion material 802a in the side portion 802B of the upper part of the seat back 802 and is operated so that the side portion 802B protrudes toward the seated occupant side.

The movable bodies 830 are arranged on the right and left sides with a predetermined gap therebetween in the seat width direction and are respectively attached to the front surface of the connection member 827. In more detail, the movable bodies are attached to an overlapping portion connected to the second connection frame 826 in the front surface of the connection member 827.

Additionally, the movable body 830 is attached in a folded state.

The movable body 830 has a substantially pentagonal shape elongated in the seat width direction and extends to protrude outward in the seat width direction from the connection member 827.

In more detail, the movable body 830 mainly includes a base member 831 that is supported by the connection member 827 and a plurality of bag bodies 834 which are arranged at the seat front position in relation to the base member 831 and are supported by the front surface of the base member 831.

The base member 831 is a plate member elongated in the seat width direction and bridges (is connected to) the front surface of the connection member 827 and the front surface of the back side frame 821.

The plurality of bag bodies 834 are supported by the base member 831 and can inflate toward the seat front side when compressed air is enclosed from a folded state.

Additionally, the plurality of bag bodies 834 are attached to the base member 831 by an attachment member 832 attached to the inner end portion of the front surface of the base member 831 in the seat width direction.

The plurality of bag bodies 834 are arranged at different positions in the front to back direction of the seat and the seat width direction to have different sizes.

In more detail, the plurality of bag bodies 834 are configured as three bag bodies and a first bag body 834a which is located closest to the seat front side in the plurality of bag bodies 834 is configured to have the smallest capacity than the other bag bodies. Then, the capacity of the second bag body 834b is the largest and the capacity of the third bag body 834c is medium.

With the above-described configuration, it is possible to adjust the protruding direction or protruding amount of the seat back 802 (side portion 802B) by inflating the plurality of bag bodies 834 located at different positions and having different sizes.

Further, it is possible to suppress wrinkles or saggings from occurring on the skin material 802b of the seat back 802 by adjusting the protruding direction or protruding amount of the side portion 802B of the seat back 802.

In the above-described configuration, the movable body 830 can be operated (inflated) so that the side portion 802B (shoulder portion) of the seat back 802 moves from the "normal position" shown in FIG. 42A to the "protruding position" shown in FIG. 42B. A detailed description will be given below.

FIG. 42A is a transverse cross-sectional view of the seat back 802 and is a view showing a state in which the side portion 802B of the seat back 802 is located at the "normal position".

The movable body 830 is disposed between the back frame 820 and the skin material 802b in the front to back direction of the seat. Specifically, the movable body is attached to the front surface of the connection member 827 and is disposed on the back surface of the cushion material 802a.

The operating device 840 (fluid supply device) which supplies compressed air to the plurality of bag bodies 834 (air cells) is disposed at the rear position in relation to the cushion material 802a inside the seat back 802.

The operating device 840 is attached to a predetermined position of the center part of the back frame 820. Specifically, the operating device mainly includes an air pump 841 which can supply (feed) and discharge (exhaust) compressed air and an air pipe 842 which connects the air pump 841 and the movable body 830 (bag body 834).

For example, the operating device 840 can supply compressed air to the bag body 834 or discharge compressed air from the bag body 834 by receiving a predetermined control signal from a control device (not shown). At this time, the control device may receive a selection of a predetermined user operation by the seated occupant and transmit the control signal.

In this way, it is possible to adjust the movable range of the movable body 830 according to the physique of the seated occupant.

FIG. 42B is a view showing a state in which the movable body 830 (bag body 834) protrudes toward the seat front side and the side portion 802B of the seat back 802 moves from the "normal position" to the "protruding position".

Specifically, when compressed air is supplied from the operating device 840, the folded bag body 834 inflates and deploys toward the seat front side and the side portion 802B moves toward the seat front side. As a result, the side portion 802B of the seat back 802 moves to the "protruding position".

Additionally, when compressed air inside the bag body 834 is discharged by the operating device 840, the inflated bag body 834 contracts and the side portion 802B is lowered toward the seat rear side. As a result, the side portion of the seat back 802 returns from the "protruding position" to the "normal position".

In the above-described configuration, as shown in FIG. 42B, the side portion of the seat back 802 is configured to protrude toward the seat front side and inward in the seat width direction by the movable body 830 (bag body 834).

Particularly, right and left shoulder portions of the seat back 802 are configured to protrude toward the seat front side and diagonally downward and inward in the seat width direction.

In this way, the sitting feeling of the seated occupant can be enhanced.

According to the conveyance seat S9 of the present invention, the conveyance seat may include a seat main body on which an occupant sits and a movable body which is attached inside the seat main body and is operated so that a portion of the seat main body protrudes toward the seated occupant side, wherein the seat main body may include a seat frame which serves as a framework, wherein the seat frame may include side frames which are arranged on the right and left sides in the seat width direction and extend in a predetermined direction, a connection frame which connects end portions of the right and left side frames in the extension direction, a second connection frame which is disposed at a position different from the connection frame in the extension direction of the side frame and connects the right and left side frames, and a connection member that connects the connection frame and the second connection frame, and wherein the movable body may be attached to the connection member.

In this way, it is possible to realize the conveyance seat capable of stably operating the movable body attached to the seat main body.

Specifically, the movable body is attached to the connection member that is a relatively rigid component of the seat frame. Therefore, it is possible to suppress the deformation of the movable body even when a load generated by the seated occupant is applied to the movable body. As a result, it is possible to stably operate the movable body.

At this time, the seat main body may have a configuration in which a cushion material is placed on the seat frame and is covered with a skin material and the movable body may be provided on a back surface of the cushion material in the side portion of the seat main body in the seat width direction, may be operated so that the side portion of the seat main body protrudes toward the seated occupant side, and may be attached to a portion connected to the second connection frame in the connection member.

With the above-described configuration, the movable body is attached to a more rigid portion of the seat frame. Therefore, it is possible to more stably operate the movable body.

Ninth and Tenth Modified Examples of Movable Body

Next, ninth and tenth modified examples of the movable body will be described with reference to FIGS. 43A and 43B and FIGS. 44A and 44B.

Additionally, the description of the content that overlaps with the conveyance seat S9 described above will be omitted.

Figure 43A:
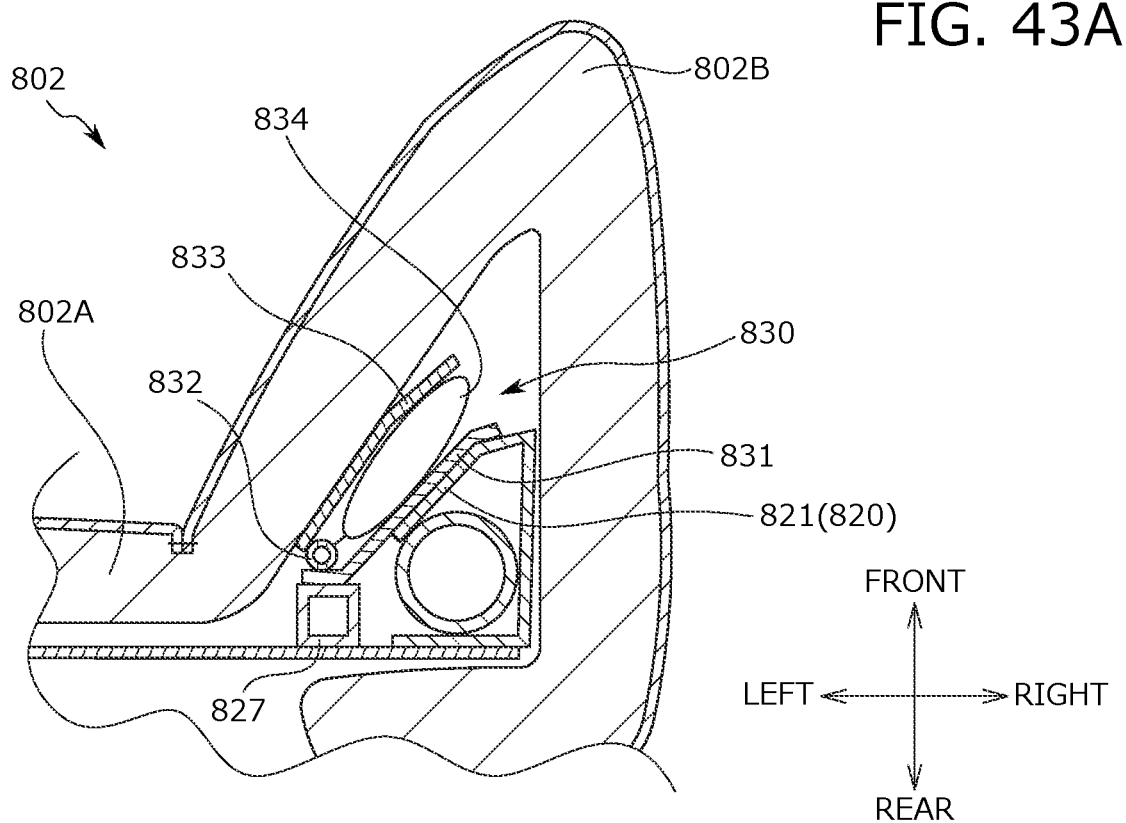
FIG. 43A is a view showing a ninth modified example of the movable body and is a view describing a state in which the side portion of the seat back is located at a "normal position".
Figure 43B:
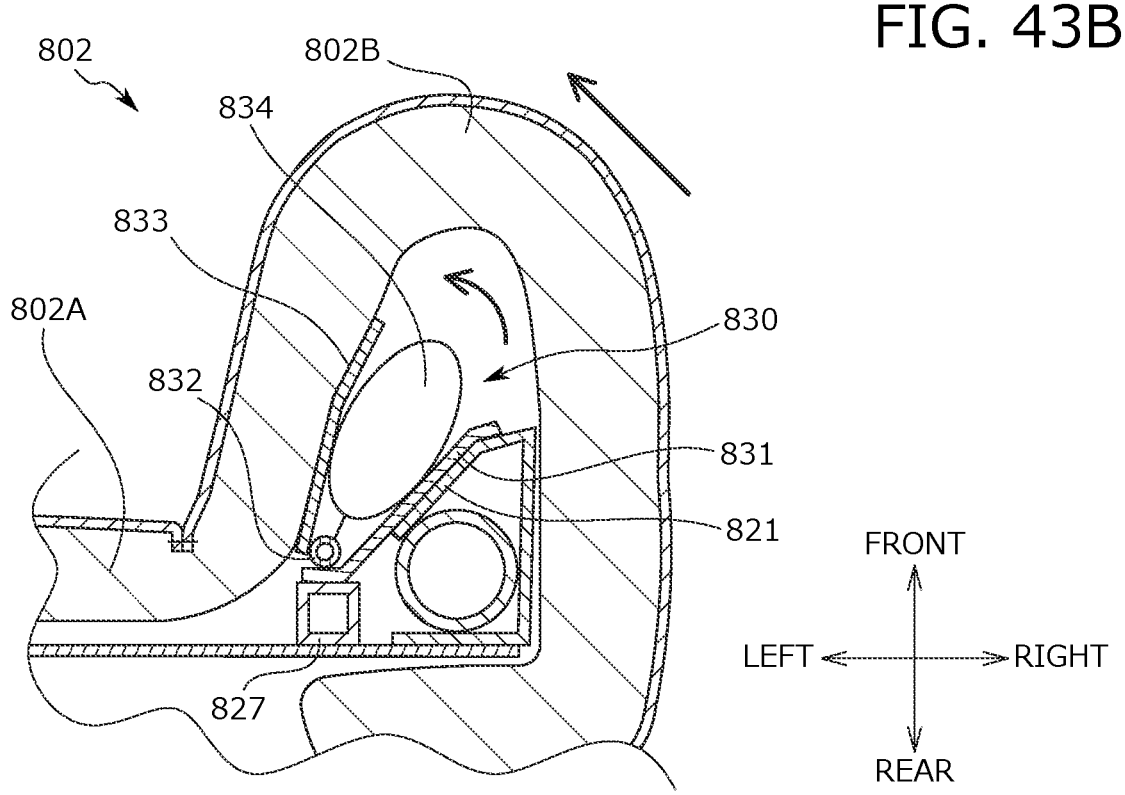
FIG. 43B is a view describing a state in which the side portion of the seat back is located at a "protruding position".

The movable body 830 of the ninth modified example mainly includes, as shown in FIGS. 43A and 43B, the base member 831, a rotating member 833 that is disposed at the seat front position in relation to the base member 831 and is rotatably attached to the base member 831 through a rotating shaft 832, and one bag body 834 which is disposed between the base member 831 and the rotating member 833 and is supported by the front surface of the base member 831.

The base member 831 bridges the front surface of the connection member 827 and the front surface of the back side frame 821.

The rotating shaft 832 is attached to the inner end portion of the front surface of the base member 831 in the seat width direction. In other words, the rotating shaft is attached to an overlapping portion of the base member 831 and the connection member 827.

The rotating member 833 is attached to the base member 831 to be rotatable in the front to back direction of the seat and is rotated toward the seat front side so that the side portion 802B of the seat back 802 can protrude (be pushed out) toward the seat front side.

Additionally, the rotating member 833 is disposed at a position shifted toward the base member 831 when the seat back 802 is located at the normal position. The rotating member may be biased toward the base member 831 by a biasing spring (biasing member) (not shown).

The bag body 834 is supported by the base member 831 and inflates toward the seat front side when compressed air is enclosed so that the rotating member 833 can be pushed out toward the seat front side. That is, the rotating member 833 can be rotated toward the seat front side.

FIG. 43B is a view showing a state in which the movable body 830 (rotating member 833) protrudes toward the seat front side and the side portion 802B of the seat back 802 moves from the "normal position" to the "protruding position".

Specifically, when compressed air is supplied from the operating device 840, the folded bag body 834 inflates and deploys toward the seat front side and the rotating member 833 is pushed out toward the seat front side so that the side portion 802B moves toward the seat front side. As a result, the side portion 802B moves to the "protruding position".

Figure 44A:
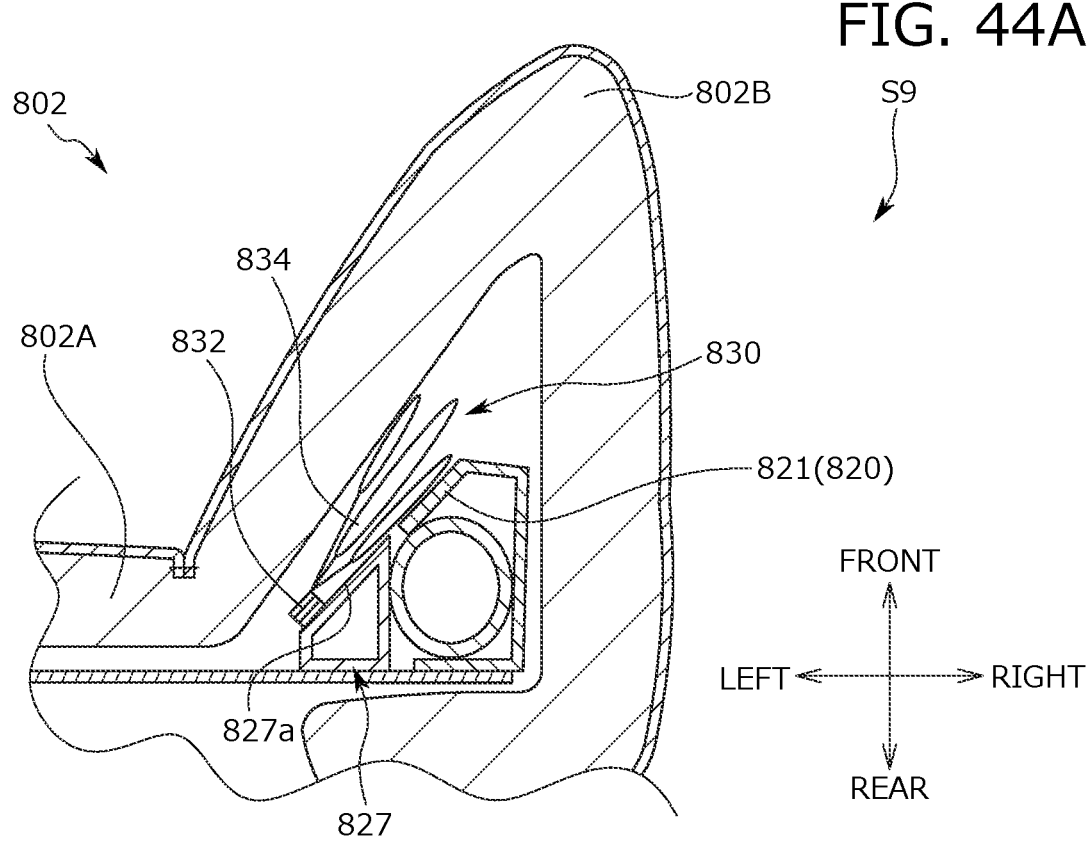
FIG. 44A is a view showing a tenth modified example of the movable body and is a view describing a state in which the side portion of the seat back is located at a "normal position".
Figure 44B:
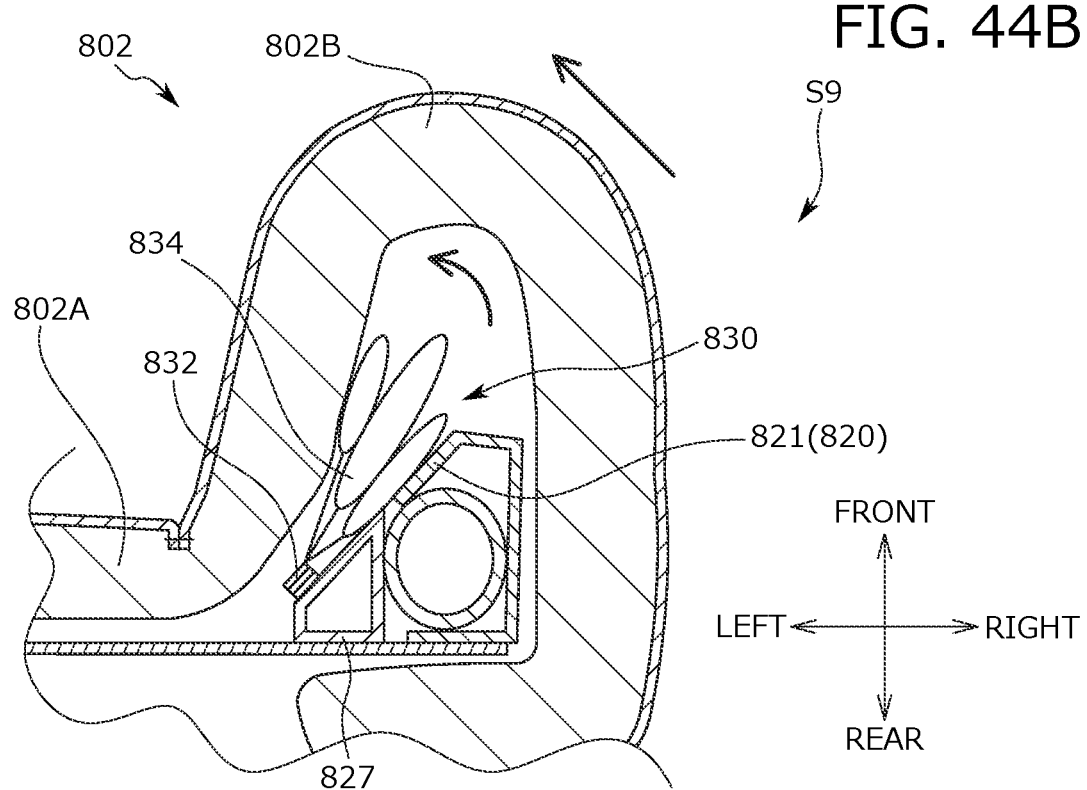
FIG. 44B is a view describing a state in which the side portion of the seat back is located at a "protruding position".

The movable body 830 of the tenth modified example consists of, as shown in FIGS. 44A and 44B, the plurality of bag bodies 834 which are supported by the front surface of the connection member 827.

The plurality of bag bodies 834 bridges the front surface of the connection member 827 and the front surface of the back side frame 821.

At this time, the connection member 827 includes a support surface 827a which supports the movable body 830

(bag body 834) and the support surface 827a extends in the extension direction of the bag body 834 and supports the bag body 834. In other words, the support surface 827a and the bag body 834 are arranged to overlap in the seat width direction.

The plurality of bag bodies 834 are configured as three bag bodies and are arranged at different positions in the front to back direction of the seat and the seat width direction to have different sizes.

Additionally, the plurality of bag bodies 834 are attached to the connection member 827 by the attachment member 832 attached to the inner end portion of the support surface 827a of the connection member 827 in the seat width direction.

FIG. 44B is a view showing a state in which the movable body 830 (bag body 834) protrudes toward the seat front side and the side portion 802B of the seat back 802 moves from the "normal position" to the "protruding position".

Specifically, the folded bag body 834 inflates and deploys towards the seat front side, so that the side portion 802B moves toward the seat front side. As a result, the side portion 802B of the seat back 802 moves to the "protruding position".

Others

In addition to the above-described embodiments, a plurality of through holes penetrating in the front to back direction of the seat may be formed in a portion facing the movable body 830 in the cushion material 802a.

At this time, it is preferable that the plurality of through holes and the connection member 827 are arranged at an overlapping position in the seat width direction. Alternatively, it is preferable that the plurality of through holes are arranged on the outside of the connection member 827 in the seat width direction.

In this way, the cushion material 802a is preferably and easily bent and the movable body 830 can be stably operated.

In addition to the above-described embodiments, it is preferable that the right and left connection members 827 and the right and left skin material pull-in grooves (pull-in groove side portions 802aa) are formed at an overlapping position in the seat width direction. Alternatively, it is preferable that the right and left connection members 827 are arranged on the outside of the right and left skin material pull-in grooves (pull-in groove side portions 802aa) in the seat width direction.

In this way, the cushion material 802a is preferably and easily bent and the movable body 830 can be stably operated.

Tenth Embodiment of Conveyance Seat

Next, a conveyance seat S10 of a tenth embodiment will be described with reference to FIG. 45 to FIGS. 47A and 47B.

Additionally, the description of the content that overlaps with the conveyance seats S1 to S9 described above will be omitted.

The conveyance seat S10 provides a conveyance seat capable of ensuring a close contact between a seated occupant and a biosensor.

Further, the conveyance seat provides a conveyance seat capable of enhancing the sensing performance of a biosensor using existing components.

Figure 45:
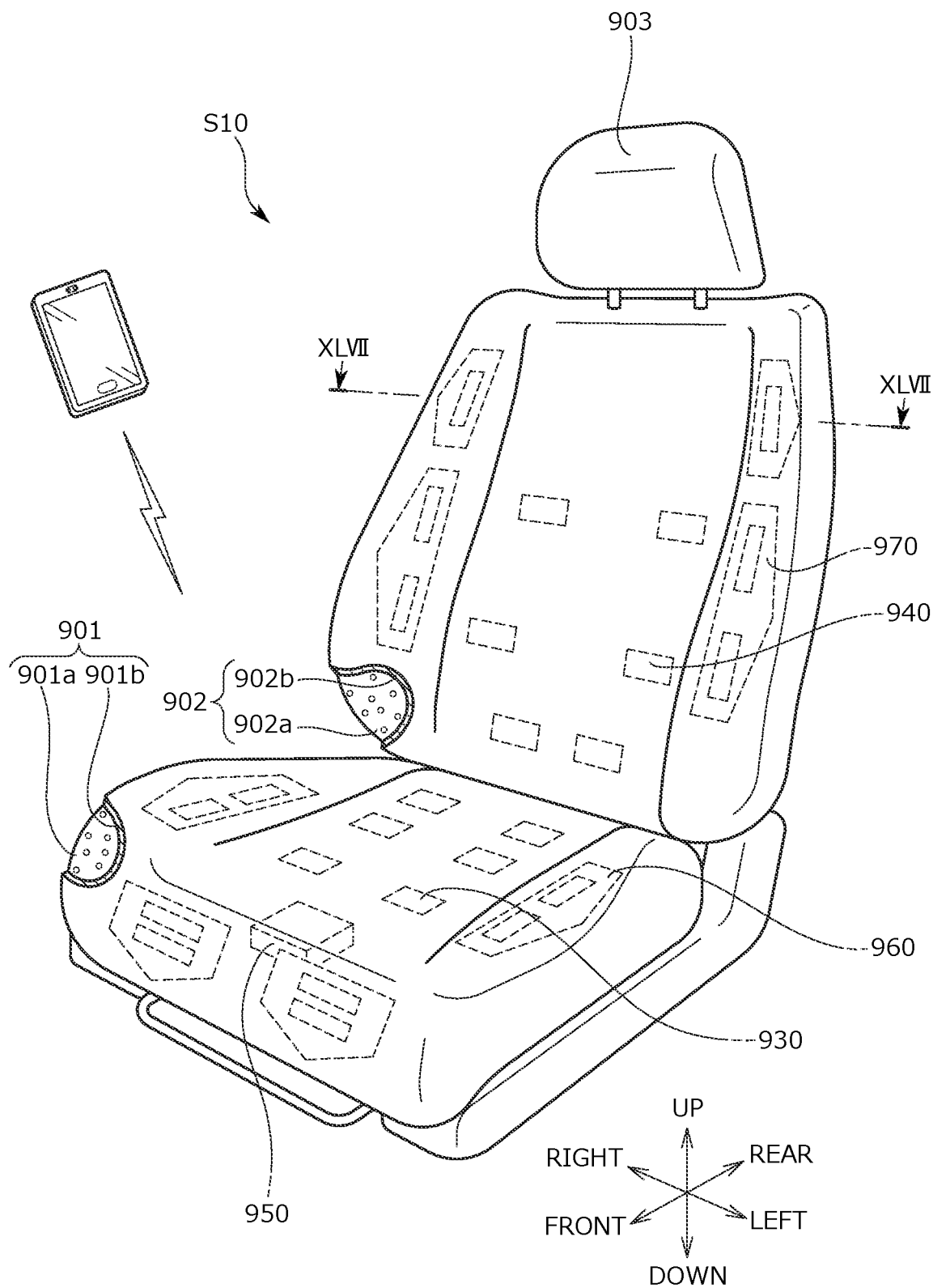
FIG. 45 is an external perspective view showing a conveyance seat of a tenth embodiment.

The conveyance seat S10 is, as shown in FIG. 45, a vehicle seat and mainly includes a seat main body which includes a seat cushion 901, a seat back 902, and a headrest 903, sheet-shaped biosensors 930 and 940 which are attached inside the seat main body and detects an electrical signal (biological signal) according to the biopotential of the occupant sitting on the seat main body, and a control device 950 which receives the biological signal detected by the biosensors 930 and 940 and transmits the received biological signal to the outside (for example, a mobile terminal owned by the seated occupant).

Further, the conveyance seat S10 includes a movable member 960 (bag body) that is attached inside the seat main body and is operated so that the side portion of the seat main body moves between the "normal position" and the "protruding position" protruding from the normal position toward the seated occupant side, and an operating device 980 (fluid supply device) which is operated so that the movable member 960 is operated.

The biosensor 930 is, as shown in FIG. 45, a sheet-shaped pressure sensor which detects a seating pressure applied to the seating surface of the seat cushion 901 when the occupant sits on the seat and is attached between the cushion material 901a and the skin material 901b. Specifically, the biosensor is attached to each of the center portion of the cushion center portion 901A, the center portions of the right and left cushion side portions 901B, and the front surface portion of the cushion center portion 901A.

Further, the biosensor 940 is a pressure sensor which detects a seating pressure applied to the seating surface of the seat back 902 and is attached between the cushion material 902a and the skin material 902b. Specifically, the biosensor is attached to each of the center portion of the cushion center portion 902A, the center portions of the right and left cushion side portions 902B, and the upper end portions (shoulder portions) of the right and left cushion side portions 902B.

Here, the "seating pressure" is a value that changes periodically according to the physiological activity of the seated occupant, specifically, breathing, when the occupant sits on the seat cushion 901, and is detected by the pressure sensor.

The biosensor 930 consists of a plurality of biosensors and includes a forward biosensor 930a which is disposed in the center part of the cushion center portion 901A, a rear biosensor 930b which is disposed in the rear part of the cushion center portion 901A, a right biosensor 930c and a left biosensor 930d which are respectively arranged in the right and left cushion side portions 901B, and a front biosensor 930e which is disposed in the front surface part of the cushion center portion 901A.

The biosensors 930a to 930d are respectively arranged at the positions corresponding to or near the hip points of the seated occupant. The front biosensor 930e is disposed at a position corresponding to or near the thigh of the seated occupant. Further, each biosensor independently detects a seating pressure and outputs a detection signal on the basis of the detection result of the seating pressure.

Figure 46:
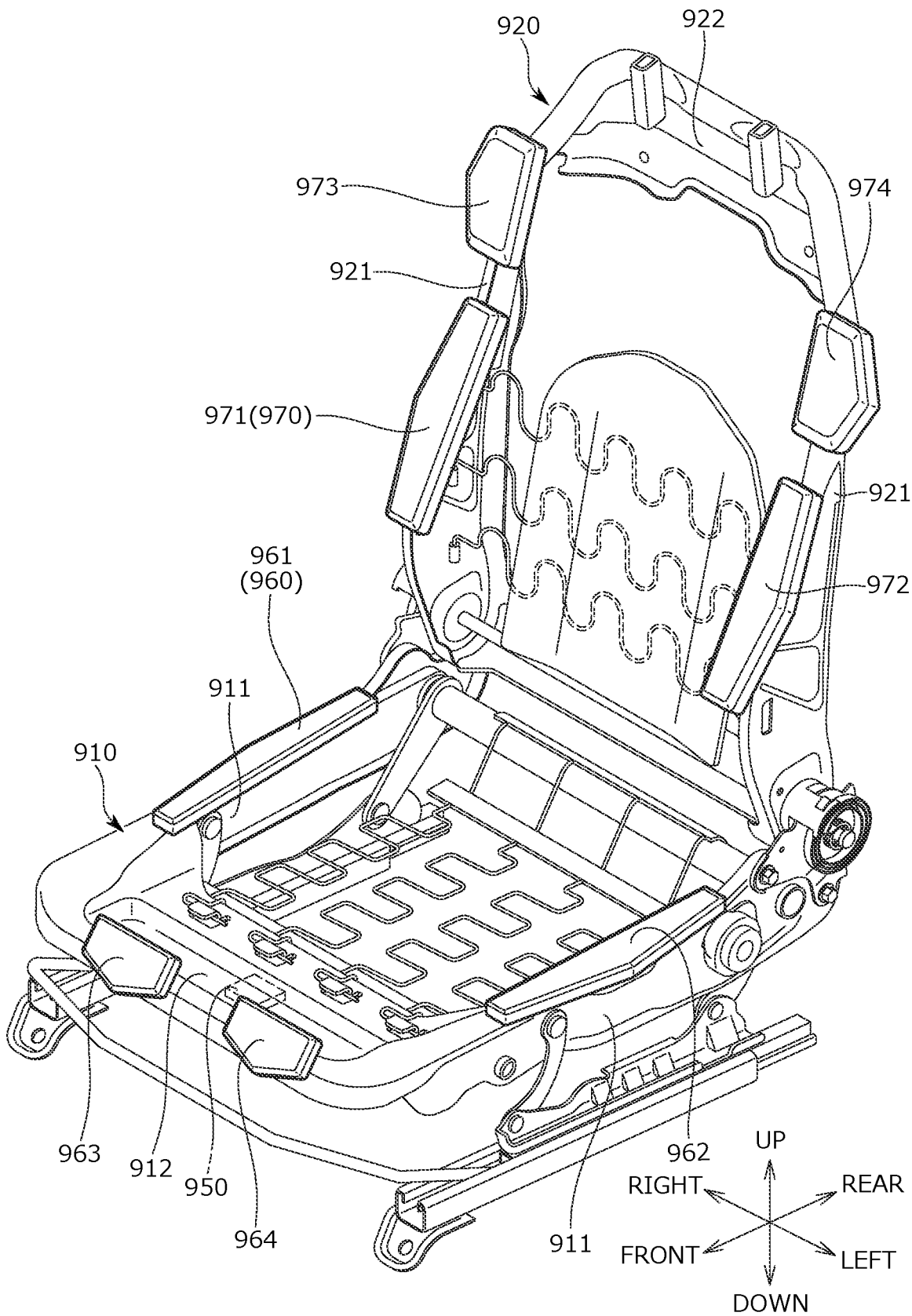
FIG. 46 is a perspective view showing a seat frame serving as a framework.
Figure 47A:
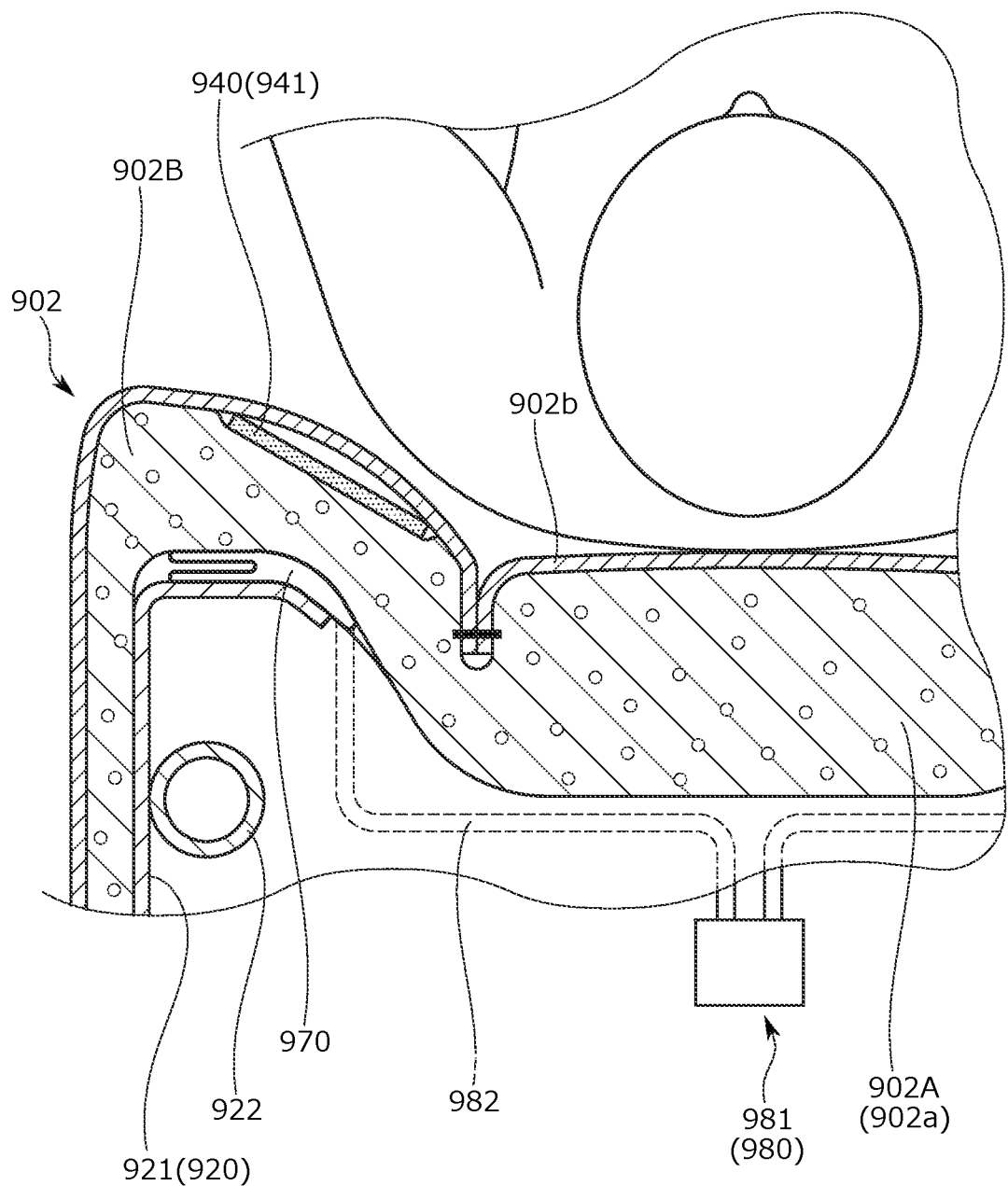
FIG. 47A is a cross-sectional view of a seat back (a cross-sectional view taken along a line XLVII-XLVII of FIG. 45) and is a view showing a state in which a side portion is located at a "normal position".
Figure 47B:
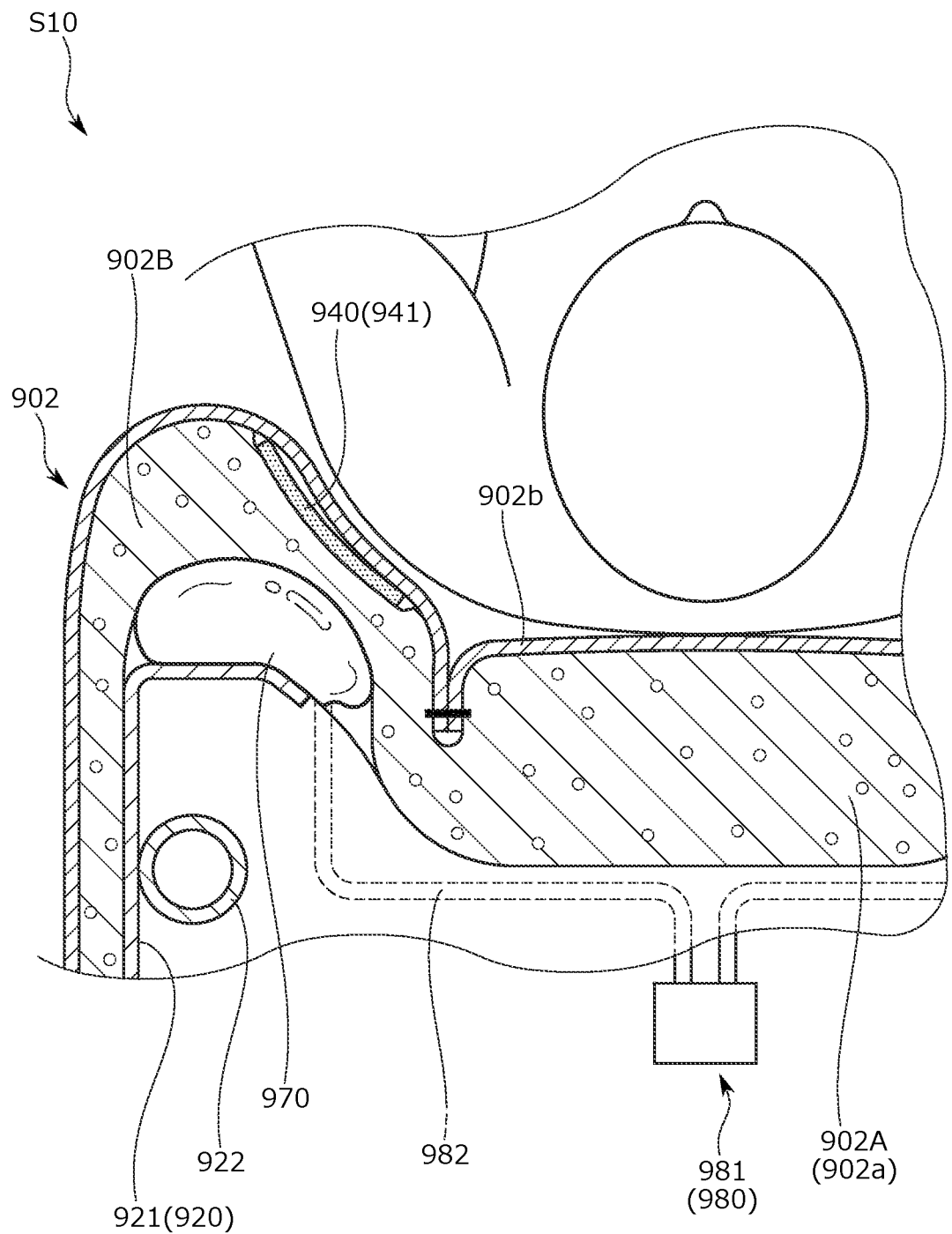
FIG. 47B is a view showing a state in which a movable member (air cell) is operated and the side portion is moved from a "normal position" to a "protruding position".

Movable members 960 and 970 are, as shown in FIG. 46 and FIGS. 47A and 47B, bag bodies which inflate when a fluid is enclosed and specifically air cells which inflate toward the seated occupant side (protrude from the normal position toward the protruding position) when compressed air serving as a fluid is enclosed and contract (return toward the normal position) when the enclosed compressed air is discharged.

The movable member 960 is attached onto the cushion frame 910 and mainly includes specifically a first movable member 961 and a second movable member 962 that are arranged on the upper surfaces of the right and left cushion side frames 911 and a third movable member 963 and a fourth movable member 964 which are arranged on the upper surface of the upper end portion of the pan frame 912.

In other words, the first movable member 961 and the second movable member 962 are arranged inside the right and left side portions of the seat cushion 901 and are arranged on the back surfaces (bottom surfaces) of the right and left cushion side portions 901B. The third movable member 963 and the fourth movable member 964 are arranged inside the front end portion of the center portion of the seat cushion 901 and are arranged on the back surface of the front end portion of the cushion center portion 901A.

Additionally, the movable members 961 to 964 are attached in a folded state, the first movable member 961 and the second movable member 962 have a substantially rectangular shape elongated in the front to back direction of the seat, and the third movable member 963 and the fourth movable member 964 have a substantially pentagonal shape elongated in the seat width direction.

The movable member 970 is attached onto a back frame 920 and mainly includes specifically a first movable member 971 and a second movable member 972 which are arranged on the front surfaces of the right and left back side frames 921 and a third movable member 973 and a fourth movable member 974 which are arranged on the front surfaces of both right and left end portions of the upper frame 922.

In other words, the first movable member 971 and the second movable member 972 are arranged inside the right and left side portions of the seat back 902 and are arranged on the back surfaces (rear surfaces) of the right and left cushion side portions 902B. The third movable member 963 and the fourth movable member 964 are arranged inside the upper end portions (shoulder portions) of the right and left side portions of the seat back 902 and are arranged on the bottom surfaces of the upper end portions of the right and left cushion side portions 902B.

Additionally, the movable members 971 to 974 are attached in a folded state, the first movable member 961 and the second movable member 962 have a substantially rectangular shape elongated in the front to back direction of the seat, and the third movable member 963 and the fourth movable member 964 have a substantially polygonal shape elongated in the seat width direction.

The movable members 960 and 970 (air cells) are configured as members that are operated (inflated) so that the side portion, the shoulder portion, and the front end portion of the seat main body move from the "normal position" to the "protruding position" protruding from the normal position toward the seated occupant side.

Hereinafter, the movable member 970 (the third and fourth movable members 973 and 974) disposed on the shoulder portion of the seat back 902 will be described as a representative example with reference to FIGS. 47A and 47B.

FIG. 47A is a transverse cross-sectional view of the seat back 902 and is a view showing a state in which the side portions of the seat back 902 are in the "normal position".

The movable member 970 is disposed between the back frame 920 and the skin material 902b in the front to back direction of the seat. Specifically, the movable member is attached to the front surface of the back side frame 921 and is disposed on the back surface of the cushion side portion 902B.

At this time, it is known that the biosensor 940 is disposed on the surface side (front surface side) of the seat main body in relation to the movable member 970 and a sensor detection unit 941 and the movable member 970 overlap each other in the front to back direction of the seat (the protruding direction of the movable member 970).

The operating device 980 (fluid supply device) which supplies compressed air to the movable member 970 (air cell) is disposed at the rear position in relation to the cushion material 902a (cushion center portion 902A) inside the seat back 902.

The operating device 980 is attached to a predetermined position of the center part of the back frame 920. Specifically, the operating device mainly includes an air pump 981 which can supply (feed) and discharge (exhaust) compressed air and an air pipe 982 which connects the air pump 981 and the movable member 970.

For example, the operating device 980 can supply compressed air to the movable member 970 or discharge compressed air from the movable member 970 by receiving a predetermined control signal from the control device 950. The control device 950 may receive a selection of a predetermined user operation by the seated occupant and transmit the control signal.

In this way, it is possible to adjust the movable range of the movable member 970 according to the physique of the seated occupant.

FIG. 47B is a view showing a state in which the movable member 970 protrudes toward the seat front side and the side portion of the seat back 902 moves from the "normal position" to the "protruding position".

Specifically, when compressed air is supplied from the operating device 980, the folded movable member 970 inflates and deploys toward the seat front side and the cushion side portion 902B moves toward the seat front side. As a result, the side portion of the seat back 902 moves to the "protruding position".

Additionally, when compressed air inside the movable member 970 is discharged by the operating device 980, the inflated movable member 970 contracts and the cushion side portion 902B is lowered toward the seat rear side. As a result, the side portion of the seat back 902 returns from the "protruding position" to the "normal position".

In the above-described configuration, as shown in FIGS. 47A and 47B, the movable member 970 and the sensor detection unit 941 are arranged at an overlapping position in the protruding direction of the movable member 970 (in the front to back direction of the seat).

In addition, the movable member 960 and the sensor detection unit 931 are arranged at an overlapping position in the protruding direction of the movable member 960 (in the up to down direction).

Therefore, the plurality of sensor detection units 931 and 941 can be preferably supported by the movable members 960 and 970. As a result, the close contact between the seated occupant and the biosensors 930 and 940 can be ensured.

In the above-described configuration, as shown in FIG. 47B, the side portion of the seat back 902 is configured to protrude toward the seat front side and inward in the seat width direction by the movable member 970.

Particularly, right and left shoulder portions of the seat back 902 are configured to protrude toward the seat front side and diagonally downward and inward in the seat width direction by the third movable member 973 (fourth movable member 974).

Further, the side portion of the seat cushion 901 is configured to protrude toward the seat upper side and inward in the seat width direction by the movable member 960.

Particularly, the front end portion of the center portion of the seat cushion 901 is configured to protrude toward the seat front side and diagonally upward and inward in the seat width direction by the third movable member 963 (fourth movable member 964).

In this way, the sitting feeling of the seated occupant can be enhanced. Further, the close contact between the seated occupant and the biosensors 930 and 940 can be enhanced.

According to the conveyance seat S10 of the present invention, the conveyance seat may include a seat main body on which an occupant sits, a biosensor which is attached inside the seat main body and has a sensor detection unit for detecting a biological signal of the seated occupant, and a movable member that is attached inside the seat main body and is operated so that a portion of the seat main body moves between the normal position and the protruding position protruding from the normal position toward the seated occupant side, wherein the biosensor may be disposed on the surface side of the seat main body in relation to the movable member, and wherein the sensor detection unit and the movable member may be arranged at an overlapping position in the protruding direction of the movable member.

In this way, it is possible to realize the conveyance seat capable of ensuring the close contact between the seated occupant and the biosensor (sensor detection unit).

Specifically, the sensor detection unit and the movable member are arranged at an overlapping position in the protruding direction of the movable member. Therefore, the sensor detection unit can be preferably supported by the movable member, and the close contact between the seated occupant and the biosensor can be ensured.

In addition, it is possible to realize the conveyance seat capable of enhancing the sensing performance of the biosensor by using existing components (movable members).

At this time, the seat main body may have a configuration in which a cushion material is placed on a seat frame serving as a framework and is covered with a skin material, the biosensor may be attached between the cushion material and the skin material, and the movable member may be attached to the seat frame and may be disposed on the back surface side of the cushion material.

With the above-described configuration, the biosensor and the movable member can be attached with a simple configuration.

Eleventh Embodiment of Conveyance Seat

Next, a conveyance seat S11 of an eleventh embodiment will be described with reference to FIG. 48.

Additionally, the description of the content that overlaps with the conveyance seats S1 to S10 described above will be omitted.

The conveyance seat S11 provides a conveyance seat capable of ensuring a close contact between a seated occupant and a biosensor.

Further, the conveyance seat provides a conveyance seat capable of ensuring the sensing performance of a biosensor and enhancing design in a conveyance seat having a decorative portion (decorative stitch portion) formed on a surface thereof.

Figure 48:
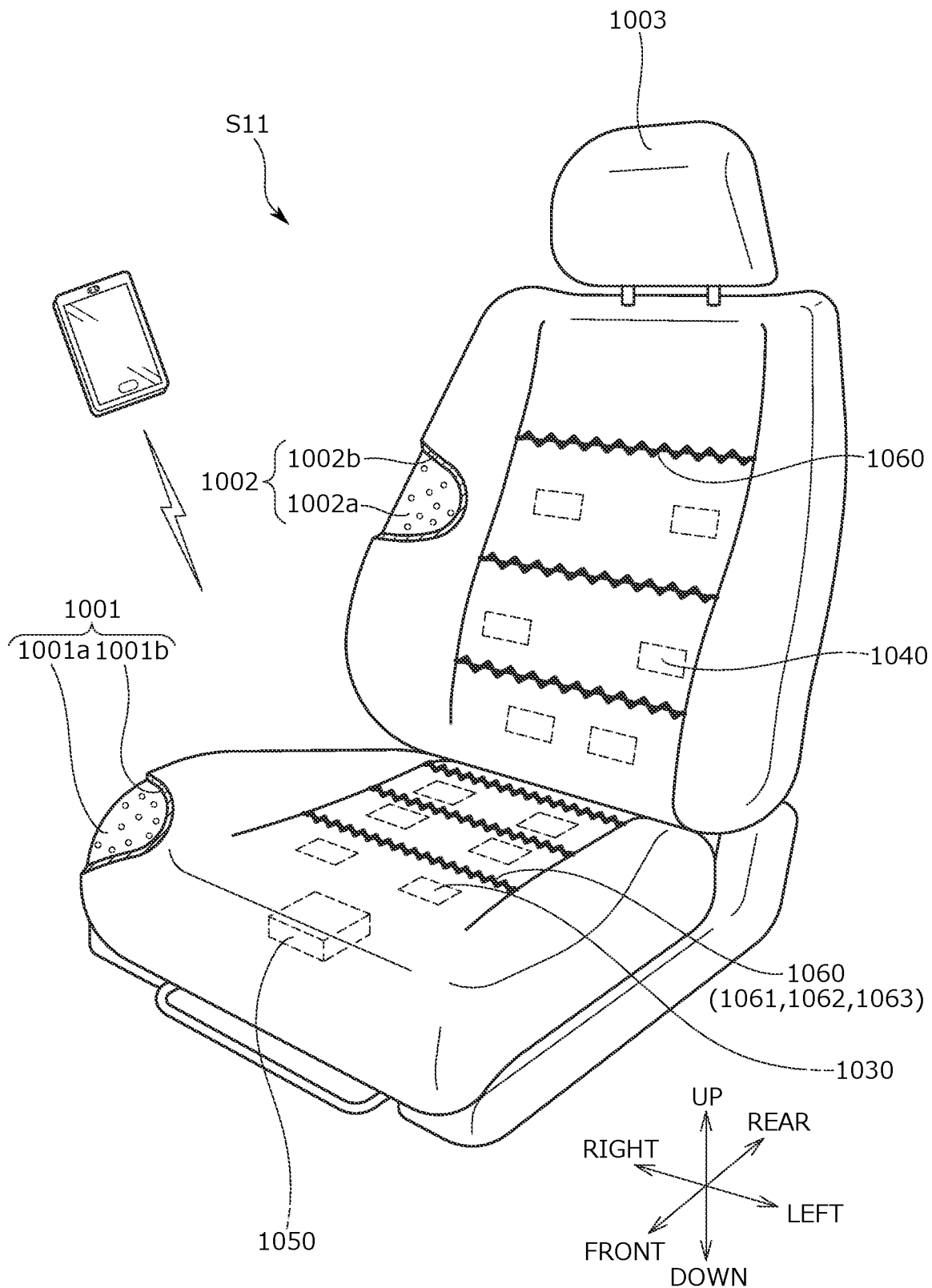
FIG. 48 is an external perspective view showing a conveyance seat of an eleventh embodiment.

The conveyance seat S11 is, as shown in FIG. 48, a vehicle seat and mainly includes a seat main body which includes a seat cushion 1001, a seat back 1002, and a headrest 1003, sheet-shaped biosensors 1030 and 1040 which are attached inside the seat main body and detect an electrical signal (biological signal) according to the biopotential of the occupant sitting on the seat main body, and a control device 1050 which receives the biological signal detected by the biosensors 1030 and 1040 and transmits the received biological signal to the outside (for example, a mobile terminal owned by the seated occupant).

Further, a decorative stitch portion 1060 is formed on each surface of the seat cushion 1001 and the seat back 1002.

The decorative stitch portion 1060 is, as shown in FIG. 48, a decorative portion which is formed on each of a surface of a skin material 1001b of a seat cushion 1001 and a surface of a skin material 1002b of a seat back 1002.

In more detail, the decorative stitch portion 1060 is a decorative stitch formed by partially sewing the skin materials 1001b and 1002b with a thread.

The decorative stitch portion 1060 includes a first stitch portion 1061, a second stitch portion 1062, and a third stitch portion 1063 in the seat cushion 1001, is disposed between the right and left skin material pull-in grooves in the seat width direction, and extends to be elongated in the seat width direction on the seating surface.

According to the conveyance seat S11 of the present invention, the conveyance seat may include a cushion material, a skin material which covers the cushion material, and a biosensor which is attached between the cushion material and the skin material and detects a biological signal of a seated occupant, wherein the skin material may include a decorative portion which is formed on a surface of the skin material in a seating surface of the conveyance seat, wherein the biosensor may include a sensor detection unit which detects a biological signal of the seated occupant, and wherein the sensor detection unit may be disposed at a position avoiding the decorative portion in the seating surface.

In this way, it is possible to realize the conveyance seat capable of ensuring the close contact between the seated occupant and the biosensor (sensor detection unit). Specifically, it is possible to ensure the sensing performance of the biosensor in the conveyance seat having the decorative portion formed on the surface.

Twelfth Embodiment of Conveyance Seat

Next, a conveyance seat S12 of a twelfth embodiment will be described with reference to FIGS. 49 to 51.

Additionally, the description of the content that overlaps with the conveyance seats S1 to S11 described above will be omitted.

The conveyance seat S12 provides a conveyance seat capable of ensuring a close contact between a seated occupant and a biosensor.

Further, the conveyance seat provides a conveyance seat capable of enhancing the sensing performance of a biosensor using existing components.

Figure 49:
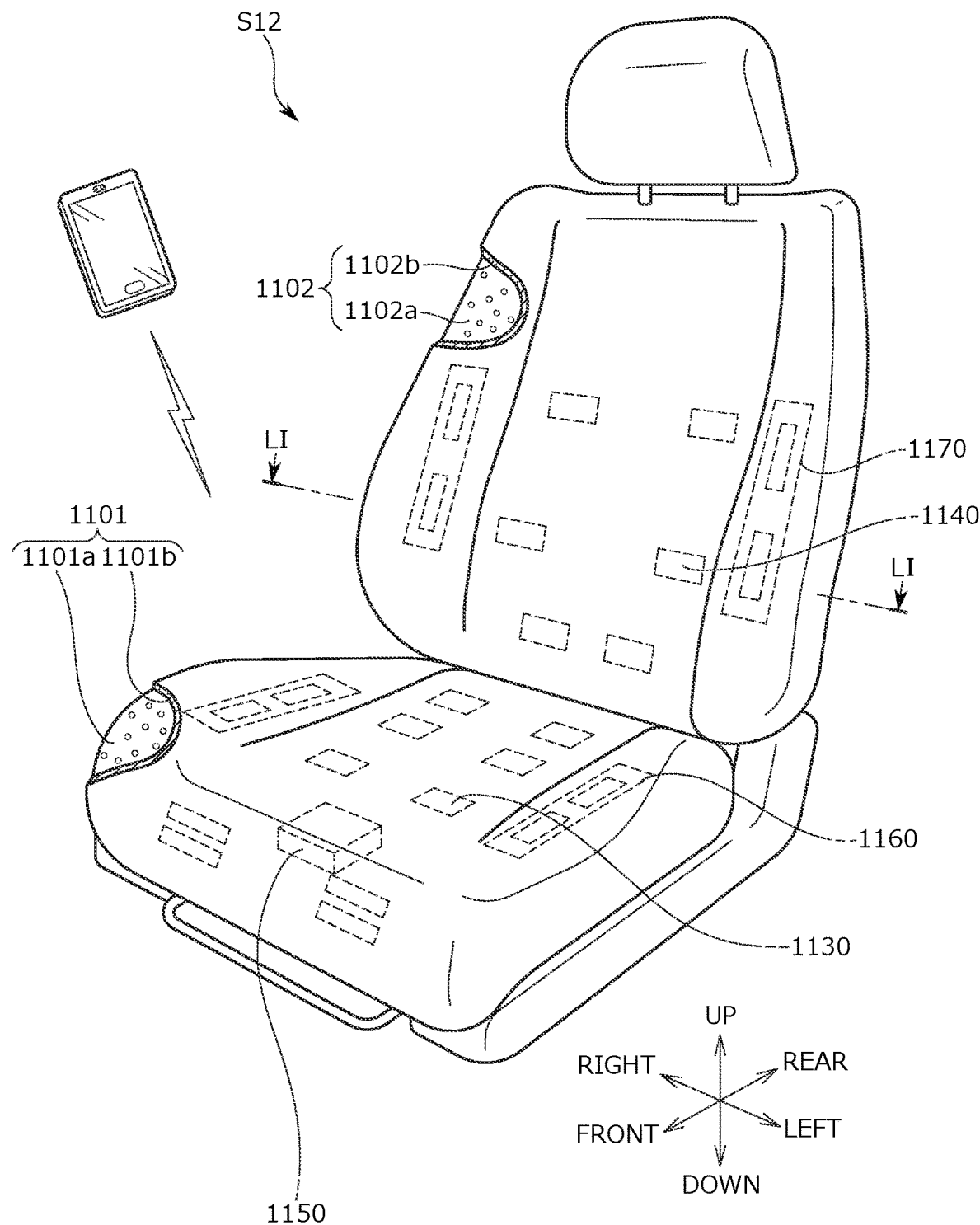
FIG. 49 is an external perspective view showing a conveyance seat of a twelfth embodiment.

The conveyance seat S12 is, as shown in FIG. 49, a vehicle seat and mainly includes a seat main body which includes a seat cushion 1101, a seat back 1102, and a headrest 1103, sheet-shaped biosensors 1130 and 1140 which are attached inside the seat main body and detect an electrical signal (biological signal) according to the biopotential of the occupant sitting on the seat main body, and a control device 1150 which receives the biological signal detected by the biosensors 1130 and 1140 and transmits the received biological signal to the outside (for example, a mobile terminal owned by the seated occupant).

Figure 50:
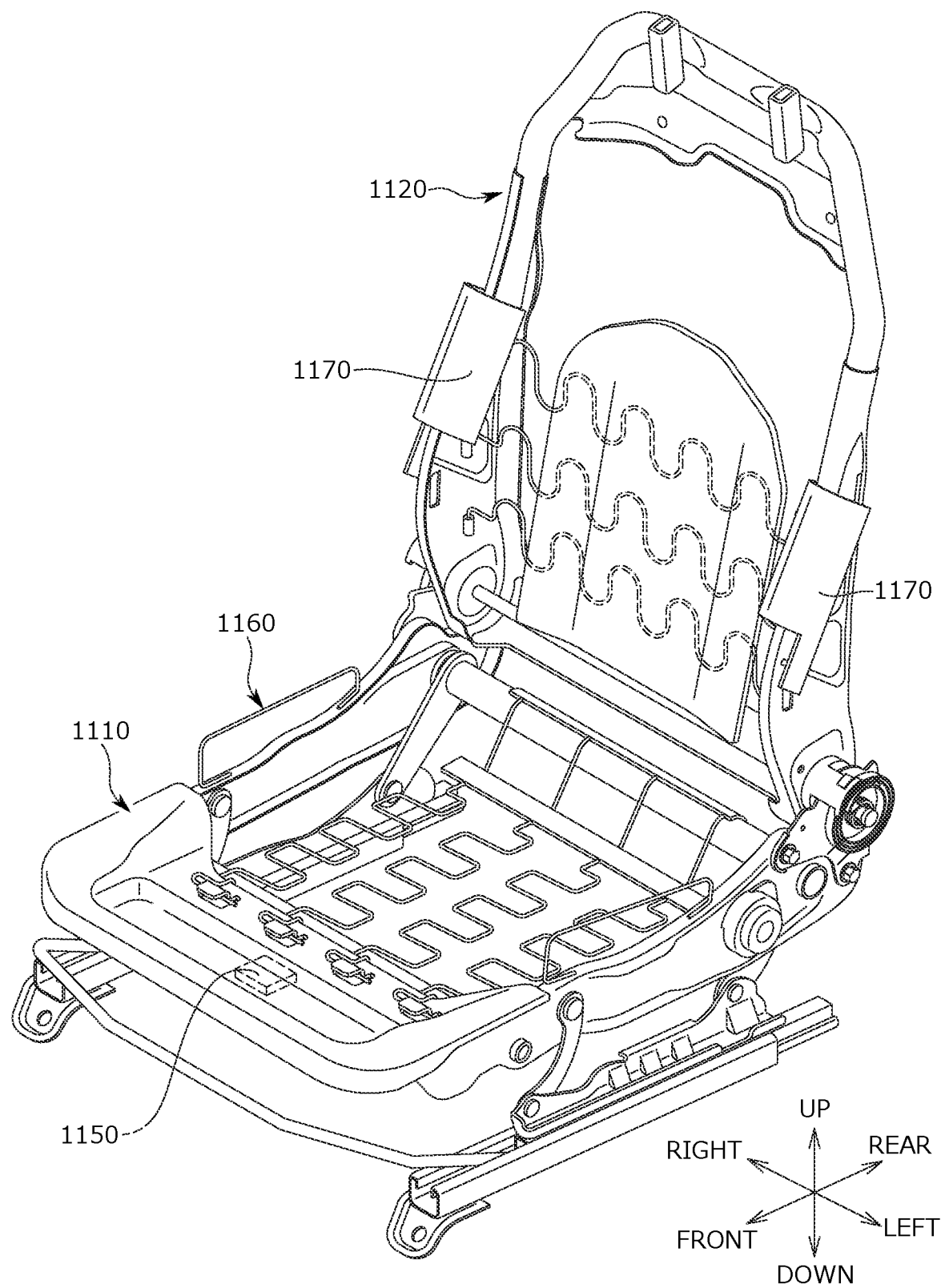
FIG. 50 is a perspective view showing a seat frame serving as a framework.

Further, the conveyance seat S12 includes right and left support members 1160 and 1170 that are configured to support the seated occupant from the side of the seat width direction as shown in FIGS. 49 and 50.

Figure 51:
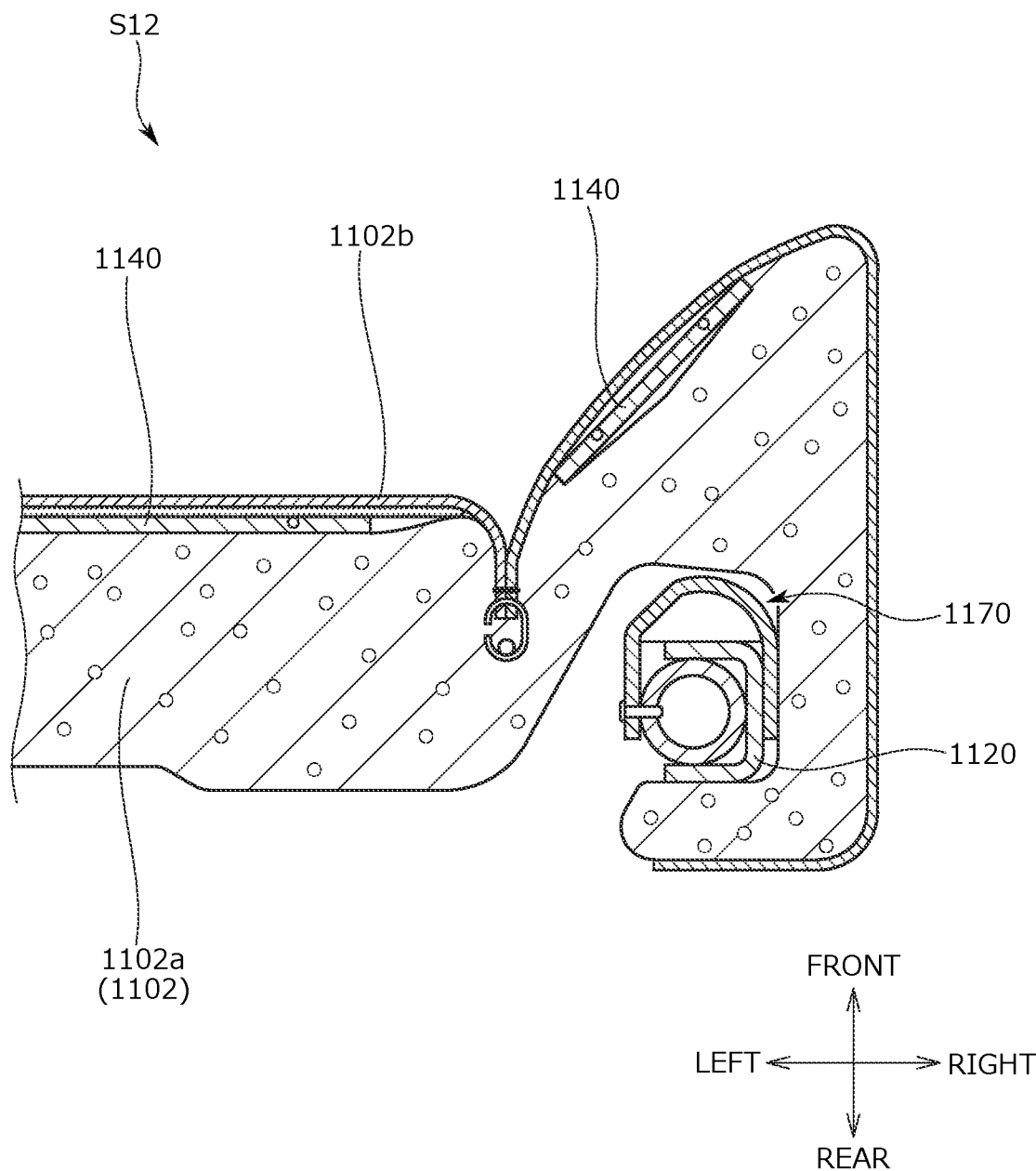
FIG. 51 is a cross-sectional view taken along a line LI-LI of FIG. 49 and is a view describing a positional relationship of a side support.

In the above-described configuration, as shown in FIG. 51, the support member 1170 is configured to protrude toward the seating surface side, and the protruding tip of the support member 1170 and the biosensor 1140 are arranged at an overlapping position in the protruding direction of the support member 1170.

Further, the support member 1170 is configured to protrude while curving toward the seating surface side, and the inner surface of the curved support member 1170 in the seat width direction and the biosensor 1140 are arranged at an overlapping position in the protruding direction of the support member 1170.

Therefore, the biosensor 1140 can be more preferably supported by the support member 1170, and the close contact between the seated occupant and the biosensor 1140 can be ensured.

According to the conveyance seat S12 of the present invention, the conveyance seat may have a configuration in which a cushion material is placed on a seat frame serving as a framework and is covered with a skin material and may include a biosensor which is provided between the cushion material and the skin material and includes a sensor detection unit that detects a biological signal of a seated occupant, wherein the seat frame includes side frames which are arranged on the right and left sides in the seat width direction and a support member that is attached to the side frame and protrudes from the side frame toward a seating surface on which the occupant sits, and wherein the sensor detection unit and the support member may be arranged at an overlapping position in the protruding direction of the support member.

In this way, it is possible to realize the conveyance seat capable of ensuring the close contact between the seated occupant and the biosensor (sensor detection unit).

Specifically, the sensor detection unit and the support member are arranged at an overlapping position in the protruding direction of the support member. Therefore, the sensor detection unit can be preferably supported by the support member, and the close contact between the seated occupant and the biosensor can be ensured.

With the above-described configuration, it is possible to realize the conveyance seat capable of enhancing the sensing performance of the biosensor using existing components (support members).

Thirteenth Embodiment of Conveyance Seat

Next, a conveyance seat S13 of a thirteenth embodiment will be described with reference to FIGS. 52 to 55.

Additionally, the description of the content that overlaps with the conveyance seats S1 to S12 described above will be omitted.

The conveyance seat S13 provides a conveyance seat capable of appropriately arranging installation members in a seat frame including side frames with different plate thicknesses.

Figure 52:
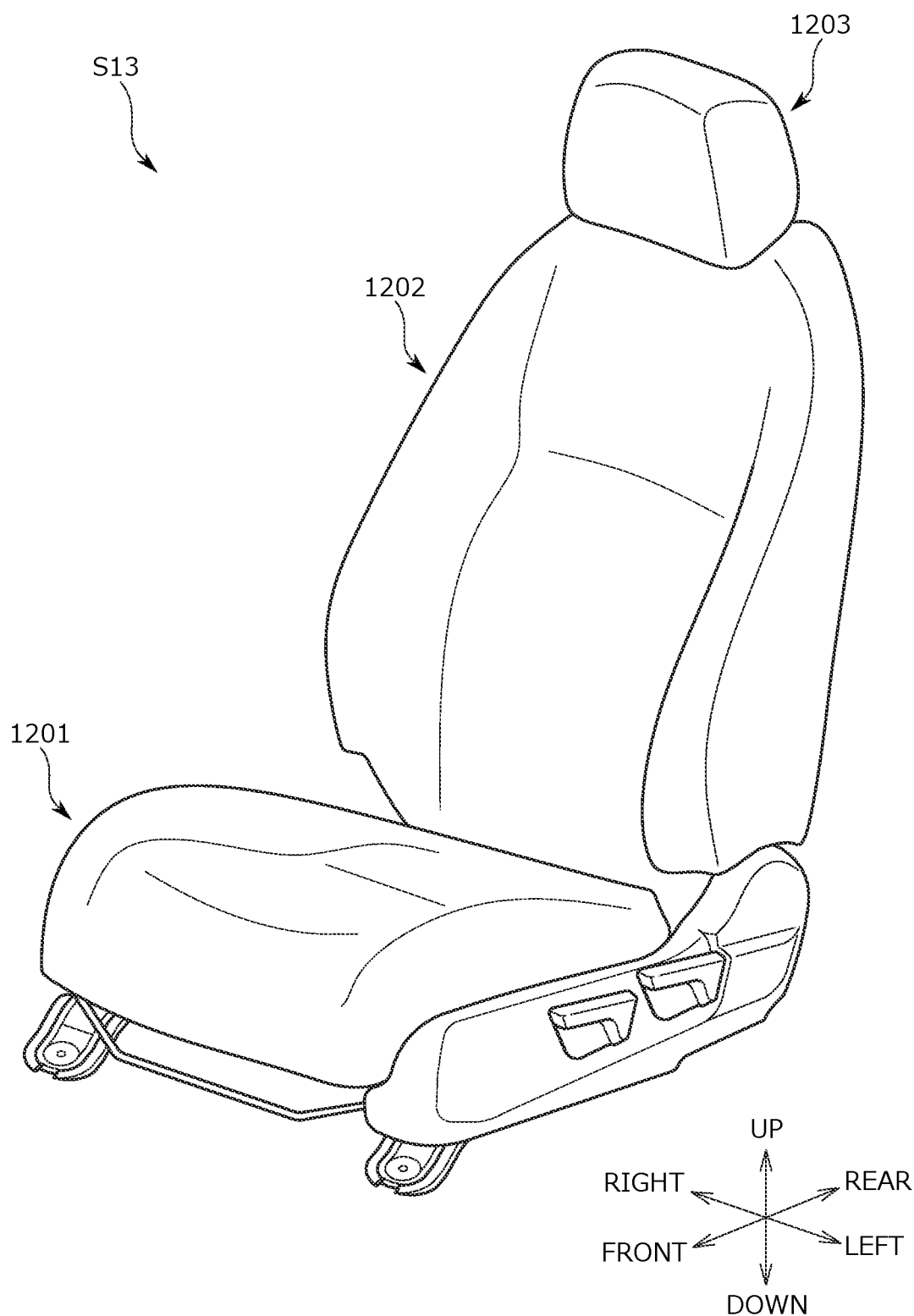
FIG. 52 is an external view of a conveyance seat of a thirteenth embodiment.

The conveyance seat S13 has an appearance shown in FIG. 52.

Figure 53:
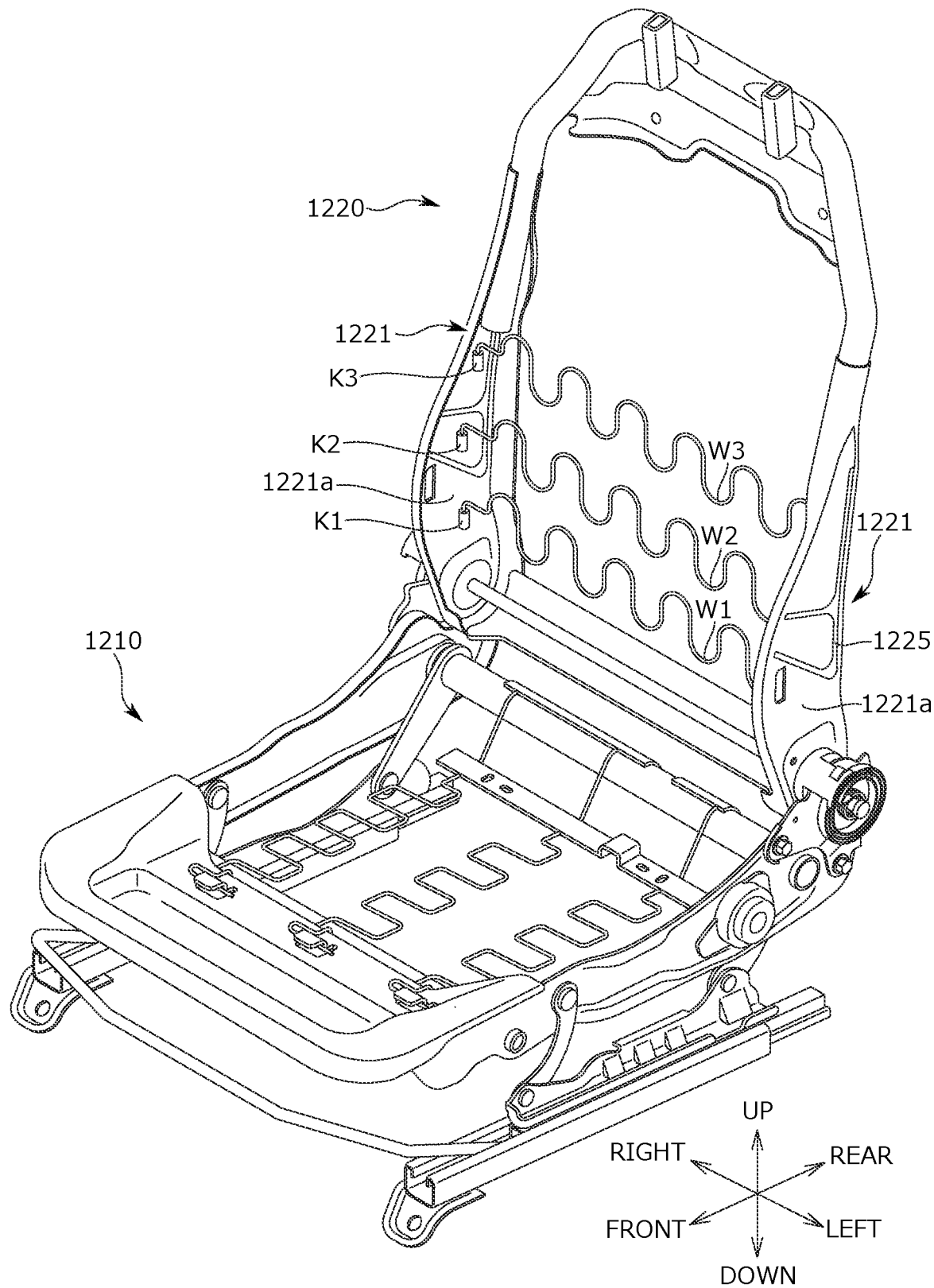
FIG. 53 is a perspective view of a seat frame provided in the conveyance seat.

The conveyance seat S13 includes a seat back 1202 which serves as a backrest part supporting the back of the seated occupant, a seat cushion 1201 which serves as a seating portion supporting the buttocks of the seated occupant, and a headrest 1203 which is disposed on the upper portion of the seat back 1202 and supports the head of the seated occupant as main components. As shown in FIG. 53, the conveyance seat S13 includes a seat frame which serves as a framework including a back frame 1220 and a cushion frame 1210 as main components.

Figure 54:
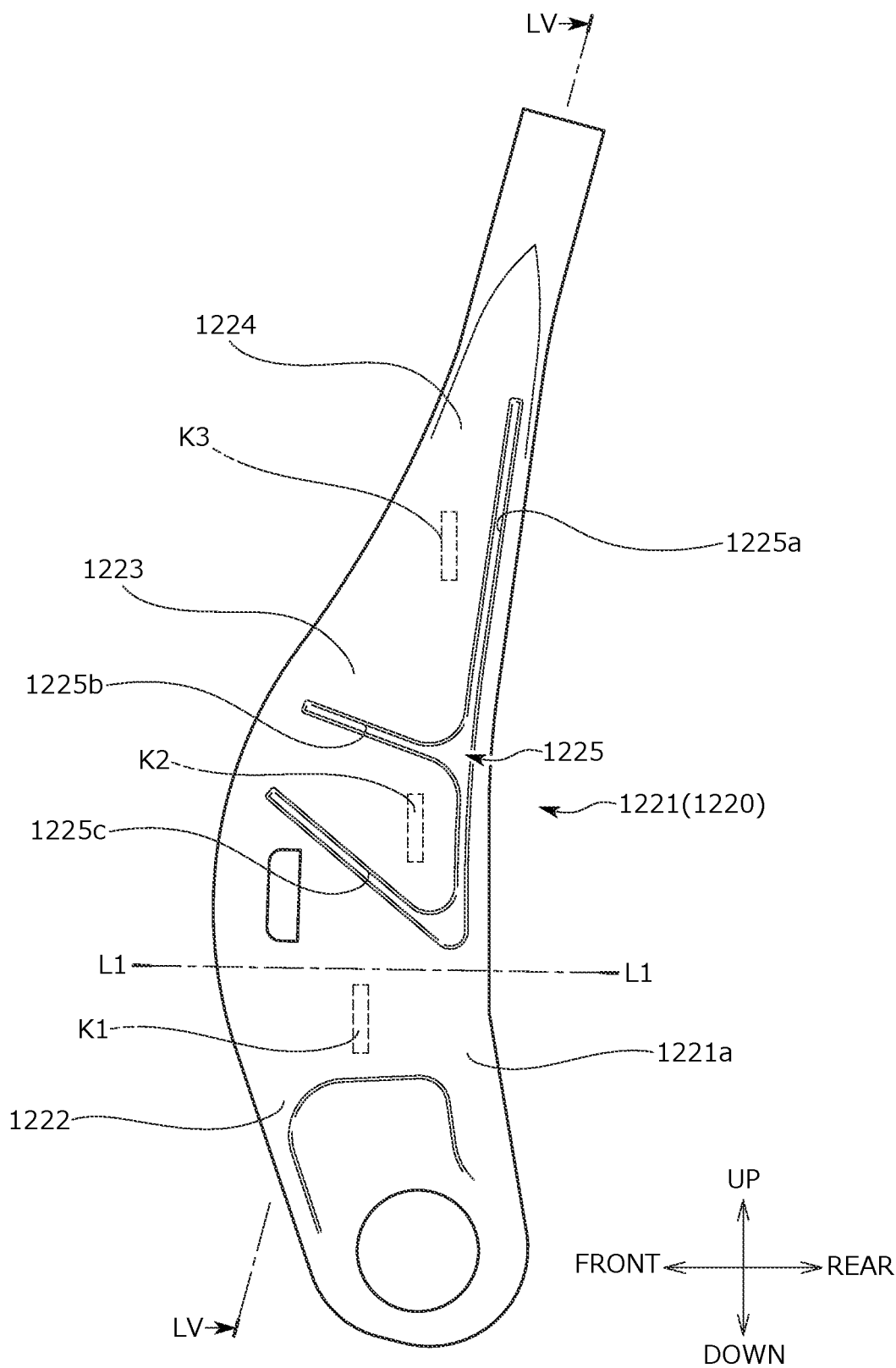
FIG. 54 is a side view of a seat back side frame.
Figure 55:
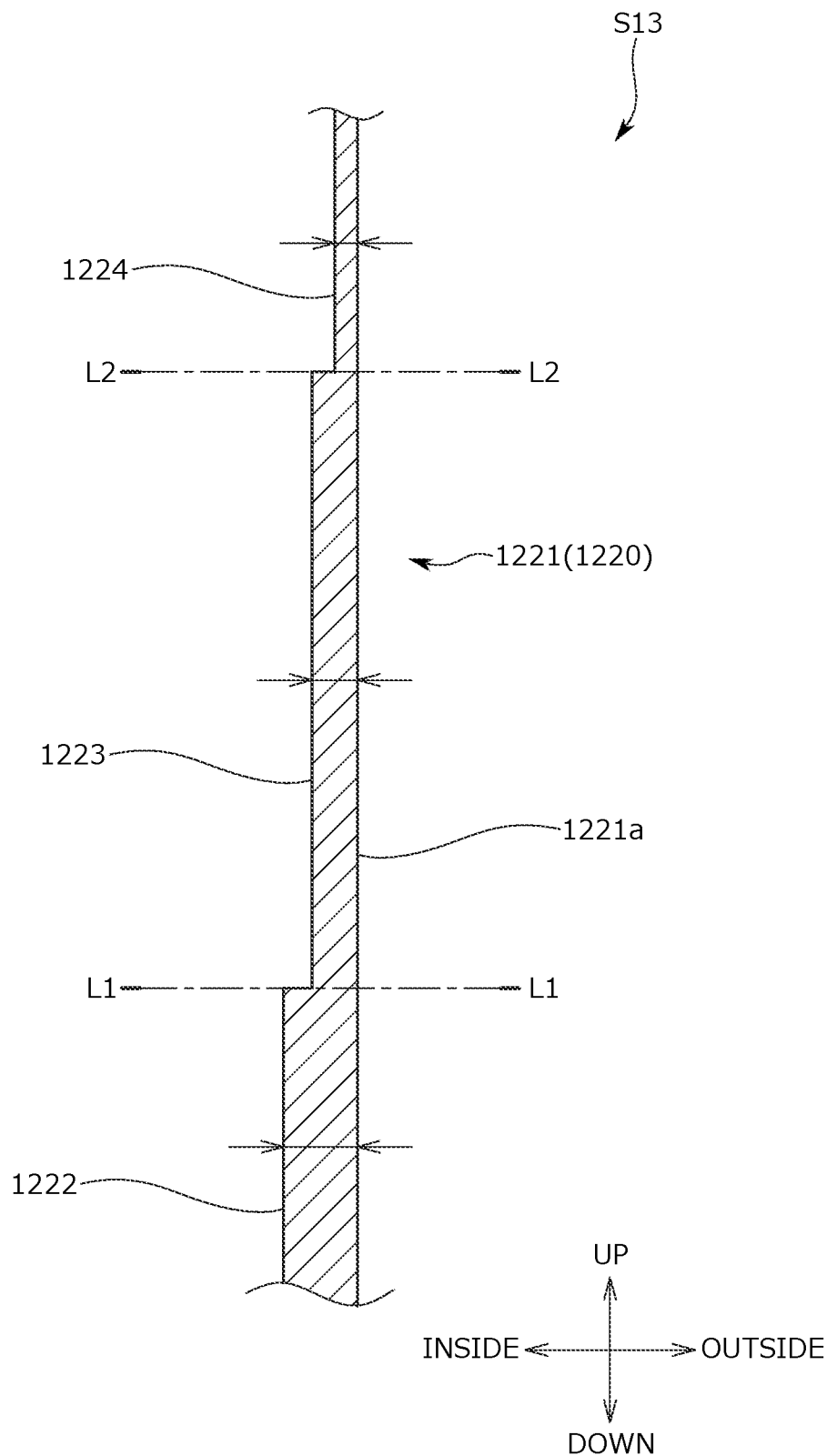
FIG. 55 is a cross-sectional view taken along a line LV-LV of FIG. 54.

As shown in FIG. 54, in a side plate portion 1221a of a back side frame 1221, a first concave portion 1225a, a second concave portion 1225b, and a third concave portion 1225c are provided as a concave portion 1225 which is a reinforcing portion recessed toward either the inner side or the outer side in the seat width direction. The first concave portion 1225a is provided to extend in the up to down direction along the rear edge of the side plate portion 1221a. The second concave portion 1225b and the third concave portion 1225c extend in a direction (in other words, the front to back direction) intersecting the longitudinal direction of the back side frame 1221 and the second concave portion 1225b extends forward from the middle portion of the first concave portion 1225a in the up to down direction and is provided in the side plate portion 1221a.

The third concave portion 1225c is provided in the side plate portion 1221a to extend forward from the lower end portion of the first concave portion 1225a while being inclined upward as it goes from the lower end portion toward the front side. In this embodiment, the first concave portion 1225a, the second concave portion 1225b, and the third concave portion 1225c are formed to protrude inward when the back side frame 1221 is pressed.

The first concave portion 1225a is provided in the side plate portion 1221a across a second boundary portion L2. The second concave portion 1225b and the third concave portion 1225c are provided at a position avoiding a first boundary portion L1 and a second boundary portion L2. In other words, the second concave portion 1225b and the third concave portion 1225c are provided in the side plate portion 1221a to be disposed between the first boundary portion L1 and the second boundary portion L2 in the up to down direction.

A fixing portion (a first fixing portion K1, a second fixing portion K2, and a third fixing portion K3) for attaching end portions of a first wire member W1 (first bridging member), a second wire member W2 (second bridging member), and a third wire member W3 (third bridging member) is formed inside the side plate portion 1221a of the back side frame 1221.

The first fixing portion K1 which is a hook portion for attaching the first wire member W1 (first bridging member) to the side plate portion 1221a is provided at the lower portion of the first boundary portion L1 in a thick-walled portion 1222, that is, the side plate portion 1221a at a position avoiding the first boundary portion L1. Further, the second fixing portion K2 which is a hook portion for attaching the second wire member W2 (second bridging member) to the side plate portion 1221a is provided at the upper portion of the first boundary portion L1 and the lower portion of the second boundary portion L2 in a medium-walled portion 1223, that is, the side plate portion 1221a at a position avoiding the first boundary portion L1 and the second boundary portion L2. Further, the third fixing portion K3 which is a hook portion for attaching the third wire member W3 (third bridging member) to the side plate portion 1221a is provided at the upper portion of the second boundary portion L2 in a thin-walled portion 1224, that is, the side plate portion 1221a at a position avoiding the second boundary portion L2.

According to the conveyance seat S13 of the present invention, the conveyance seat may be a conveyance seat including a seat frame, wherein the seat frame may include a pair of side frames arranged in side portions of the conveyance seat and a first bridging member, a second bridging member, and a third bridging member installed between the pair of side frames, wherein the side frame may include a thick-walled portion having a first plate thickness, a medium-walled portion formed continuously with the thick-walled portion and having a second plate thickness thinner than the thick-walled portion, and a thin-walled portion formed continuously with the medium-walled portion and having a third plate thickness thinner than the medium-walled portion, wherein a first fixing portion for the side frame of the first bridging member may be formed in the thick-walled portion, wherein a second fixing portion for the side frame of the second bridging member may be formed in the medium-walled portion, and wherein a third fixing portion for the side frame of the third bridging member may be formed in the thin-walled portion.

In this way, it is possible to apply a load to the side frames having different plate thicknesses in a well-balanced manner.

Fourteenth Embodiment of Conveyance Seat

Figure 56:
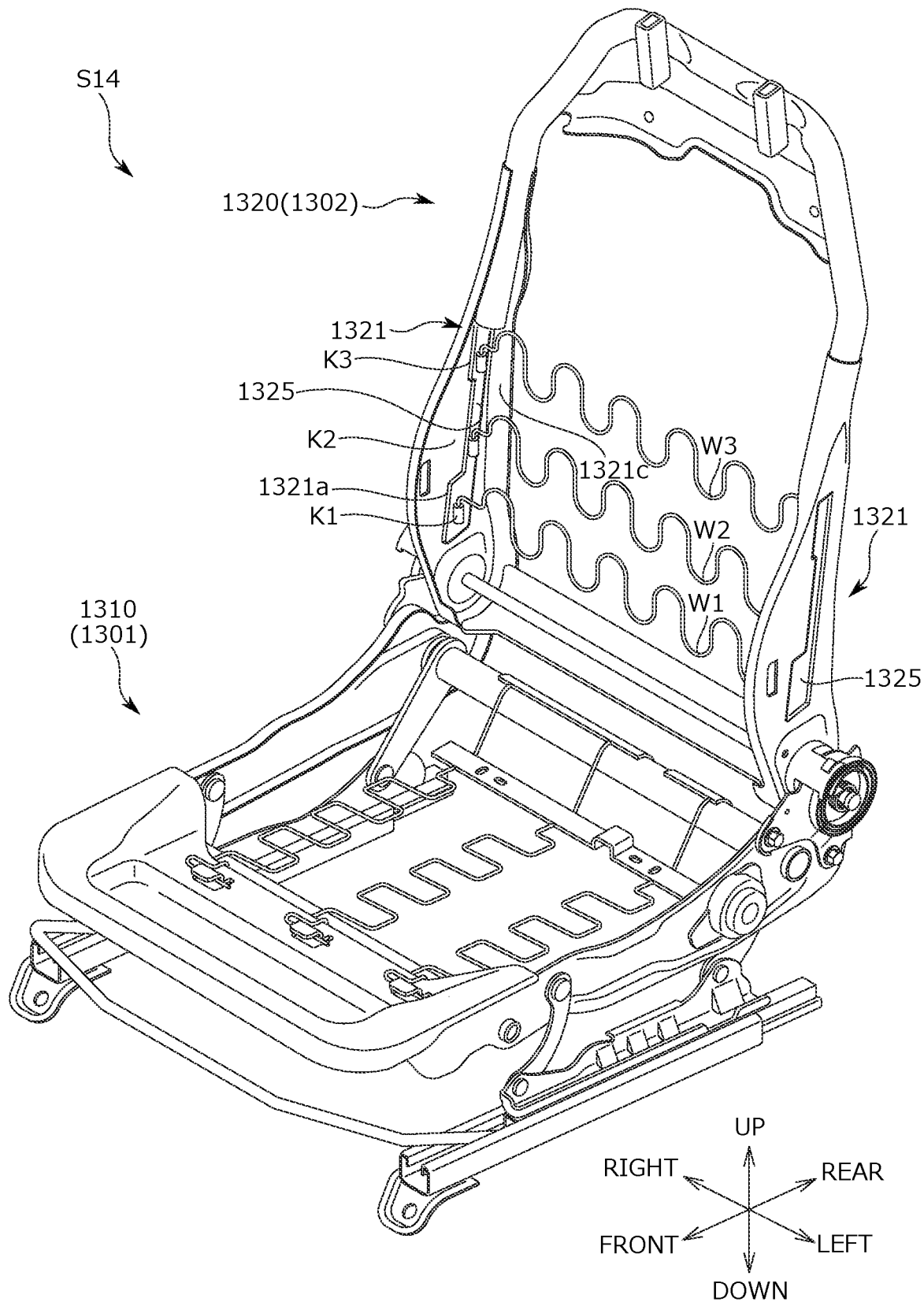
FIG. 56 is a perspective view of a seat frame of a conveyance seat of a fourteenth embodiment.

Next, a conveyance seat S14 of a fourteenth embodiment will be described with reference to FIGS. 56 to 58.

Additionally, the description of the content that overlaps with the conveyance seats S1 to S13 described above will be omitted.

The conveyance seat S14 provides a conveyance seat capable of appropriately arranging concave portions as reinforcing portions in a seat frame including side frames having different plate thicknesses.

The conveyance seat S14 includes a seat back 1302 which serves as a backrest part supporting the back of the seated occupant, a seat cushion 1301 which serves as a seating portion supporting the buttocks of the seated occupant, and a headrest 1303 which is disposed in the upper portion of the seat back 1302 and supports the head of the seated occupant as main components. As shown in FIG. 56, the conveyance seat S14 includes a seat frame which serves as a framework including a back frame 1320 and a cushion frame 1310 as main components.

Figure 57:
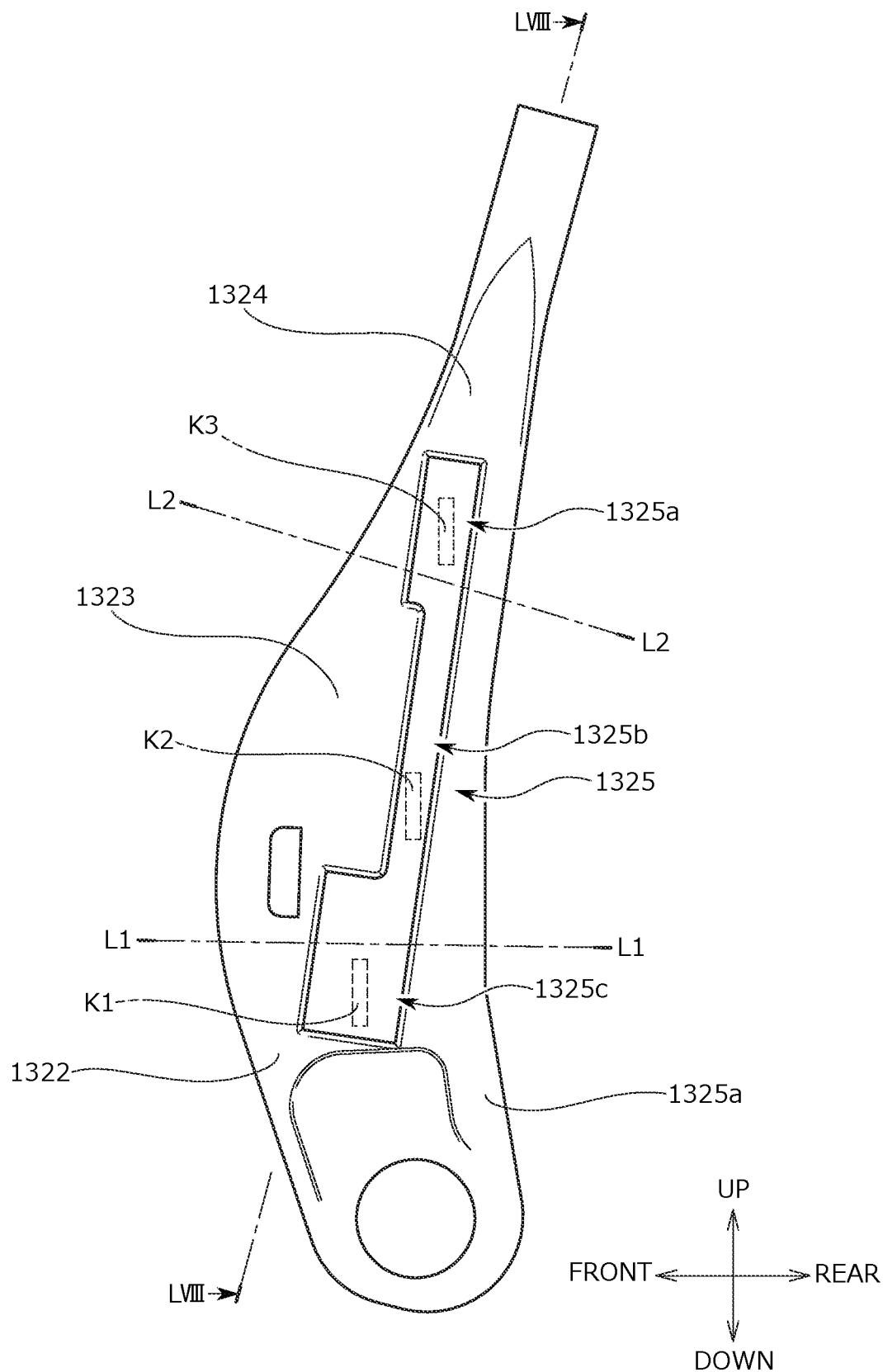
FIG. 57 is a side view of the seat back side frame.
Figure 58:
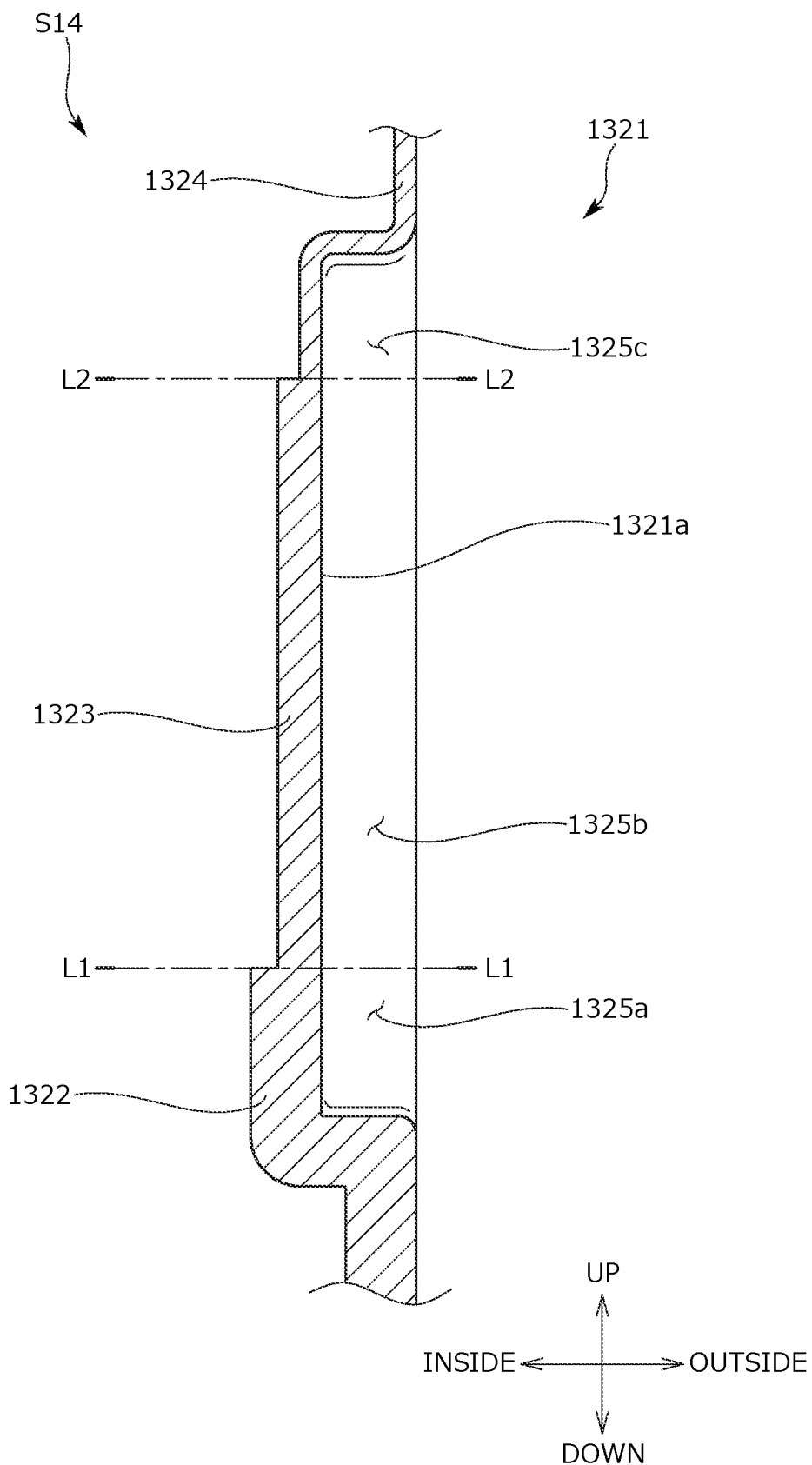
FIG. 58 is a cross-sectional view taken along a line LVIII-LVIII of FIG. 57.

As shown in FIG. 57, in a side plate portion 1321a of a back side frame 1321, a first concave portion 1325a, a second concave portion 1325b and a third concave portion 1325c are provided as a concave portion 1325 which is a reinforcing portion recessed toward either the inner side or the outer side in the seat width direction. The first concave portion 1325a, the second concave portion 1325b, and the third concave portion 1325c are provided continuously and extend in the longitudinal direction of the back side frame 1321. In this embodiment, the first concave portion 1325a, the second concave portion 1325b, and the third concave portion 1325c are formed to protrude inward when the back side frame 1321 is pressed.

The first concave portion 1325a (large width portion) is provided in the side plate portion 1321a across the first boundary portion L1. In other words, the first concave portion 1325a is provided in a thick-walled portion 1322 and a medium-walled portion 1323 of the back side frame 1321 straddle the first boundary portion L1.

The second concave portion 1325b (narrow width portion) is provided at a position avoiding the first boundary portion L1 and the second boundary portion L2. In other words, the second concave portion 1325b is provided in the medium-walled portion 1323 of the back side frame 1321 to be disposed between the first boundary portion L1 and the second boundary portion L2 in the up to down direction.

The third concave portion 1325c (medium width portion) is provided in the side plate portion 1321a across the second boundary portion L2. In other words, the third concave portion 1325c is provided in the medium-walled portion 1323 and a thin-walled portion 1324 of the back side frame 1321 straddle the second boundary portion L2.

The fixing portion (the first fixing portion K1, the second fixing portion K2, and the third fixing portion K3) for attaching the end portions of the first wire member W1 (first bridging member), the second wire member W2 (second bridging member), and the third wire member W3 (third bridging member) is formed inside the side plate portion 1321a of the back side frame 1321.

The first fixing portion K1 which is a hook portion for attaching the first wire member W1 (first bridging member) to the side plate portion 1321a is provided at the lower portion of the first boundary portion L1 in the thick-walled portion 1322, that is, the first concave portion 1325a (large width portion) at a position avoiding the first boundary portion L1.

Further, the second fixing portion K2 which is a hook portion for attaching the second wire member W2 (second bridging member) to the side plate portion 1321a is provided at the upper portion of the first boundary portion L1 and the lower portion of the second boundary portion L2 in the medium-walled portion 1323, that is, the second concave portion 1325b (narrow width portion) at a position avoiding the first boundary portion L1 and the second boundary portion L2.

Further, the third fixing portion K3 which is a hook portion for attaching the third wire member W3 (third bridging member) to the side plate portion 1321a is provided at the upper portion of the second boundary portion L2 in the thin-walled portion 1324, that is, the third concave portion 1325c (medium width portion) at a position avoiding the second boundary portion L2.

According to the conveyance seat S14 of the present invention, the conveyance seat may be a conveyance seat including a seat frame, wherein the seat frame may include a pair of side frames arranged in side portions of the conveyance seat, wherein the side frame may include a thick-walled portion having a first plate thickness, a medium-walled portion formed continuously with the thick-walled portion and having a second plate thickness thinner than the thick-walled portion, and a thin-walled portion formed continuously with the medium-walled portion and having a third plate thickness thinner than the medium-walled portion, wherein a concave portion extending in the extension direction of the side frame may be provided in the side portion of the side frame, and wherein the concave portion may be provided across the thick-walled portion, the medium-walled portion and the thin-walled portion.

In this way, it is possible to dispose the concave portion as the reinforcing portion in a well-balanced manner in the side frames having different plate thicknesses.

Fifteenth Embodiment of Conveyance Seat

Figure 59:
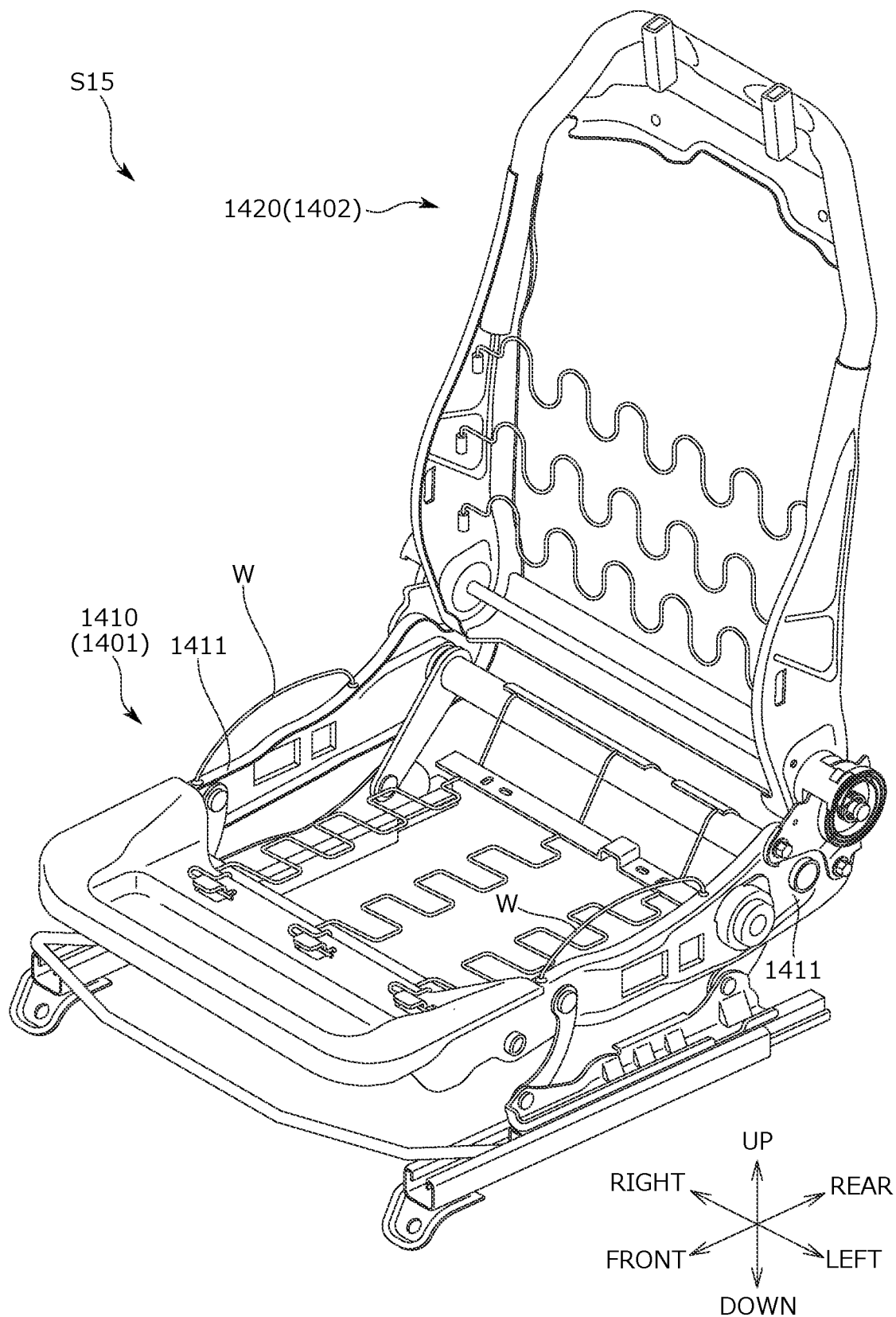
FIG. 59 is a perspective view of a seat frame of a conveyance seat of a fifteenth embodiment.

Next, a conveyance seat S15 of a fifteenth embodiment will be described with reference to FIGS. 59 to 61.

Additionally, the description of the content that overlaps with the conveyance seats S1 to S14 described above will be omitted.

The conveyance seat S15 provides a conveyance seat capable of appropriately arranging wire members in a seat frame including side frames having different plate thicknesses.

The conveyance seat S15 includes a seat back 1402 which serves as a backrest part supporting the back of the seated occupant, a seat cushion 1401 which serves as a seating portion supporting the buttocks of the seated occupant, and a headrest 1403 which is disposed in the upper portion of the seat back 1402 and supports the head of the seated occupant as main components. As shown in FIG. 59, the conveyance seat S15 includes a seat frame which serves as a framework including a back frame 1420 and a cushion frame 1410 as main components.

Figure 60:
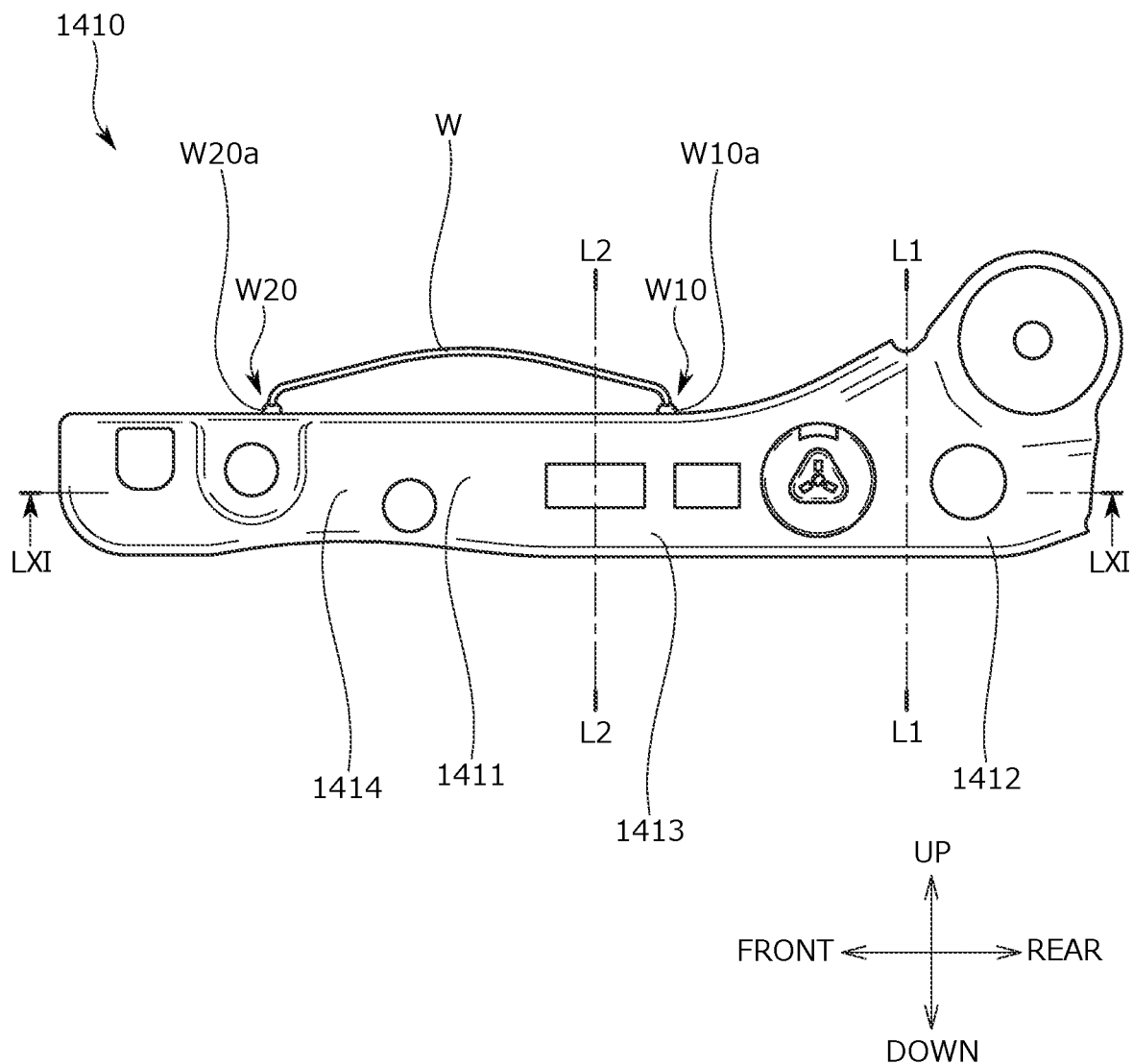
FIG. 60 is a side view of a seat cushion side frame.
Figure 61:
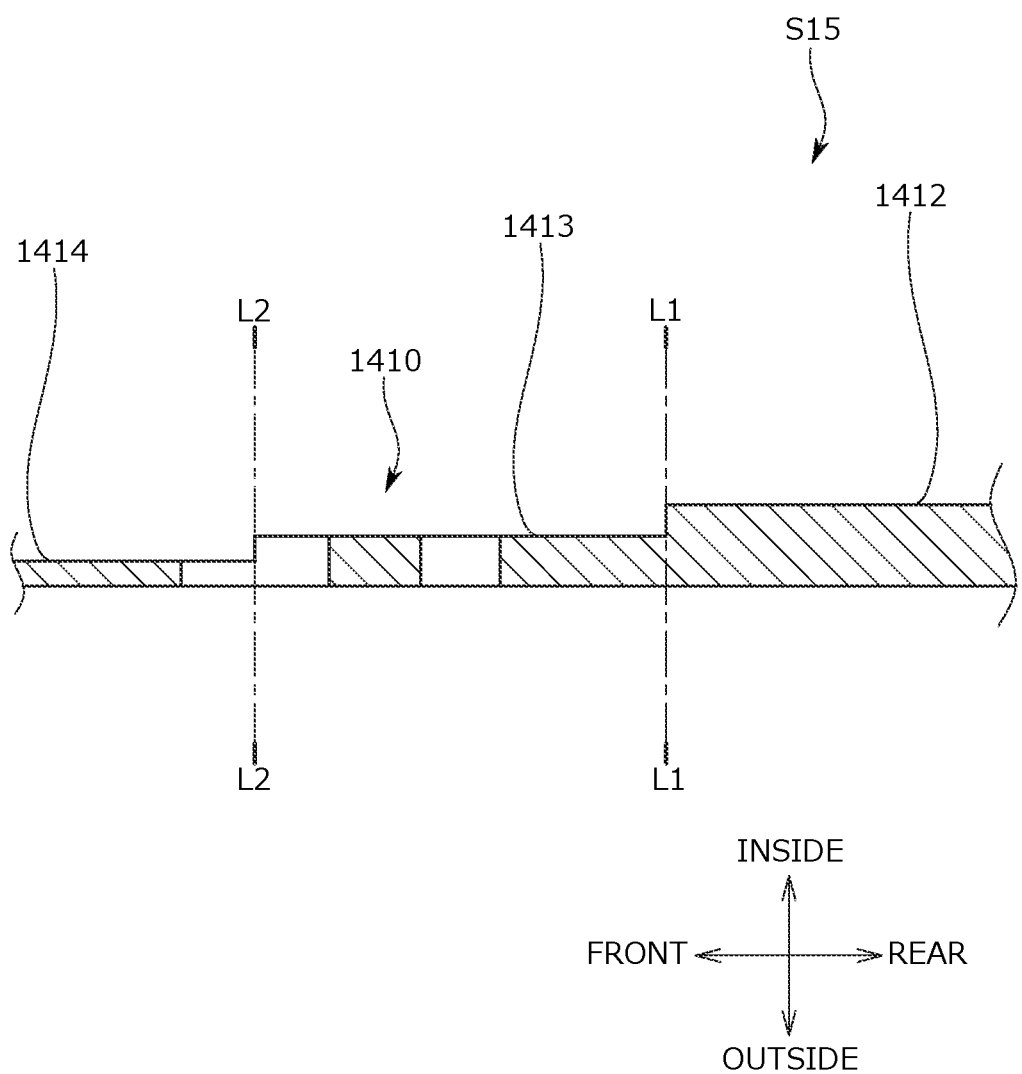
FIG. 61 is a cross-sectional view taken along a line LXI-LXI of FIG. 60.

As shown in FIG. 60, the wire member W that protrudes upward (that is, the seating surface side) from a cushion side frame 1411 is attached to the cushion side frame 1411. The wire member W (linear member) is a linear member that is bent downward in a substantially U shape when viewed from the side and is a reinforcing member (support member) for maintaining the shape of the raised portions (bank portions) on both sides of the seat cushion 1401.

The wire member W extends in the extension direction, that is, the front to back direction of the cushion side frame 1411 between a rear end portion W10 and a front end portion W20 and is fixed to the cushion side frame 1411 at a rear end fixing portion W10a on the rear side and a front end fixing portion W20a on the front side. Then, the rear end fixing portion W10a and the front end fixing portion W20a are provided at a position avoiding the first boundary portion L1 or the second boundary portion L2. In other words, the rear end fixing portion W10a and the front end fixing portion W20s are arranged at a position different from the first boundary portion L1 or the second boundary portion L2 in the extension direction of the cushion side frame 1411.

Specifically, the rear end fixing portion W10a is disposed on the front side of the first boundary portion L1 and the rear side of the second boundary portion L2 in the medium-walled portion 1413, that is, at a position avoiding the first boundary portion L1 and the second boundary portion L2. Further, the front end fixing portion W20a is disposed on the front side of the second boundary portion L2 in the thin-walled portion 1414, that is, at a position avoiding the second boundary portion L2. In the conveyance seat S15 of this embodiment, since the fixing portion of the wire member W is disposed at a position avoiding the first boundary portion L1 or the second boundary portion L2 having lower strength, it is possible to improve the fixability of the wire member W to the cushion side frames 1411 having different plate thicknesses.

The wire member W is welded to the cushion side frame 1411 at the rear end fixing portion W10a and the front end fixing portion W20a. In such a configuration, the wire member W is appropriately fixed to the cushion side frame 1411 by welding.

According to the conveyance seat S15 of the present invention, the conveyance seat may be a conveyance seat including a seat frame, wherein the seat frame may include a pair of side frames which are arranged on side portions of the conveyance seat and a wire member that protrudes from the side frame, wherein the side frame may include a thick-walled portion having a first plate thickness, a medium-walled portion formed continuously with the thick-walled portion and having a second plate thickness thinner than the thick-walled portion, and a thin-walled portion formed continuously with the medium-walled portion and having a third plate thickness thinner than the medium-walled portion, wherein the thick-walled portion and the medium-walled portion may be continuous at a first boundary portion, wherein the medium-walled portion and the thin-walled portion may be continuous at a second boundary portion, wherein the wire member may extend in the extension direction of the side frame, and wherein a fixing portion for the side frame of the wire member may be disposed at a position avoiding the first boundary portion or the second boundary portion.

In this way, it is possible to improve the fixability of the wire member to the side frames having different plate thicknesses by avoiding the boundary portion having lower strength.

Sixteenth Embodiment of Conveyance Seat

Next, a conveyance seat S16 of a sixteenth embodiment will be described with reference to FIGS. 62 to 64.

Additionally, the description of the content that overlaps with the conveyance seats S1 to S15 described above will be omitted.

Conventionally, there is known a vehicle seat that can be switched from a "normal state" in which an occupant can be seated to a "tip-up state" in which a seat main body (seat cushion) is flipped upward.

At this time, it is preferable that the state of the seat main body can be automatically switched in accordance with the usage status and usage schedule of the conveyance seat.

Specifically, it is preferable to detect whether or not the occupant is seated or whether or not the occupant is about to sit, and automatically switch the state of the seat main body according to the detection result.

Here, the conveyance seat S16 realizes the conveyance seat capable of automatically switching the state of the seat cushion in accordance with the usage status (usage schedule) of the seat.

According to the conveyance seat S16 of the present invention, the conveyance seat may include a seat main body which includes a seat back and a seat cushion and is able to be switched between a "normal state" in which a seat cushion can be seated and a "tip-up state" in which the seat cushion is rotated upward from the normal state and may include a support leg which is configured to be rotatable between a "storage position" allowing storage on a seat cushion side and a "deployment position" allowing deployment on a vehicle body floor side and supports the seat cushion from below, a detection sensor which is provided in the seat main body and detects the usage status of the conveyance seat, and a control device which controls a rotating operation of the seat cushion on the basis of the detection result of the detection sensor.

In this way, it is possible to realize the conveyance seat capable of automatically switching the state of the seat main body (seat cushion) according to the usage status and usage schedule of the seat.

Figure 62:
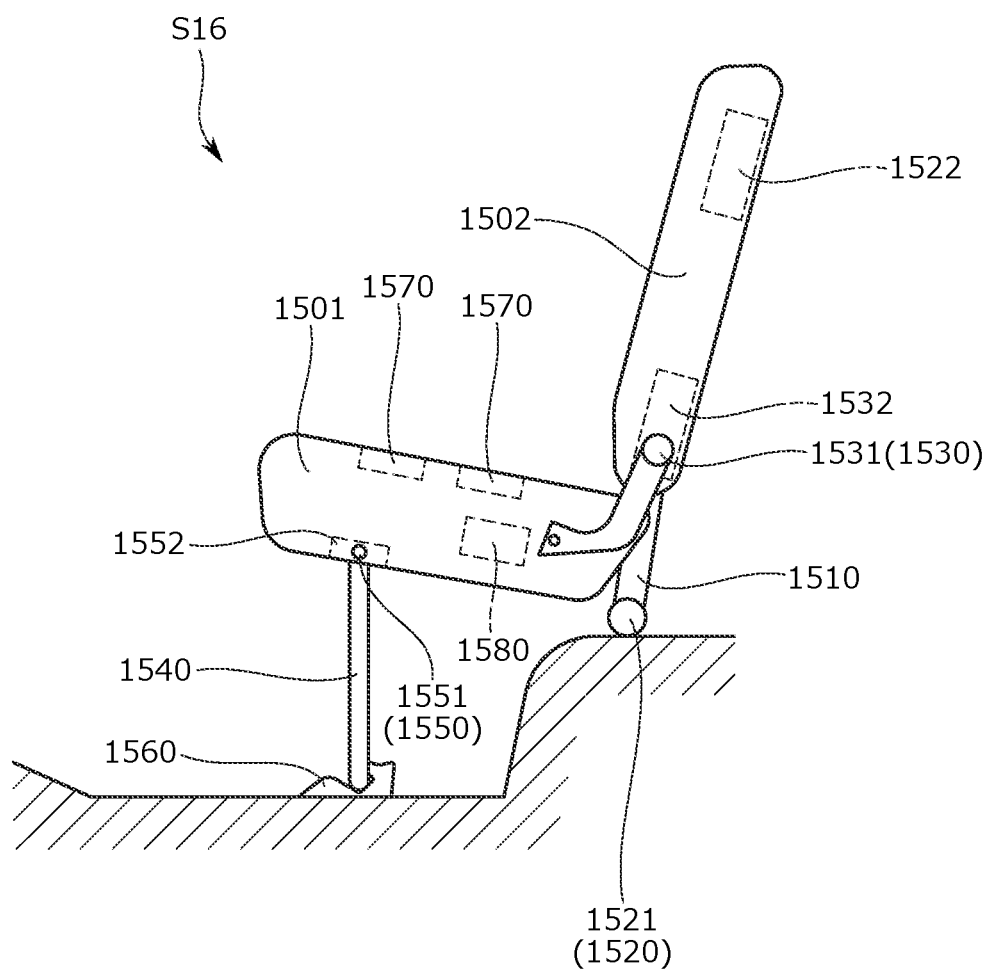
FIG. 62 is a side view of a conveyance seat of a sixteenth embodiment and is a view showing a normal state.
Figure 63:
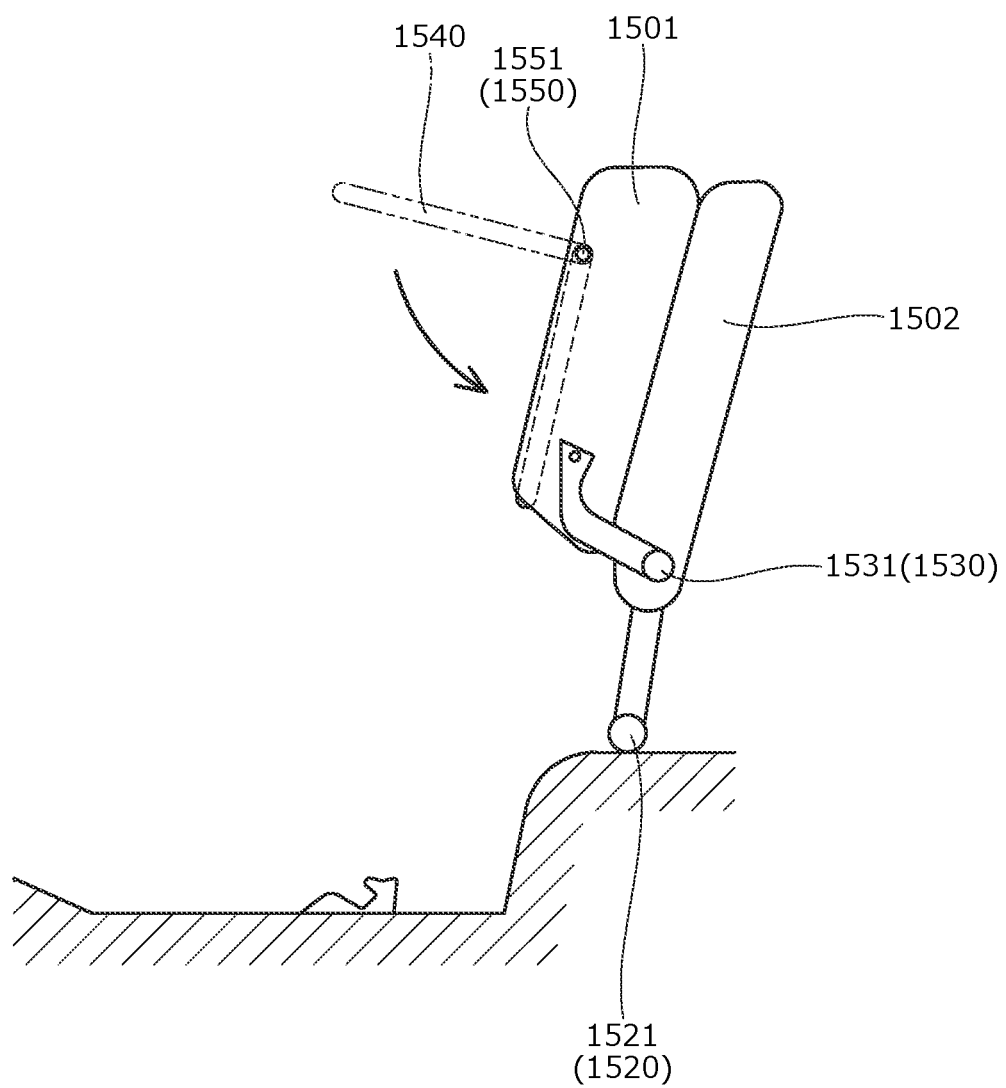
FIG. 63 is a view showing a tip-up state.
Figure 64:
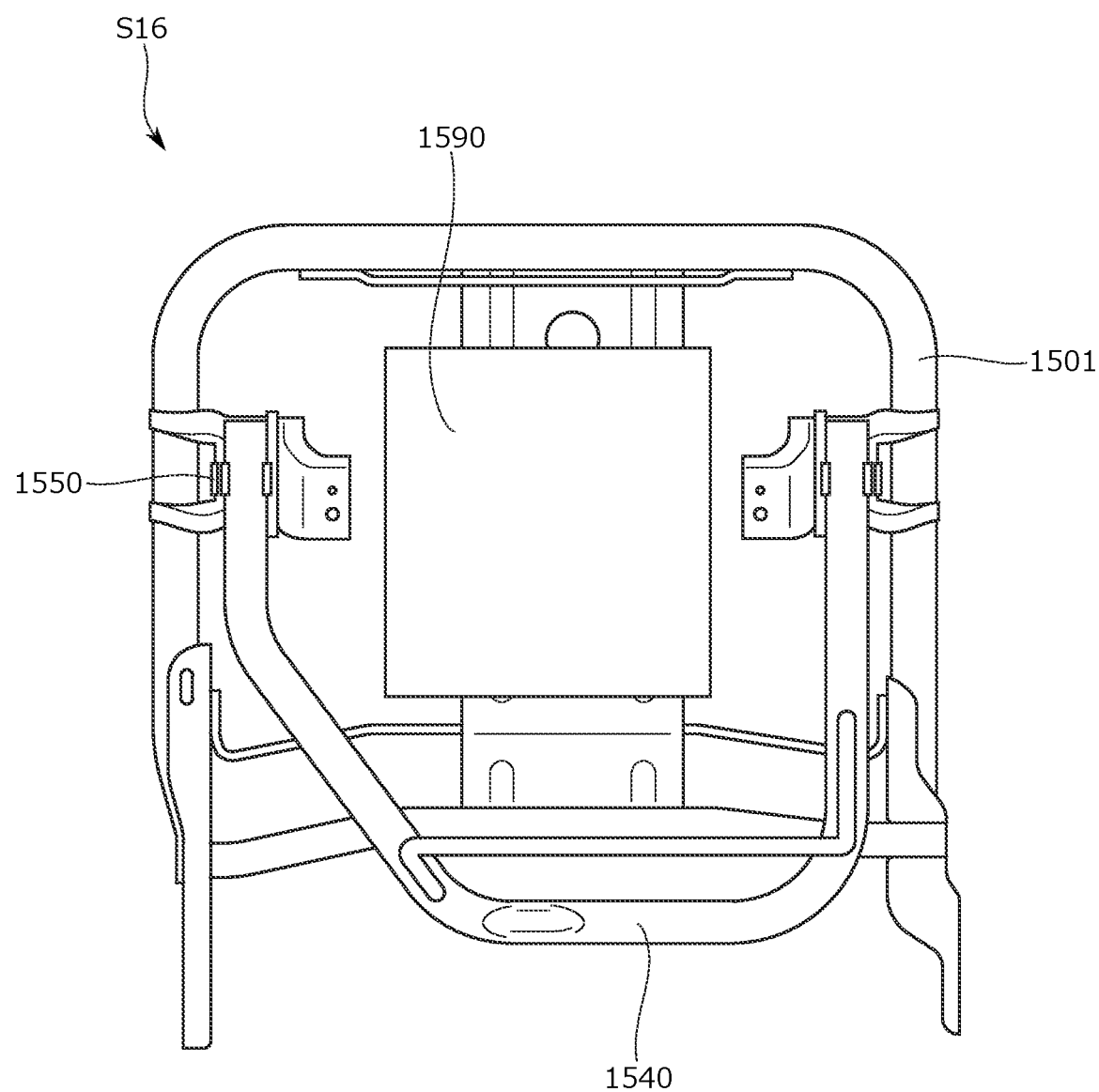
FIG. 64 is a bottom view of a seat frame and is a view showing a cushion frame, a support leg, and a leg rotating device.

The conveyance seat S16 includes, as shown in FIGS. 62 to 64, a seat main body which includes a seat cushion 1501 and a seat back 1502, a support member 1510 that is attached onto a vehicle body floor and supports the seat main body (seat back 1502), a reclining device 1520 which rotatably connects the seat back 1502 to the support member 1510 and locks the rotating operation of the seat back 1502, and a cushion lock device 1530 which rotatably connects the seat cushion 1501 to the seat back 1502 and locks the rotating operation of the seat cushion 1501.

Further, the conveyance seat S16 further includes a support leg 1540 which moves between a "storage position"

allowing the storage on the back surface of the seat cushion 1501 and a "deployment position" allowing the deployment on the vehicle body floor to support the seat cushion 1501, a leg rotating device 1550 which rotatably connects the support leg 1540 to the seat cushion 1501 and locks the rotating operation of the support leg 1540, and a leg engagement hook 1560 which is provided on the vehicle body floor and detachably engages with the support leg 1540 deployed on the vehicle body floor side.

Further, the conveyance seat S16 includes a sheet-shaped detection sensor 1570 which is attached inside the seat main body and detects a biological signal of the occupant and a control device 1580 (ECU) which determines the usage status of the seat S16 on the basis of the biological signal detected by the detection sensor 1570 and controls the rotating operations of the seat cushion 1501 and the support leg 1540.

To "determine the usage status of the seat" means, for example, to determine whether or not the occupant sits on the seat.

Additionally, a plurality of the detection sensors 1570 may be attached inside the seat main body (for example, the seat cushion 1501) or around the seat main body.

In that case, the control device 280 may determine the usage schedule of the seat S16 on the basis of the detection result of the plurality of detection sensors 1570 and control the rotating operation of the seat cushion 1501 and the support leg 1540.

To "determine the usage schedule of the seat" means, for example, to determine whether or not the occupant is about to sit on the seat. Specifically, it is determined whether or not the occupant is about to sit on the seat by determining that the occupant has unlocked the vehicle door, the occupant has opened the vehicle door, the occupant has entered the vehicle, or the occupant has applied a seating load to the side portion of the seat on the basis of the detection result of the detection sensor 1570.

Alternatively, in a conveyance including a plurality of conveyance seats and allowing ridesharing of occupants, a user who wishes to take a seat may determine whether or not the conveyance seat is scheduled to be used in such a manner that reservation information including seat usage schedule is sent to an external server via a network using a reservation application or the like on the user's communication terminal, the external server determines the seat usage schedule based on the reservation information, and a control device of the conveyance receives the seat usage schedule via the network.

The reclining device 1520 includes a back rotating shaft 1521 which is axially supported by the support member 1510 provided on the vehicle body floor and rotatably connects the seat back 1502 and a first driving motor 1522 which rotates the back rotating shaft 1521.

The cushion lock device 1530 includes a cushion rotating shaft 1531 which is axially supported by the seat back 1502 and rotatably connects the seat cushion 1501 and a second driving motor 1532 which rotates the cushion rotating shaft 1531.

The leg rotating device 1550 includes a leg rotating shaft 1551 which is axially supported by the seat cushion 1501 and rotatably connects the support leg 1540 and a third driving motor 1552 which rotates the leg rotating shaft 1551.

The back rotating shaft 1521 is disposed at the lower end portion of the seat back 1502, strictly speaking, below the seat back 1502.

The back rotating shaft 1521, the cushion rotating shaft 1531, and the leg rotating shaft 1551 are respectively arranged at different positions in the up to down direction and the front to back direction of the seat.

Further, the first driving motor 1522, the second driving motor 1532, and the third driving motor 1552 are respectively arranged at different positions in the up to down direction and the front to back direction of the seat.

Additionally, the back rotating shaft 1521 may be disposed at the upper end portion of the seat back 1502. In that case, the back rotating shaft 1521 may be axially supported by the support member 1510 erected from the vehicle body floor and the seat back 1502.

When it is determined that the occupant is not seated or the occupant is not scheduled to be seated on the basis of the detection result of the detection sensor 1570, the control device 1580 controls the cushion lock device 1530 and the leg rotating device 1550 so that the seat cushion 1501 and the support leg 1540 are switched from the "normal state" shown in FIG. 62 to the "tip-up state" shown in FIG. 63.

Specifically, the control device 1580 rotates the seat cushion 1501 upward to come into contact with the seat back 1502 and then locks the rotating operation of the seat cushion 1501.

Further, the control device 1580 rotates the support leg 1540 toward the back surface of the seat cushion 1501 to be stored and then locks the rotating operation of the support leg 1540.

Additionally, the control device 1580 may control the reclining device 1520 when the seat cushion 1501 is switched to the "tip-up state" and lock the seat back 1502 by rotating the seat back from an upright position to a predetermined position.

Additionally, the control device 1580 may be operated so that the leg engagement hook 1560 is stored in the vehicle body floor when the seat main body is switched to the "tip-up state".

In the above-described configuration, as shown in FIG. 64, the conveyance seat S16 may further include a display 1590 which is provided at a position different from the support leg 1540 on the back surface of the seat cushion 1501.

Specifically, the display 1590 may be disposed in an area surrounded by the substantially U-shaped support legs 1540.

In this way, the occupant can see the image displayed on the display 1590 when the seat main body is in the "tip-up state".

As described above, in the above-described embodiments, a vehicle seat used in an automobile has been described as a specific example, but can also be used for various seats such as office chairs for work, wheelchairs, and children's chairs for shopping carts in addition to motorcycle seats for motorcycles, vehicle seats for trains and buses, and conveyance seats for airplanes and ships without any particular limitation.

In the above-described embodiments, the conveyance seat according to the present invention has been mainly described.

However, the above-described embodiments are merely an example for facilitating understanding of the present invention, and do not limit the present invention. The present invention can be modified and improved without departing from its spirit, and the present invention includes equivalents thereof.

REFERENCE SIGNS LIST

S1 to S16: conveyance seat
Sa: seat frame 1, 101, 201, 301, 601, 801, 901, 1001, 1101, 1201, 1301, 1401, 1501: seat cushion
   1A, 2A, 102A, 201A, 202A, 601A, 602A, 801A, 802A, 901A, 902A: center portion
   1B, 2B, 102B, 202B, 502B, 601B, 602B, 801B, 802B, 901B, 902B: side portion
   1a, 2a, 3a, 102a, 201a, 202a, 301a, 502a, 601a, 603a, 801a, 802a, 803a, 901a, 902a, 1001a, 1002a: cushion material
      1aa, 2aa, 102aa, 202aa, 601aa, 801aa: pull-in groove
      102ab: pull-in hole
      102ac: hooking wire
      102ad: pulling wire
      802aa: pull-in groove side portion
      802ab: pull-in groove upper portion
   1b, 2b, 3b, 102b, 201b, 202b, 301b, 601b, 603b, 801b, 802b, 803b, 901b, 902b, 1001b, 1002b: skin material
2, 102, 202, 302, 402, 502, 602, 702, 802, 902, 1002, 1102, 1202, 1302, 1402, 1502: seat back
3, 103, 303, 803, 903, 1003, 1103, 1203, 1303, 1403: headrest
   3c, 603c, 803c: pillar
4, 604, 804: reclining device
5, 605, 805: height link device
6, 606, 806: rail device
10, 210, 310, 610, 810, 910, 1110, 1210, 1310, 1410: cushion frame
11, 311, 611, 811, 911, 1411: cushion side frame
12, 312, 612, 812, 912: pan frame
13, 313, 613, 813: rear connection frame
14, 614, 814: elastic spring (elastic support member)
314: support plate
   314a: front hook portion
   314b: rear hook portion
315: front connection frame
316: opening portion
20, 120, 220, 320, 420, 620, 720, 820, 920, 1120, 1220, 1320, 1420: back frame
21, 121, 221, 321, 421, 521, 621, 721, 821, 921, 121, 1321, 1421: back side frame
   1221a, 1321a: side plate portion
22, 222, 322, 622, 822, 922: upper frame (connection frame)
   222a: attachment hole
23, 223, 323, 623, 823: lower frame
24, 224, 324, 624, 824: wire member
25, 225, 325, 625, 825: support plate
26, 626, 726, 829: pillar attachment member
227, 327: connection frame
826: second connection frame
827: connection member
   827a: support surface
828: second wire member
30, 130, 230, 430, 530, 630: lumbar support member
31, 631: base member
32, 632: bag body
231, 531: driving device
232: driving main body portion
233 to 235: first cable to third cable
40, 140, 240, 340, 440, 540, 830: movable body (side support member, shoulder support member)
41, 141, 241, 541, 831: base member
42, 142, 242, 542, 832: rotating shaft (attachment member)
43, 143, 243, 543: rotating member
44, 144, 244, 544, 834: bag body
44a to 44c, 434a to 834c: first bag body to third bag body
45: attachment member
46: cushion deformation suppressing portion
47: high hardness cushion portion
48, 248: cushion deformation prompting portion
146: guide member
147: skin material pull-in portion
   147a: pull-in main body
   147b: pull-in hook
148: through hole
249: slit hole
50, 150, 250, 350, 450, 550, 640, 840: operating device (fluid supply device)
51, 251, 351, 641: air control unit
52, 252, 352, 642, 841: air pump
53, 253, 353, 643, 842: air pipe (first air pipe)
354: second air pipe
260: side support member
261: inner wall portion
   261a, 262a: frame attachment hole
262: outer wall portion
263: connection wall portion
264: reinforcement rib
265: attachment member
270: seating sensor
   271: sensor detection unit
   272: transmission path
280: control device
360: cushion length adjusting device
361: first bag body
362: second bag body
363: housing
   363a: skin material hook portion
364: protrusion
   364a: partition wall portion
   364b: upper wall portion
   364c: contact wall portion
   364d: engagement portion
365: cover body
366: skin material pulling member
   366a: rotating shaft
   366b: rotating body
   366c: skin material pulling portion
460: shoulder support member
461: movable main body
462: rotating shaft
470: driving device
570: side airbag device
580: linear member
650, 750: movable body
651, 751: movable main body
   651a: center movable portion
   651b, 651c: side movable portion
   651d: attachment shaft
652, 752: rotating shaft
   652a: shaft main body
   652b: first shaft extending portion
   652c: second shaft extending portion
653, 654: bending prompting portion
655: notch portion
660, 760: driving device (actuator)
770: side airbag device
930, 940, 1030, 1040, 1130, 1140: biosensor
   930a: forward biosensor (first biosensor)
   930b: rear biosensor (second biosensor)
   930c: right biosensor (third biosensor)

930d: left biosensor (fourth biosensor)
930e: front biosensor (fifth biosensor)
931, 941: sensor detection unit
950, 1050, 1150: control device
960, 970: movable member (bag body, air cell)
961, 971: first movable member
962, 972: second movable member
963, 973: third movable member
964, 974: fourth movable member
980: operating device
981: air pump
982: air pipe
1060: decorative stitch portion (decorative portion)
1061 to 1063: first to third stitch portions
1160, 1170: support member (side support member)
1222, 1322, 1412: thick-walled portion
1223, 1323, 1413: medium-walled portion
1224, 1324, 1414: thin-walled portion
1225, 1325: concave portion (medium width portion)
1225a to 1225c, 1325a to 1325c: first to third concave portions
L1 to L2: first to second boundary portions
W, W1 to W3: wire member, first to third wire members (first to third bridging members)
W10: rear end portion
W10a: rear end fixing portion (first fixing portion)
W20: front end portion
W20a: front end fixing portion (second fixing portion)
K1 to K3: first to third fixing portions
1510: support member
1520: reclining device
1521: back rotating shaft
1522: first driving motor
1530: cushion lock device
1531: cushion rotating shaft
1532: second driving motor
1540: support leg
1550: leg rotating device
1551: leg rotating shaft
1552: third driving motor
1560: leg engagement hook
1570: detection sensor
1580: control device
1590: display

The invention claimed is:

1. A conveyance seat, comprising:
a seat main body, which includes a seat back that serves as a backrest portion; and
a movable body, which is attached inside the seat back, is disposed at an outer position in relation to a center portion of the seat back in a seat width direction, and is operated so that a portion of the seat back protrudes from a normal position toward a seat front side,
wherein a rear end portion of the movable body is disposed on the seat front side in relation to a seating surface of the center portion of the seat back,
wherein the seat back includes a cushion material and a skin material covering the cushion material,
wherein the movable body is disposed on a back surface of a cushion material in a side portion of the seat back in the seat width direction and is operated so that the side portion protrudes toward the seat front side,
wherein the movable body includes a plurality of bag bodies which inflate when a fluid is enclosed,
wherein the plurality of bag bodies are arranged at different positions in a front to back direction of the seat, and
wherein a first bag body located closest to the seat front side in the plurality of bag bodies is configured to have the smallest capacity than the other bag bodies.

2. The conveyance seat according to claim 1,
wherein the movable body includes a rotating member that is rotated so that the side portion of the seat back protrudes toward the seat front side, and
wherein a rear end portion of the rotating member is disposed on the seat front side in relation to the seating surface of the center portion of the seat back.

3. The conveyance seat according to claim 1,
wherein the seat back includes a back frame which serves as a framework,
wherein the back frame includes side frames which are arranged on right and left sides in the seat width direction and extend in an up to down direction,
wherein the movable body is disposed at a seat front position in relation to the side frame, and
wherein the movable body includes a base member that is supported by the side frame and a rotating member that is rotatably attached to the base member through a rotating shaft.

4. The conveyance seat according to claim 3,
wherein a protruding surface of the side portion is formed continuously with the seating surface of the center portion in the seat back,
wherein a back surface of the cushion material in the side portion forms an inclined surface along the protruding surface of the side portion,
wherein the movable body is disposed in an inner space formed between the side frame and the cushion material in the side portion, and
wherein a portion corresponding to the cushion material of the side portion in the base member extends to be inclined along the back surface of the cushion material of the side portion.

5. The conveyance seat according to claim 4,
wherein a portion facing the cushion material of the side portion in the rotating member extends to be inclined along the back surface of the cushion material of the side portion.

6. The conveyance seat according to claim 1,
wherein a pull-in groove for pulling an end of the skin material is formed on a surface of the cushion material,
wherein the pull-in groove is provided at a position of partitioning the center portion and the side portion in the seat back and extends in the up to down direction, and
wherein a portion corresponding to the pull-in groove in the back surface of the cushion material is formed with a cushion deformation suppressing portion for suppressing the cushion material from being deformed in the periphery of the pull-in groove.

7. The conveyance seat according to claim 1,
wherein the movable body includes a plurality of bag bodies which inflate when a fluid is enclosed, and
wherein the plurality of bag bodies are arranged at different positions in a front to back direction of the seat and are arranged on the seat front side in relation to the seating surface of the center portion of the seat back.

8. The conveyance seat according to claim 1, further comprising:
a lumbar support member that is attached inside the seat back and is operated so that the center portion of the seat back in the seat width direction protrudes from a normal position toward the seat front side, wherein when the lumbar support member allows the center portion of the seat back to protrude toward a maximum seat front side, a rear end portion of the movable body is disposed on the seat front side in relation to the seating surface of the center portion of the seat back.

9. The conveyance seat according to claim 1, further comprising:
a lumbar support member that is attached inside the seat back and is operated so that the center portion of the seat back in the seat width direction protrudes from a normal position toward the seat front side; and
a driving device which is attached inside the seat back and drives the lumbar support member,
wherein the movable body is disposed on the seat front side in relation to the driving device.

10. The conveyance seat according to claim 1,
wherein the seat back includes a back frame serving as a framework,
wherein the back frame includes side frames which are arranged on the right and left sides in the seat width direction and extend in a predetermined direction, a connection frame which connects end portions of the right and left side frames in an extension direction, a second connection frame which is disposed at a position different from the connection frame in the extension direction of the side frame and connects the right and left side frames, and a connection member that connects the connection frame and the second connection frame, and
wherein the movable body is attached to the connection member.

11. A conveyance seat, comprising:
a seat main body, which includes a seat back that serves as a backrest portion; and
a movable body, which is attached inside the seat back, is disposed at an outer position in relation to a center portion of the seat back in a seat width direction, and is operated so that a portion of the seat back protrudes from a normal position toward a seat front side,
wherein a rear end portion of the movable body is disposed on the seat front side in relation to a seating surface of the center portion of the seat back,
wherein the seat back includes a cushion material and a skin material covering the cushion material,
wherein the movable body is disposed on a back surface of a cushion material in a side portion of the seat back in the seat width direction and is operated so that the side portion protrudes toward the seat front side,
wherein a pull-in hole for pulling an end of the skin material is formed on a surface of the cushion material,
wherein the pull-in hole is provided at a position of partitioning the center portion and the side portion in the seat back and extends in the up to down direction,
wherein a skin material pull-in portion passing through the pull-in hole and hooked to a hook portion provided inside the seat back is attached to the end of the skin material, and
wherein the skin material pull-in portion is hooked to the hook portion while being pulled outward in the seat width direction by a pulling portion provided inside the seat back.

12. The conveyance seat according to claim 11,
wherein the pulling portion and the pull-in hole inside the seat back are arranged at an overlapping position in a front to back direction of the seat.

13. A conveyance seat, comprising:
a seat main body, which includes a seat back that serves as a backrest portion; and
a movable body, which is attached inside the seat back, is disposed at an outer position in relation to a center portion of the seat back in a seat width direction, and is operated so that a portion of the seat back protrudes from a normal position toward a seat front side,
wherein a rear end portion of the movable body is disposed on the seat front side in relation to a seating surface of the center portion of the seat back,
wherein the seat back includes a cushion material and a skin material covering the cushion material,
wherein the movable body is disposed on a back surface of a cushion material in a side portion of the seat back in the seat width direction and is operated so that the side portion protrudes toward the seat front side,
wherein the movable body is disposed in an inner space formed on the back surface of the cushion material in the side portion,
wherein a through hole which penetrates from an outer surface of the cushion material to the inner space is formed in the outer surface of the cushion material in the side portion, and
wherein the through hole is disposed at a position overlapping the movable body in a front to back direction of the seat and extends in the up to down direction.

* * * * *